US008364315B2

(12) United States Patent
Sturmer et al.

(10) Patent No.: US 8,364,315 B2
(45) Date of Patent: Jan. 29, 2013

(54) METHODS, SYSTEMS, AND PRODUCTS FOR CONDUCTING DROPLET OPERATIONS

(75) Inventors: Ryan A. Sturmer, Durham, NC (US); Gregory F. Smith, Cary, NC (US); Michael Fogleman, Cary, NC (US); Keith R. Brafford, Durham, NC (US); Sai Ram Rongali, Chicago, IL (US)

(73) Assignee: Advanced Liquid Logic Inc., Research Triangle Park, NC (US)

( * ) Notice: Subject to any disclaimer, the term of this patent is extended or adjusted under 35 U.S.C. 154(b) by 356 days.

(21) Appl. No.: 12/596,905

(22) PCT Filed: Aug. 13, 2009

(86) PCT No.: PCT/US2009/053725
§ 371 (c)(1),
(2), (4) Date: Oct. 21, 2009

(87) PCT Pub. No.: WO2010/019782
PCT Pub. Date: Feb. 18, 2010

(65) Prior Publication Data

US 2011/0213499 A1 Sep. 1, 2011

Related U.S. Application Data

(60) Provisional application No. 61/186,151, filed on Jun. 11, 2009, provisional application No. 61/139,987, filed on Dec. 22, 2008, provisional application No. 61/092,078, filed on Aug. 27, 2008, provisional application No. 61/088,822, filed on Aug. 14, 2008, provisional application No. 61/088,611, filed on Aug. 13, 2008.

(51) Int. Cl.
*G05B 21/00* (2006.01)

(52) U.S. Cl. ........ 700/266; 700/273; 422/502; 422/503; 422/504; 422/509; 422/518; 204/600

(58) Field of Classification Search .................... 700/23, 700/231, 253, 266, 273; 422/50, 68.1, 81, 422/82.03, 500–504, 509, 518; 204/600–603
See application file for complete search history.

(56) References Cited

U.S. PATENT DOCUMENTS

| | | | | |
|---|---|---|---|---|
| 6,294,063 | B1 | 9/2001 | Becker et al. | |
| 8,088,578 | B2 * | 1/2012 | Hua et al. | 435/6.1 |
| 2001/0021534 | A1 * | 9/2001 | Wohlstadter et al. | 436/518 |
| 2003/0138359 | A1 * | 7/2003 | Chow et al. | 422/101 |
| 2004/0055891 | A1 | 3/2004 | Pamula et al. | |
| 2004/0086423 | A1 * | 5/2004 | Wohlstadter et al. | 422/52 |
| 2005/0014255 | A1 | 1/2005 | Tang et al. | |
| 2005/0148084 | A1 * | 7/2005 | Parce et al. | 436/50 |
| 2006/0254933 | A1 | 11/2006 | Adachi et al. | |
| 2007/0053799 | A1 * | 3/2007 | Bousse et al. | 422/100 |
| 2007/0148763 | A1 | 6/2007 | Huh et al. | |
| 2008/0281471 | A1 * | 11/2008 | Smith et al. | 700/266 |
| 2009/0280475 | A1 * | 11/2009 | Pollack et al. | 435/6 |
| 2010/0096266 | A1 * | 4/2010 | Kim et al. | 204/451 |
| 2010/0236930 | A1 * | 9/2010 | Vann et al. | 204/451 |
| 2010/0270156 | A1 * | 10/2010 | Srinivasan et al. | 204/450 |
| 2010/0307922 | A1 * | 12/2010 | Wu | 204/643 |

FOREIGN PATENT DOCUMENTS

| | | | |
|---|---|---|---|
| JP | 2008057381 | A | 3/2008 |
| WO | WO2008051310 | A2 | 5/2008 |

OTHER PUBLICATIONS

Jie Ding, "System level architectural optimization of semi-reconfigurable microfluidic system," M.S. Thesis, Duke University Dept of Electrical Engineering, 2000.
Herrick, S.E. et al., Mesothelial progenitor cells and their potential in tissue engineering. Int J Biochem Cell Biol. Apr. 2004, vol. 36, No. 4, pp. 621-642.
Hyejin Moon, "Electrowetting-On-Dielectric Microfluidics: Modeling, Physics, and MALDI Application," Ph.D. Dissertation, University of California Dept. of Mechanical Engineering, published Aug. 2006.
Pinho, M. et al., Haemopoietic progenitors in the adult mouse omentum: permanent production of B lymphocytes and monocytes. Cell Tissue Res. Jan. 2005, vol. 319, No. 1, pp. 91-102.
Pollack et al., "Electrowetting-Based Actuation of Droplets for Integrated Microfluidics," Lab on a Chip (LOC), vol. 2, pp. 96-101, 2002.
Vijay Srinivasan, Vamsee K. Pamula, Richard B. Fair, "An integrated digital microfluidic lab-on-a-chip for clinical diagnostics on human physiological fluids," Lab on a Chip (LOC), vol. 4, pp. 310-315, 2004.

Srinivasan, et al., "Integrated chemical/biochemical sample collection, pre-concentration, and analysis on a digital microfluidic lab-on-a-chip platform," Lab-on-a-Chip: Platforms, Devices, and Applications, Conf. 5591, SPIE Optics East, Philadelphia, Oct. 25-28, 2004.

* cited by examiner

*Primary Examiner* — Brian R Gordon
(74) *Attorney, Agent, or Firm* — Ward & Smith P.A.; William A. Barrett

(57) ABSTRACT

The present invention provides modified droplet actuator systems, software, and software-executed methods for use in droplet actuator operation and droplet actuator systems that are configured and programmed to execute such software. An aspect of the software components of the invention is an interface description file for each hardware component of a microfluidics system that allows hardware components to be changed without modifying the program for performing droplet operations protocols. Another aspect of the software components of the invention is the establishment of electrode-to-electrode relationships and other aspects of droplet actuator configurations, which may be used when programming droplet operations protocols. Another aspect of the software components of the invention is a physical design library of predefined electrode elements that may be used by a droplet actuator designer when constructing a layout of electrodes. Another aspect of the software components of the invention is a droplet actuator description file that contains the physical and electrical description of the droplet actuator. Another aspect of the software components of the invention is a router component for determining routes of droplet operations in a droplet actuator. Another aspect of the software components of the invention is the use of tri-state vectors for programming sequences in a droplet actuator. Still other aspects are provided.

7 Claims, 43 Drawing Sheets

FIG. 42

134

3900

| | |
|---|---|
| Title | Denovo sequencing 042209 |
| Operator | pthwar |
| Instrument | 5 |
| Cartridge Type | PYR-C01 |
| Cartridge ID | 3831 |
| Oil | 0.1% Triton X 15 in Silicone oil |
| Notebook series | PT-7 |
| Notebook page # | |
| Start Time | 2009-04-22 15:40:02 |
| End Time | 2009-04-22 16:49:43 |
| Duration | 1 hour, 9 minutes |
| Age | 21 hours, 4 minutes |
| Status | Completed |

Attachments: 2009-04-23/00000120cf54e34a269d408200c000a800dc0040.ade

Experiment Summary:
Purpose: check integrity of reagents of pyrosequencing
Denovo sequencing: 4 cycles of base addition
Promega Luciferase, NEB ATP Sulfurylase; USB Klenow, all mixed in one pot Experimental Observations: Completed, but counts are low. 1) USB Klenow not working 2) dNTPs not working 3) Not enough DNA on beads 4) DNA/primer duplex not malformed Experimental Data:

PMT Detect: 2009-04-22 15:47:14 0 2 1 1 0 2 2 1 4 5 4 11 3 4 4 10 6 4 5 11 8 7 6 8 10

METHODS, SYSTEMS, AND PRODUCTS FOR CONDUCTING DROPLET OPERATIONS

1 RELATED APPLICATIONS

This application is related to U.S. Provisional Application 61/088,611, filed Aug. 13, 2008, entitled "Electrode Activation Methods for Droplet Actuators", and incorporated herein by reference in its entirety. This application also relates to U.S. Provisional Application 61/088,822, filed Aug. 14, 2008, entitled "Software Components for Use in Droplet Actuator Design and Operation", and incorporated herein by reference in its entirety. This application also relates to U.S. Provisional Application 61/092,078, filed Aug. 27, 2008, entitled "Software Components for Use in Droplet Actuator Design and Operation", and incorporated herein by reference in its entirety. This application also relates to U.S. Provisional Application 61/139,987, filed Dec. 22, 2008, entitled "Software Components for Use in Droplet Actuator Design and Operation", and incorporated herein by reference in its entirety. This application also relates to U.S. Provisional Application 61/186,151, filed Jun. 11, 2009, entitled "Software Components for Use in Droplet Actuator Design and Operation", and incorporated herein by reference in its entirety.

2 BACKGROUND

Droplet actuators are used to conduct a wide variety of droplet operations. A droplet actuator typically includes two substrates separated by a gap. The substrates include electrodes for conducting droplet operations. The gap between the substrates is typically filled with a filler fluid that is immiscible with the fluid that is to be subjected to droplet operations. Droplet operations are controlled by electrodes associated with one or both of the substrates. As the design and operation of droplet actuators become more complex, there is a need for further software development with respect to droplet actuator applications.

3 SUMMARY OF THE INVENTION

The invention provides a method for conducting droplet operations comprising receiving a droplet operation, determining a logical channel that corresponds to the droplet operation, mapping the logical channel to a physical pin of a droplet actuator, and communicating the droplet operation to the droplet actuator via the physical pin.

The invention also provides a method for conducting droplet operations comprising receiving a droplet operation, determining logical inputs and outputs that correspond to the droplet operation, accessing actuator description information for a droplet actuator, and translating the logical inputs and outputs into physical inputs and outputs of the droplet actuator.

A method is also provided comprising receiving a selection of a function to be performed by a droplet actuator, associating the function to a grouping of one or more electrodes that perform the function, and adding the grouping to an electronic layout of the droplet actuator.

Further, the invention provides a method comprising receiving a selection of a function to be performed by a droplet actuator, associating the function to a predefined electrode element, associating the predefined electrode element to a grouping of one or more electrodes that perform the function, and adding the grouping of one or more electrodes to an electronic layout of the droplet actuator.

The invention additionally provides a method comprising determining a state of electrodes in a droplet actuator with each electrode having an applied voltage or a reference voltage, determining a vector having terms corresponding to a voltage of each electrode, and transforming the vector into physical pin assignments for the droplet actuator.

A system for conducting droplet operations is also provide, the system comprising a processor executing code stored in memory that causes the processor to receive a droplet operation, determine a logical channel that corresponds to the droplet operation, map the logical channel to a physical pin of a droplet actuator, and communicate the droplet operation to the droplet actuator via the physical pin.

The invention also provides a system for conducting droplet operations, the system comprising a processor executing code stored in memory that causes the processor to receive a droplet operation, determine logical inputs and outputs that correspond to the droplet operation, access actuator description information for a droplet actuator, and translate the logical inputs and outputs into physical inputs and outputs of the droplet actuator.

The invention additionally provides a system comprising a processor executing code stored in memory that causes the processor to receive a selection of a function to be performed by a droplet actuator, associate the function to a grouping of one or more electrodes that perform the function, and add the grouping to an electronic layout of the droplet actuator.

A system is also provided comprising a processor executing code stored in memory that causes the processor to receive a selection of a function to be performed by a droplet actuator, associate the function to a predefined electrode element, associate the predefined electrode element to a grouping of one or more electrodes that perform the function, and add the grouping of one or more electrodes to an electronic layout of the droplet actuator.

Still further, the invention provides a system comprising a processor executing code stored in memory that causes the processor to determine a state of electrodes in a droplet actuator with each electrode having an applied voltage or a reference voltage, determine a vector having terms corresponding to a voltage of each electrode, and transform the vector into physical pin assignments for the droplet actuator.

The invention also provides a computer readable medium storing processor executable code for performing a method, the method comprising receiving a droplet operation, determining a logical channel that corresponds to the droplet operation, mapping the logical channel to a physical pin of a droplet actuator, and communicating the droplet operation to the droplet actuator via the physical pin.

Still further, the invention provides a computer readable medium storing processor executable code for performing a method, the method comprising receiving a droplet operation, determining logical inputs and outputs that correspond to the droplet operation, accessing actuator description information for a droplet actuator, and translating the logical inputs and outputs into physical inputs and outputs of the droplet actuator.

The invention also provides a computer readable medium storing processor executable code for performing a method, the method comprising receiving a selection of a function to be performed by a droplet actuator, associating the function to a grouping of one or more electrodes that perform the function, and adding the grouping to an electronic layout of the droplet actuator.

The invention additionally provides a computer readable medium storing processor executable code for performing a method, the method comprising receiving a selection of a function to be performed by a droplet actuator, associating the function to a predefined electrode element, associating the predefined electrode element to a grouping of one or more electrodes that perform the function, and adding the grouping of one or more electrodes to an electronic layout of the droplet actuator.

The invention further provides a computer readable medium storing processor executable code for performing a method, the method comprising determining a state of electrodes in a droplet actuator with each electrode having an applied voltage or a reference voltage, determining a vector having terms corresponding to a voltage of each electrode, and transforming the vector into physical pin assignments for the droplet actuator.

Still further, the invention provides an apparatus for conducting electrowetting operations within a microfluidic system comprising a plurality of hardware components respectively including a different hardware I/O interface, the apparatus comprising a memory storing interface description information corresponding to a plurality of different hardware I/O interfaces respectively associated with the plurality of hardware components, logical I/O associated with the electrowetting operation, and program code configured to translate the logical I/O to the plurality of different hardware I/O interfaces; and a processor in communication with the memory and configured to execute the program code to translate the logical I/O to a hardware I/O interface of the plurality of different hardware I/O interfaces without significant modification to a droplet operation protocol defined by the electrowetting operation.

The invention additionally provides an apparatus for designing a microfluidic system used to conduct electrowetting operations, the apparatus comprising a memory for storing design information associated with a plurality of electrode configurations, each configuration comprising a plurality of electrodes arranged to provide a function and that share a relationship with one another, and program code configured to enable the selection of an electrode configuration of the plurality of electrode configurations for incorporation within the microfluidic system design; and a processor in communication with memory and configured to execute the program code to enable the selection of the electrode configuration for incorporation within the microfluidic system design.

A program product is also provided comprising program code configured to access interface description information corresponding to a plurality of different hardware I/O interfaces respectively associated with a plurality of hardware components of a microfluidic system for conducting an electrowetting operation, the program code further configured to access logical I/O associated with the electrowetting operation, and to translate the logical I/O to the plurality of different hardware I/O interfaces; and a computer readable medium bearing the program code.

The invention further provides a program product comprising program code configured to access design information associated with a plurality of electrode configurations each comprising a plurality of electrodes including a relationship with one another and arranged to provide a specific function, and to enable the selection of an electrode configuration of the plurality for incorporation within the microfluidic system design; and a computer readable medium bearing the program code.

The invention also provides a method for conducting droplet operations comprising determining a hardware I/O interface associated with a hardware component of a microfluidic system for conducting electrowetting operations, automatically selecting interface description information based on the hardware I/O configuration, and using the interface description information to translate the logical I/O to the hardware I/O interface without significant modification to a droplet operation protocol defined by the electrowetting operation.

The invention additionally provides a method for conducting droplet operations comprising storing design information associated with a plurality of electrode configurations, each configuration comprising a plurality of electrodes including a relationship with one another and arranged to provide a function, and enabling the selection of the design information comprising an electrode configuration of the plurality of electrodes for incorporation within a microfluidic system design.

A method for simulating an assay is also provided, the method comprising retrieving a representation of the assay, retrieving an electronic layout of an electrode configuration, and graphically simulating the representation of the assay in time in the electronic layout of the electrode configuration.

The invention additionally provides a method for developing assays comprising receiving a start location associated with an assay in an electronic layout of an electrode configuration, receiving a finish location associated with the assay in the electronic layout of the electrode configuration, determining a route from the start location to the finish location, and graphically indicating the route in the electronic layout of the electrode configuration.

Still further, the invention provides a system for simulating an assay, the system comprising a processor executing code stored in memory that causes the processor to retrieve a representation of the assay, retrieve an electronic layout of an electrode configuration, and graphically simulate the representation of the assay in time in the electronic layout of the electrode configuration.

The invention further provides a system for developing assays comprising a processor executing code stored in memory that causes the processor to receive a start location associated with an assay in an electronic layout of an electrode configuration, receive a finish location associated with the assay in the electronic layout of the electrode configuration, determine a route from the start location to the finish location, and graphically indicate the route in the electronic layout of the electrode configuration.

The invention also provides a computer readable medium storing processor executable code for performing a method, the method comprising retrieving a representation of an assay, retrieving an electronic layout of an electrode configuration, and graphically simulating the representation of the assay in time in the electronic layout of the electrode configuration.

The invention additionally provides a computer readable medium storing processor executable code for performing a method, the method comprising receiving a start location associated with an assay in an electronic layout of an electrode configuration, receiving a finish location associated with the assay in the electronic layout of the electrode configuration, determining a route from the start location to the finish location, and graphically indicating the route in the electronic layout of the electrode configuration.

4 DEFINITIONS

As used herein, the following terms have the meanings indicated.

"Activate" with reference to one or more electrodes means effecting a change in the electrical state of the one or more electrodes which results in a droplet operation.

"Droplet" means a volume of liquid on a droplet actuator that is at least partially bounded by filler fluid. For example, a droplet may be completely surrounded by filler fluid or may be bounded by filler fluid and one or more surfaces of the droplet actuator. Droplets may, for example, be aqueous or non-aqueous or may be mixtures or emulsions including aqueous and non-aqueous components. Droplets may take a wide variety of shapes; nonlimiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more surfaces of a droplet actuator.

"Droplet Actuator" means a device for manipulating droplets. For examples of droplet actuators, see U.S. Pat. No. 6,911,132, entitled "Apparatus for Manipulating Droplets by Electrowetting-Based Techniques," issued on Jun. 28, 2005 to Pamula et al.; U.S. patent application Ser. No. 11/343,284, entitled "Apparatuses and Methods for Manipulating Droplets on a Printed Circuit Board," filed on filed on Jan. 30, 2006; U.S. Pat. Nos. 6,773,566, entitled "Electrostatic Actuators for Microfluidics and Methods for Using Same," issued on Aug. 10, 2004 and 6,565,727, entitled "Actuators for Microfluidics Without Moving Parts," issued on Jan. 24, 2000, both to Shenderov et al.; Pollack et al., International Patent Application No. PCT/US2006/047486, entitled "Droplet-Based Biochemistry," filed on Dec. 11, 2006; and Roux et al., U.S. Patent Pub. No. 20050179746, entitled "Device for Controlling the Displacement of a Drop Between two or Several Solid Substrates," published on Aug. 18, 2005; the disclosures of which are incorporated herein by reference. Certain droplet actuators will include a substrate, droplet operations electrodes associated with the substrate, one or more dielectric and/or hydrophobic layers atop the substrate and/or electrodes forming a droplet operations surface, and optionally, a top substrate separated from the droplet operations surface by a gap. One or more reference electrodes may be provided on the top and/or bottom substrates and/or in the gap. In various embodiments, the manipulation of droplets by a droplet actuator may be electrode mediated, e.g., electrowetting mediated or dielectrophoresis mediated or Coulombic force mediated. Examples of other methods of controlling fluid flow that may be used in the droplet actuators of the invention include devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and optoelectrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed in droplet actuators of the invention.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; condensing a droplet from a vapor; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to size of the resulting droplets (i.e., the size of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. In various embodiments, the droplet operations may be electrode mediated, e.g., electrowetting mediated or dielectrophoresis mediated.

"Filler fluid" means a fluid associated with a droplet operations substrate of a droplet actuator, which fluid is sufficiently immiscible with a droplet phase to render the droplet phase subject to electrode-mediated droplet operations. The filler fluid may, for example, be a low-viscosity oil, such as silicone oil. Other examples of filler fluids are provided in International Patent Application No. PCT/US2006/047486, entitled, "Droplet-Based Biochemistry," filed on Dec. 11, 2006; International Patent Application No. PCT/US2008/072604, entitled "Use of additives for enhancing droplet actuation," filed on Aug. 8, 2008; and U.S. Patent Publication No. 20080283414, entitled "Electrowetting Devices," filed on May 17, 2007; the entire disclosures of which are incorporated herein by reference. The filler fluid may fill the entire gap of the droplet actuator or may coat one or more surfaces of the droplet actuator. Filler fluid may be conductive or non-conductive.

The terms "top" and "bottom" are used throughout the description with reference to the top and bottom substrates of the droplet actuator for convenience only, since the droplet actuator is functional regardless of its position in space.

When a given component, such as a layer, region or substrate, is referred to herein as being disposed or formed "on" another component, that given component can be directly on the other component or, alternatively, intervening components (for example, one or more coatings, layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating to particular methods of material transport, deposition, or fabrication.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

5 BRIEF DESCRIPTION OF THE DRAWINGS

FIGS. 13, 14, 15, 16, 17, 18, 19, and 20 are flowcharts illustrating a method of conducting droplet operations, according to exemplary embodiments of the invention.

Figure 21:
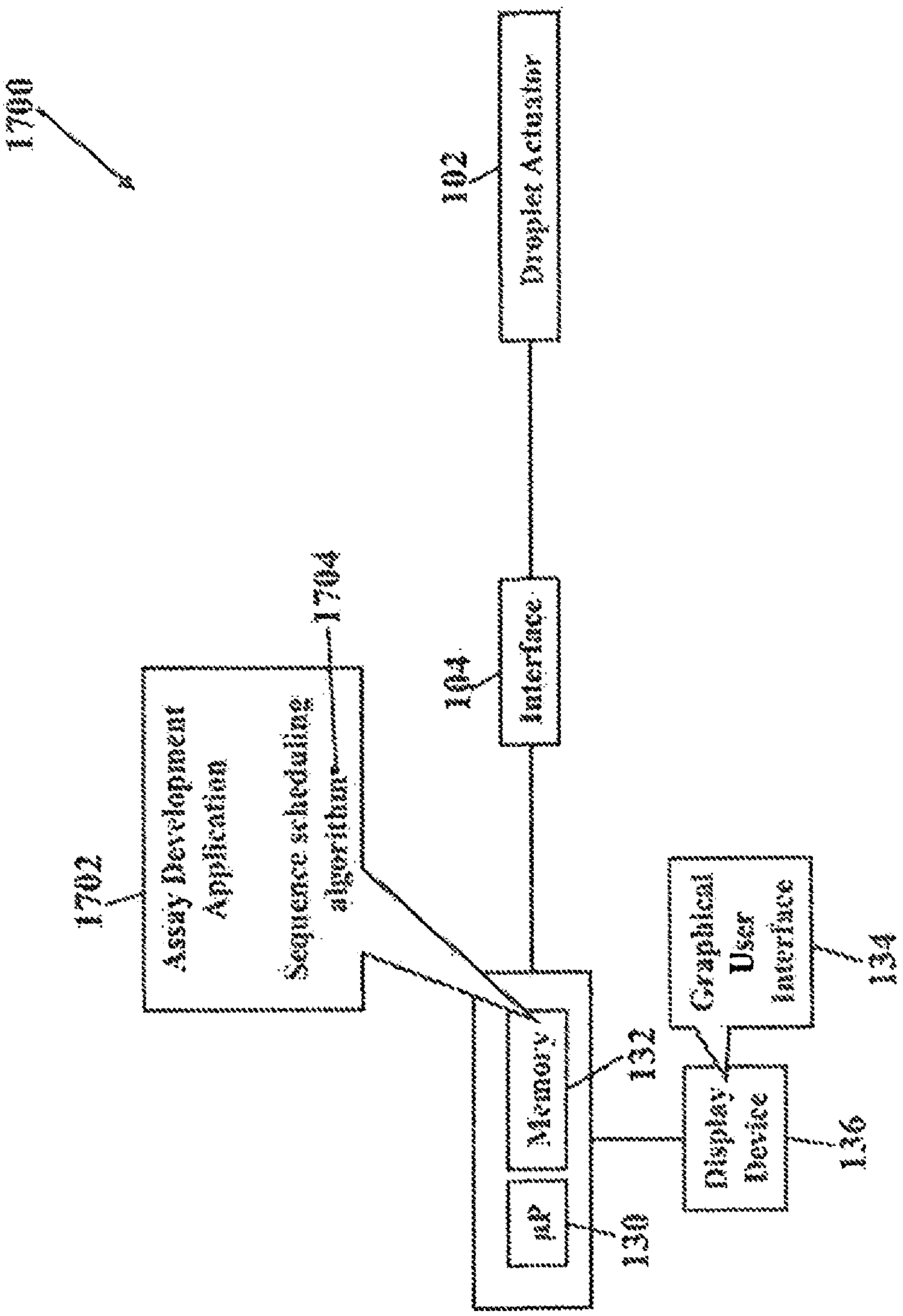
Figure 22:
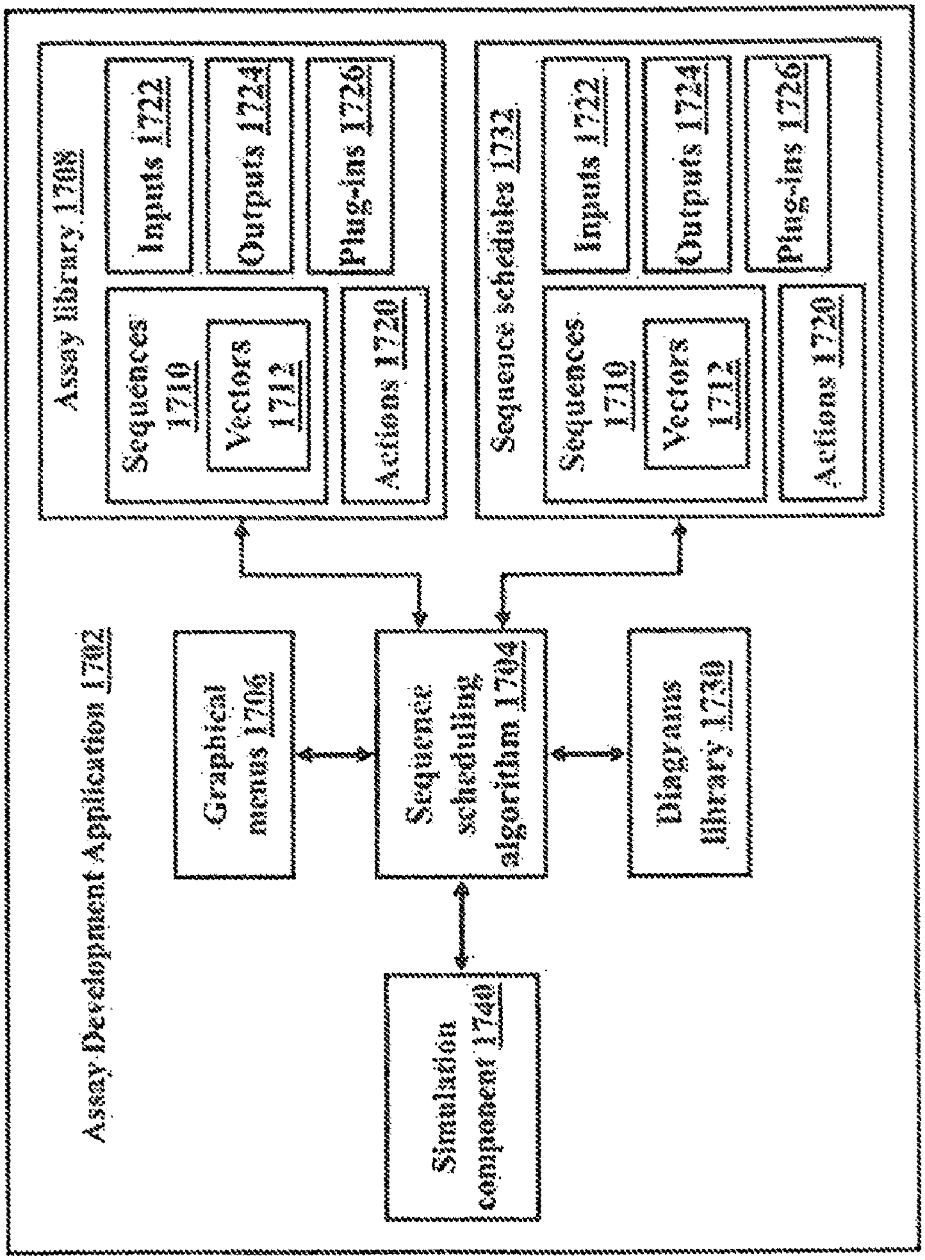

FIGS. 21 and 22 are block diagrams illustrating an assay development system, according to exemplary embodiments.

FIG. 23 is a schematic illustrating a dispense sequence, according to exemplary embodiments.

FIG. 24 is a schematic illustrating a sequence schedule, according to exemplary embodiments.

Figure 25:
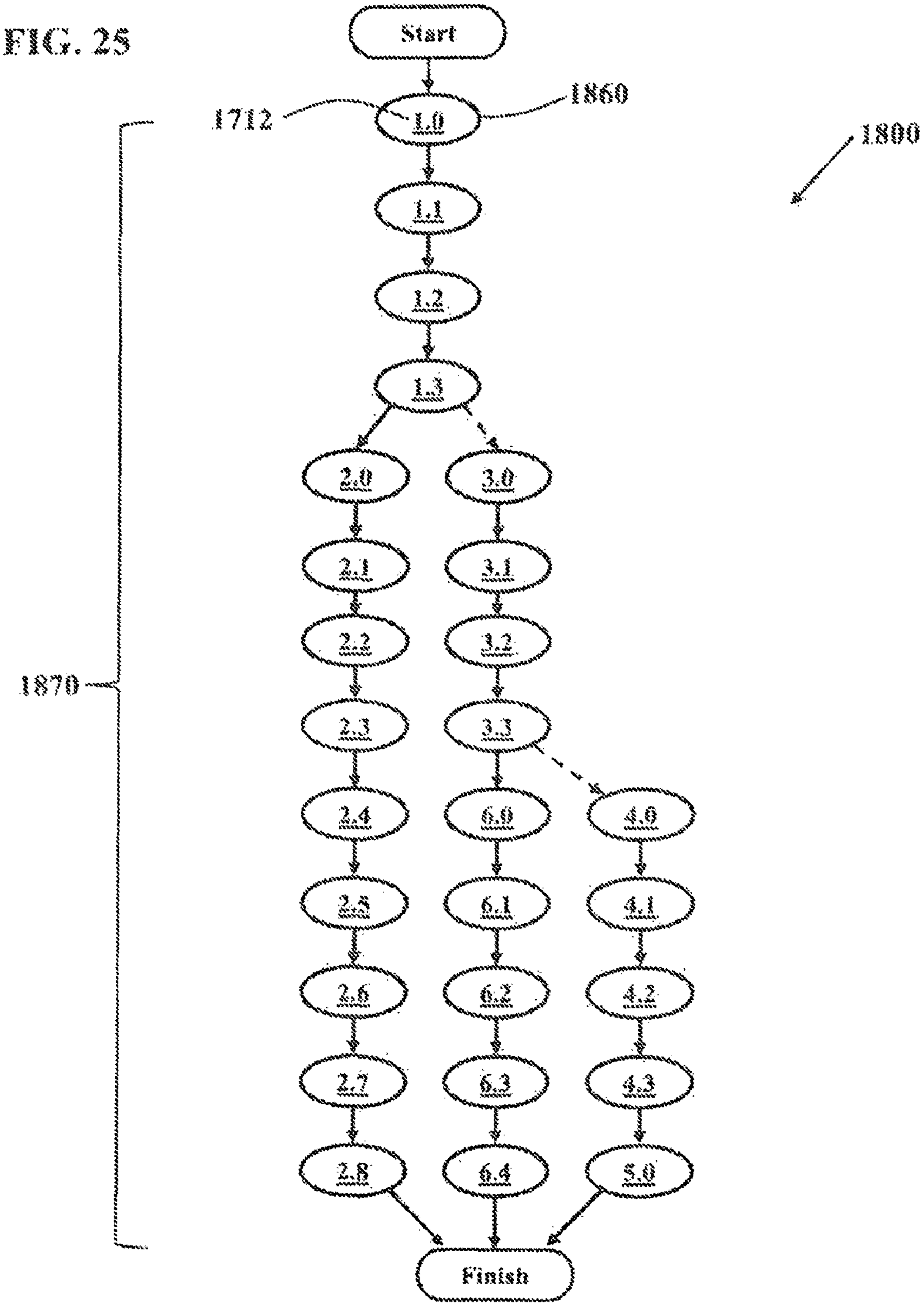
Figure 26:
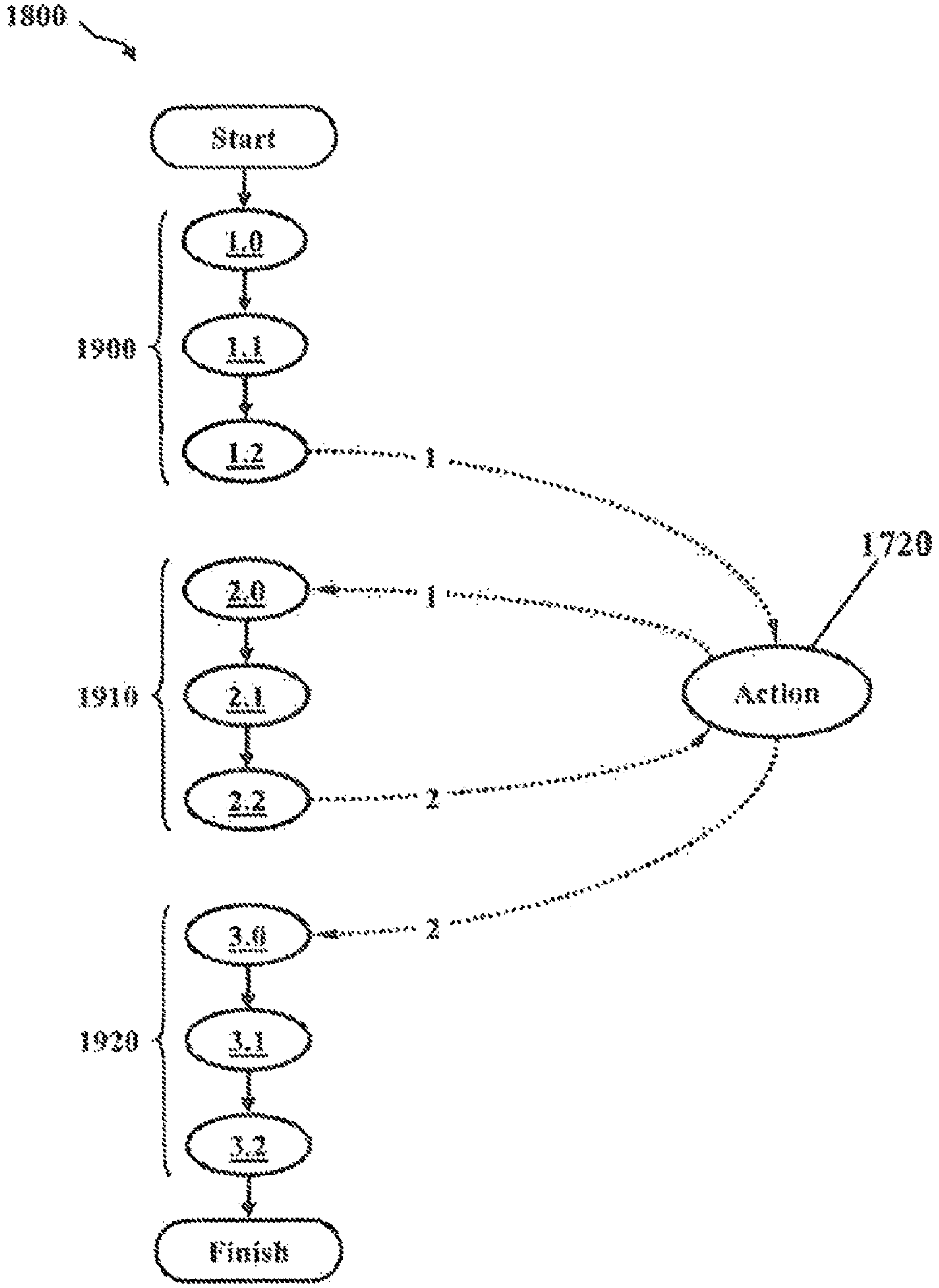

FIGS. 25 and 26 are nodal flowcharts, according to exemplary embodiments.

FIGS. 27, 28, 29, and 30 are screenshots of graphical user interfaces, according to exemplary embodiments.

FIGS. 31A, 31B, 31C, and 31D are schematics illustrating follow-up states, according to exemplary embodiments.

Figures 32, 32A, 32B, 32C:
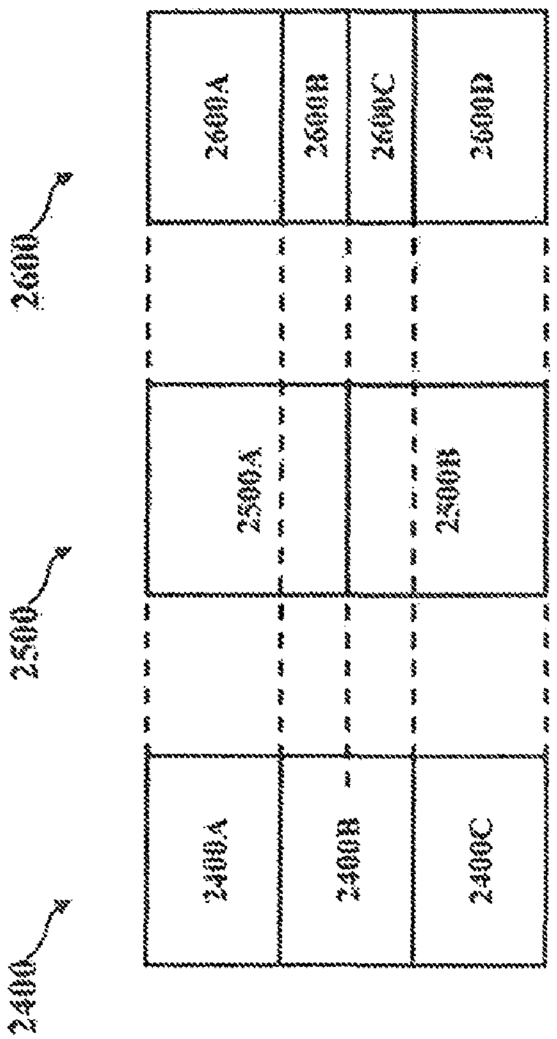

FIGS. 32A, 32B, and 32C are schematics illustrating out-of-sync sequences, according to exemplary embodiments.

FIGS. 33, 34, 35, 36, 37, and 38 are flowcharts illustrating a method for simulating an assay, according to exemplary embodiments.

Figure 39:
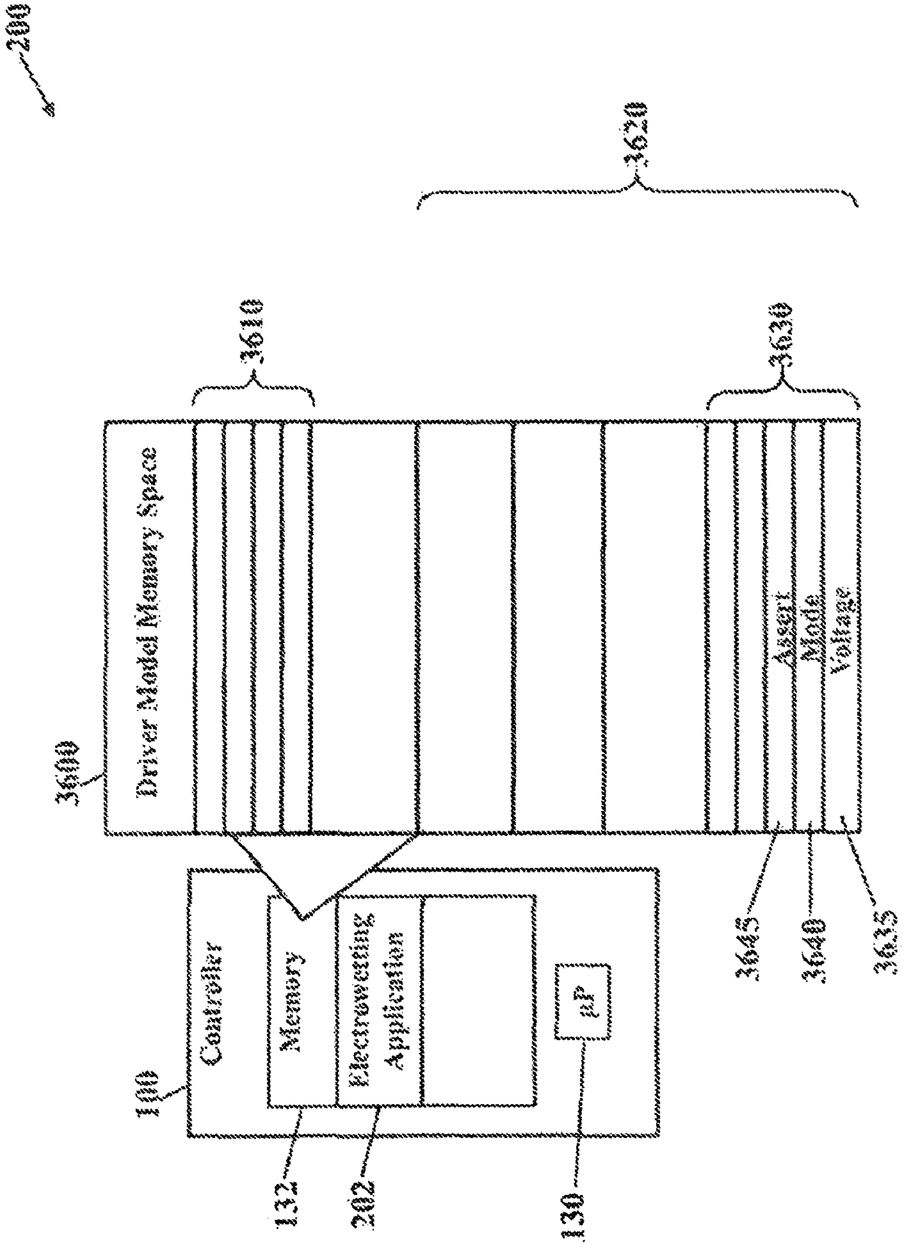

FIG. 39 is a schematic illustrating a driver model memory space, according to exemplary embodiments.

Figure 40:
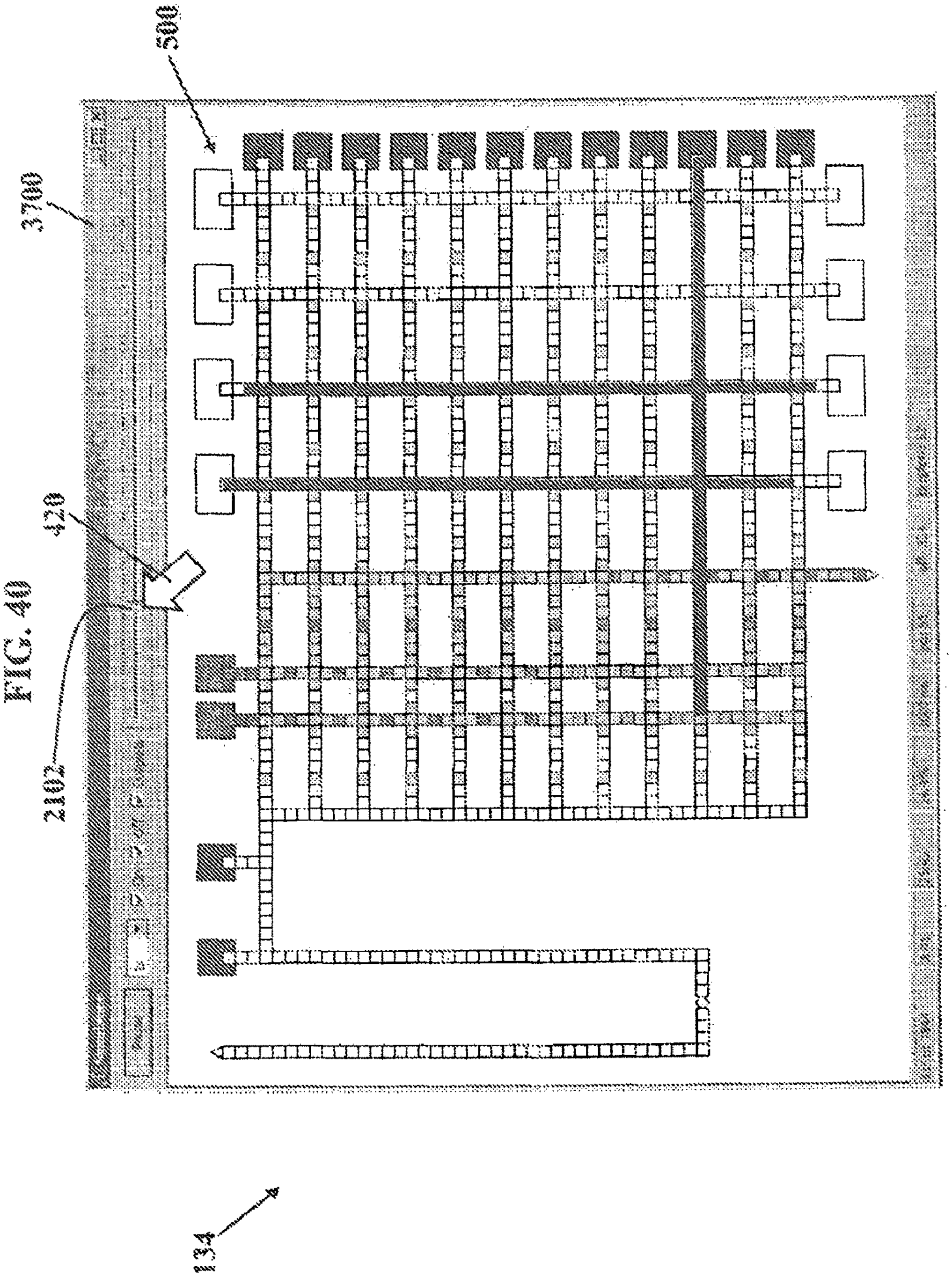
Figure 41:
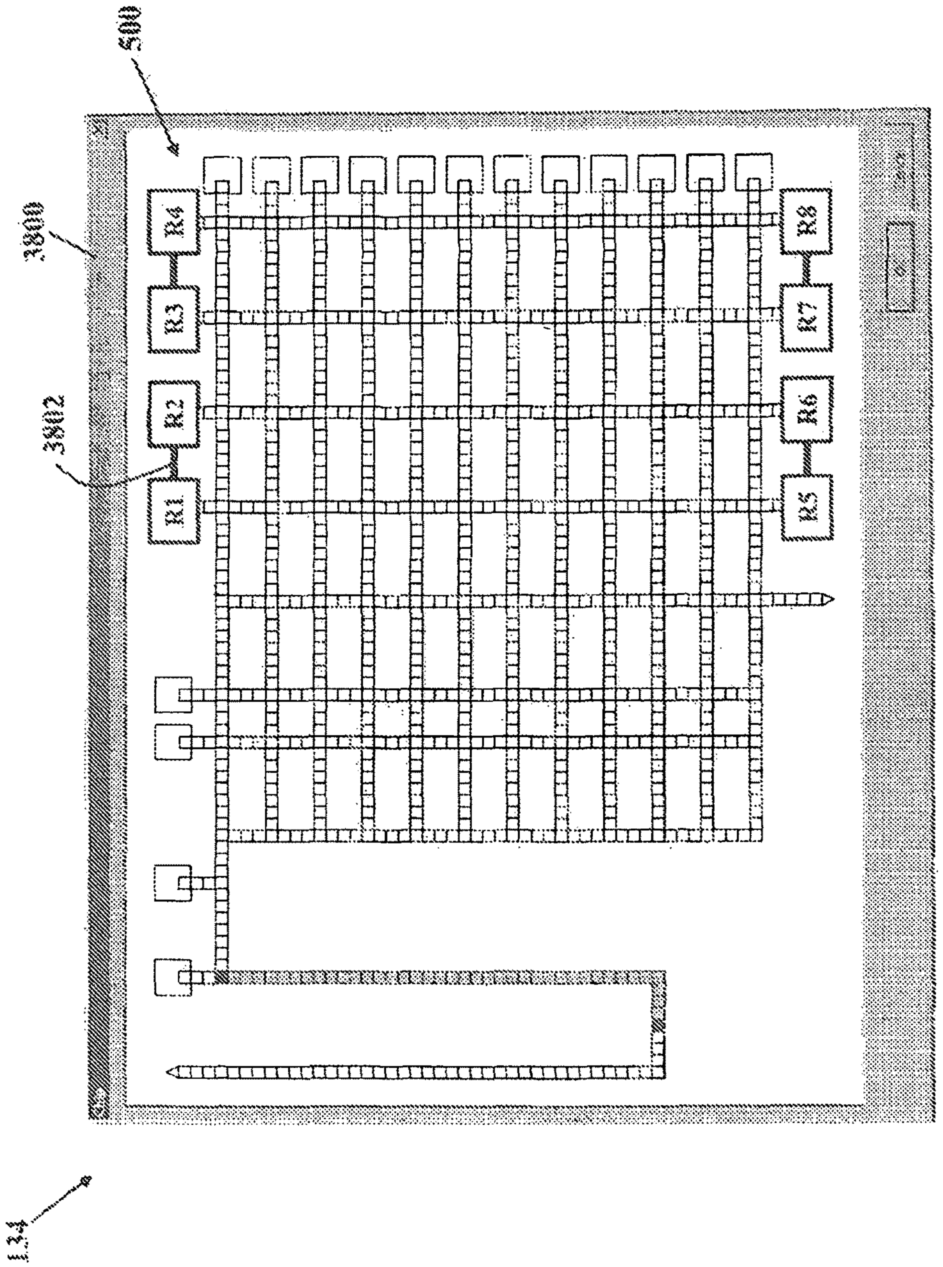

FIGS. 40, 41, and 42 are screenshots of another graphical user interface, according to exemplary embodiments.

Figure 43:
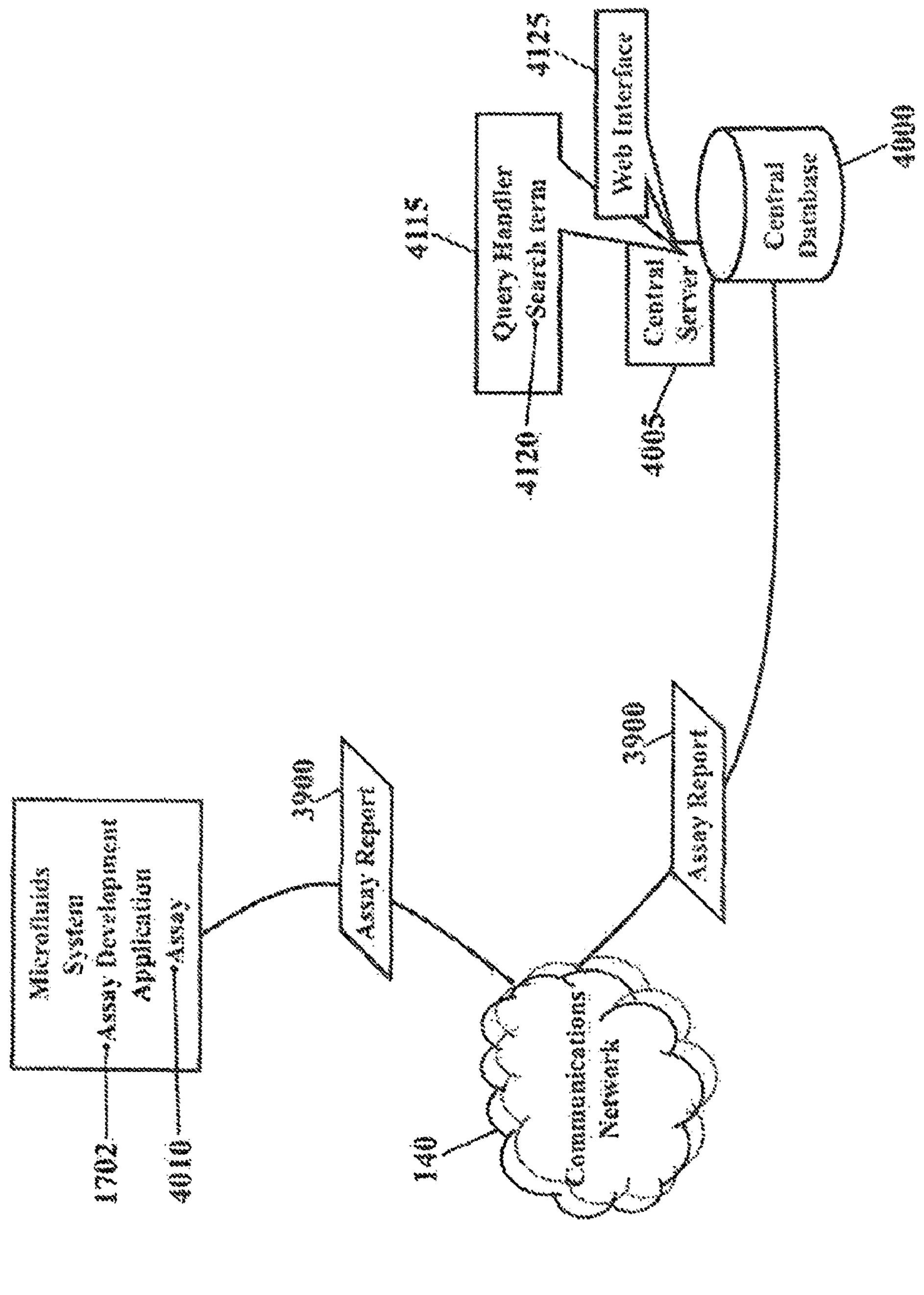

FIG. 43 is a schematic illustrating centralized storage for assay reports, according to exemplary embodiments.

6 DESCRIPTION

The present invention provides modified droplet actuator systems, software, and software-executed methods for use in droplet actuator operation and droplet actuator systems that are configured and programmed to execute such software. An aspect of the software components of the invention is an interface description file for each hardware component of a microfluidics system that allows hardware components to be changed without modifying the program for performing droplet operations protocols. Another aspect of the software components of the invention is the establishment of electrode-to-electrode relationships and other aspects of droplet actuator configurations, which may be used when programming droplet operations protocols. Another aspect of the software components of the invention is a physical design library of predefined electrode elements that may be used by a droplet actuator designer when constructing a layout of electrodes. Another aspect of the software components of the invention is a droplet actuator description file that contains the physical and electrical description of the droplet actuator. Another aspect of the software components of the invention is a router component for determining routes of droplet operations in a droplet actuator. Another aspect of the software components of the invention is the use of tri-state vectors for programming sequences in a droplet actuator. Still other aspects will be apparent from the ensuing description of the invention.

Figure 1:
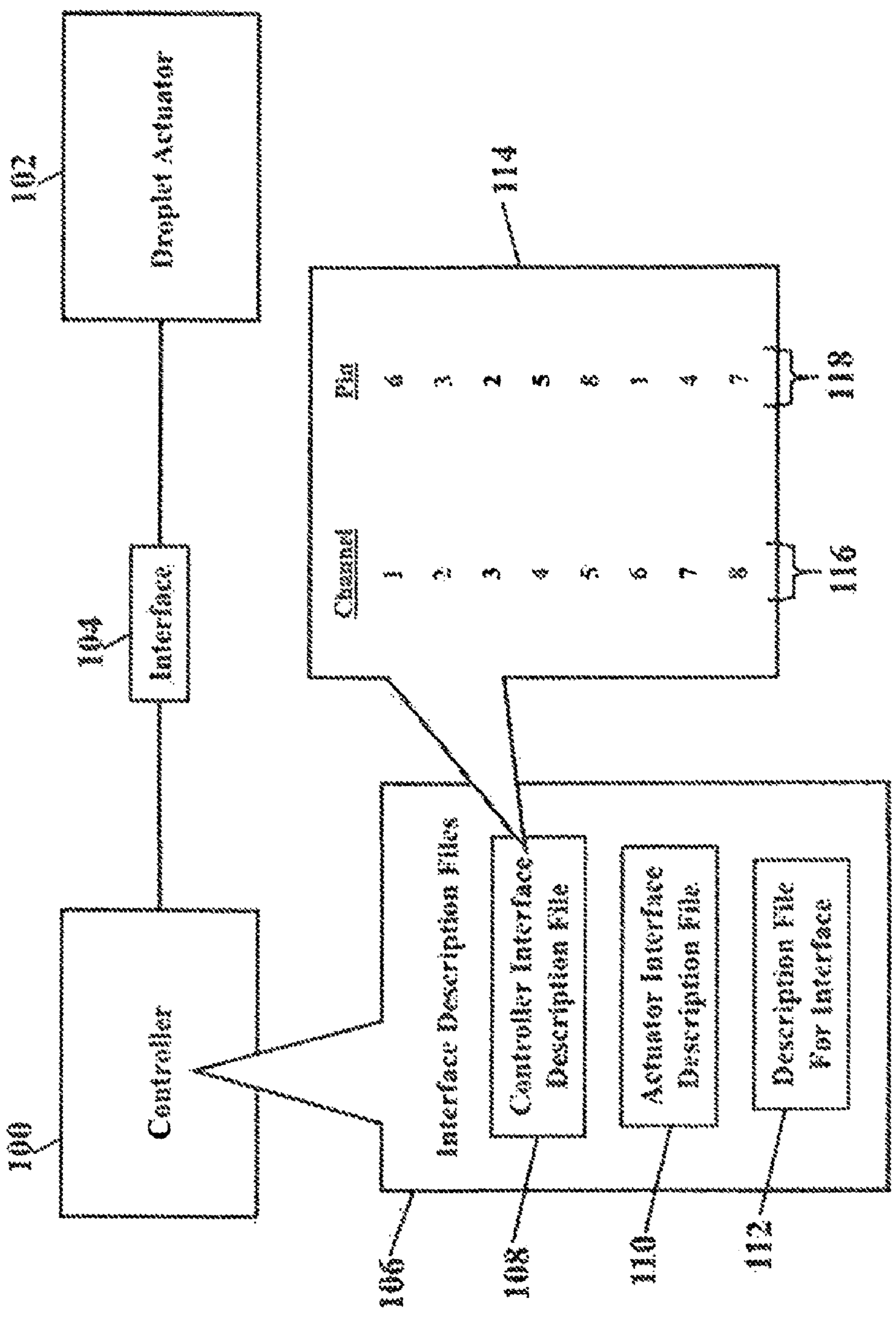
FIG. 1 is a simplified schematic illustrating an operating environment for the invention.

FIG. 1 is a simplified schematic illustrating an operating environment. A controller 100 communicates with a droplet actuator 102 via an interface 104. The controller 100 may be a component of any computer, server, lab or diagnostic equipment, and/or communications device. Because the controller 100 may be a component of any processor-controlled device, the controller 100 is generically illustrated. The droplet actuator 102 may be any device that performs droplet operations. As those of ordinary skill in art understand, there are many types of droplet actuators. Some droplet actuators electrically manipulate droplets, some utilize acoustic waves, some use dielectrophoresis, and others use ultrasound or acoustic energy. Because the droplet actuator 102 may be of any design, the droplet actuator 102 is also generically illustrated. The interface 104, too, may be any hardware component or software application that provides an interface between the controller 100 and the droplet actuator 102. The interface 104 is thus also generically illustrated.

The components illustrated in FIG. 1 may be a mix of manufacturers, models, and even different operating principles. Some combinations of the controller 100, the interface 104, and the droplet actuator 102 may have communications or configuration problems, and some combinations may even be incompatible. That is, the controller 100, the interface 104, and the droplet actuator 102 may not "talk" to each other, thus degrading the droplet operations performed by the droplet actuator 102. The controller 100, for example, has logical data channels that correspond to a physical input/output ("I/O") pin assignment. The droplet actuator 102 and the interface 104 also have their respective physical input/output pin assignments. If these pin assignments are mismatched, the controller 100, the interface 104, and/or the droplet actuator 102 may not correctly perform the desired droplet operations.

Exemplary embodiments overcome any incompatibilities. Exemplary embodiments utilize one or more interface description files 106 to ensure that the controller 100, the interface 104, and/or the droplet actuator 102 perform the desired droplet operations. The interface description files 106 translate inputs to outputs. A controller interface description file 108, for example, describes the logical and physical inputs/outputs to/from the controller 100. An actuator interface description file 110 describes the logical and physical inputs/outputs to/from the droplet actuator 102. Similarly, a description file 112 may also describe the logical and physical inputs/outputs to/from the interface 104. The interface description files 106, in other words, map inputs to outputs, whether logical or physical. FIG. 1, for example, illustrates the controller interface description file 108 as a table 114 that associates, maps, or otherwise relates logical channels 116 to physical pin assignments 118. This mapping transforms the controller's logical inputs/outputs into the corresponding input/output pin assignments. The actuator interface description file 110 performs a similar mapping of inputs (whether logical or physical) to outputs (whether logical or physical) for the droplet actuator 102. The description file 112 for the interface 104 performs a similar mapping transformation. The interface description files 106 thus permit any droplet actuator 102 to be used with any controller 100 and/or with any interface 104. That is, the interface description files 106 allow any component to be interchanged with another manufacturer or model, regardless of each component's logical and physical requirements. All that is needed is a component's corresponding interface description file that maps the component's inputs to outputs, whether logical or physical. Once a logical channel 116 is mapped to a physical pin assignment 118 for the droplet actuator 102, for example, any droplet operation may be communicated to the droplet actuator via the corresponding physical pin 118.

The interface description files may be locally or remotely maintained. FIG. 1 illustrates the interface description files 106 as all being locally stored within the controller 100. As later paragraphs will explain, though, each component's corresponding interface description file 106 may be locally stored or even remotely stored at any location within a communications network.

Figure 2:
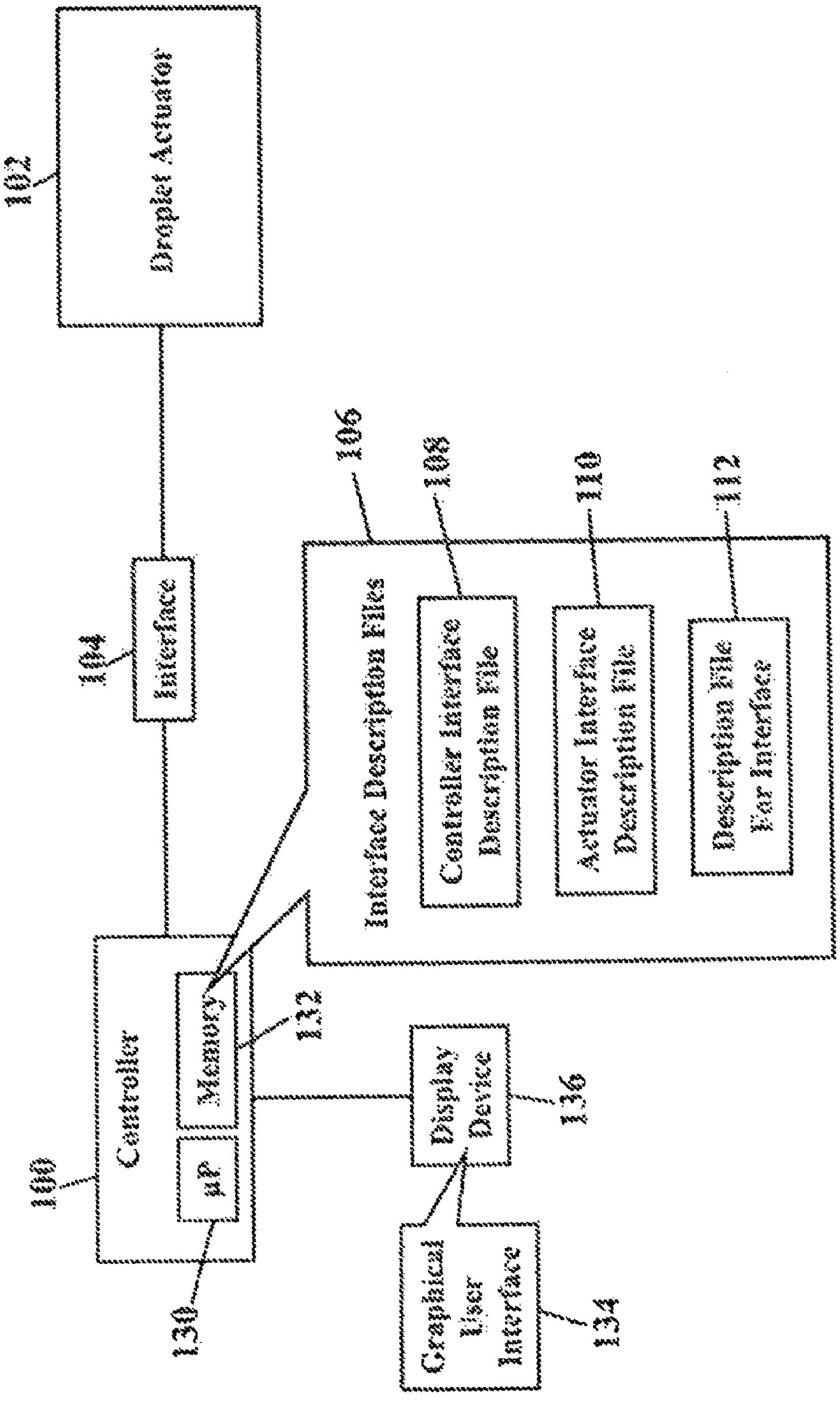
FIGS. 2 and 3 are more detailed schematics illustrating the operating environment.

FIG. 2 is a more detailed schematic illustrating the operating environment. The controller 100 includes a processor 130 (e.g., "μP"), application specific integrated circuit (ASIC), or other component that executes the controller interface description file 108 stored in a memory 132. The controller interface description file 108 may cause the processor 130 to produce a graphical user interface 134. The graphical user interface 134 is illustrated as being visually produced on a display device 136, yet the graphical user interface 134 may also have audible features. FIG. 2 also illustrates the actuator interface description file 110 and the description file 112 as being locally stored in the memory 132 and as being executed by the processor 130. The graphical user interface 134 may also include objects, controls, windows, dialogs, and/or data that are visually produced by the actuator interface description file 110 and/or by the description file 112. Because the interface description files 106 translate inputs to outputs, and vice-versa, any manufacturer's droplet actuator 102 may be used with any controller 100 and with any interface 104.

Figure 3:
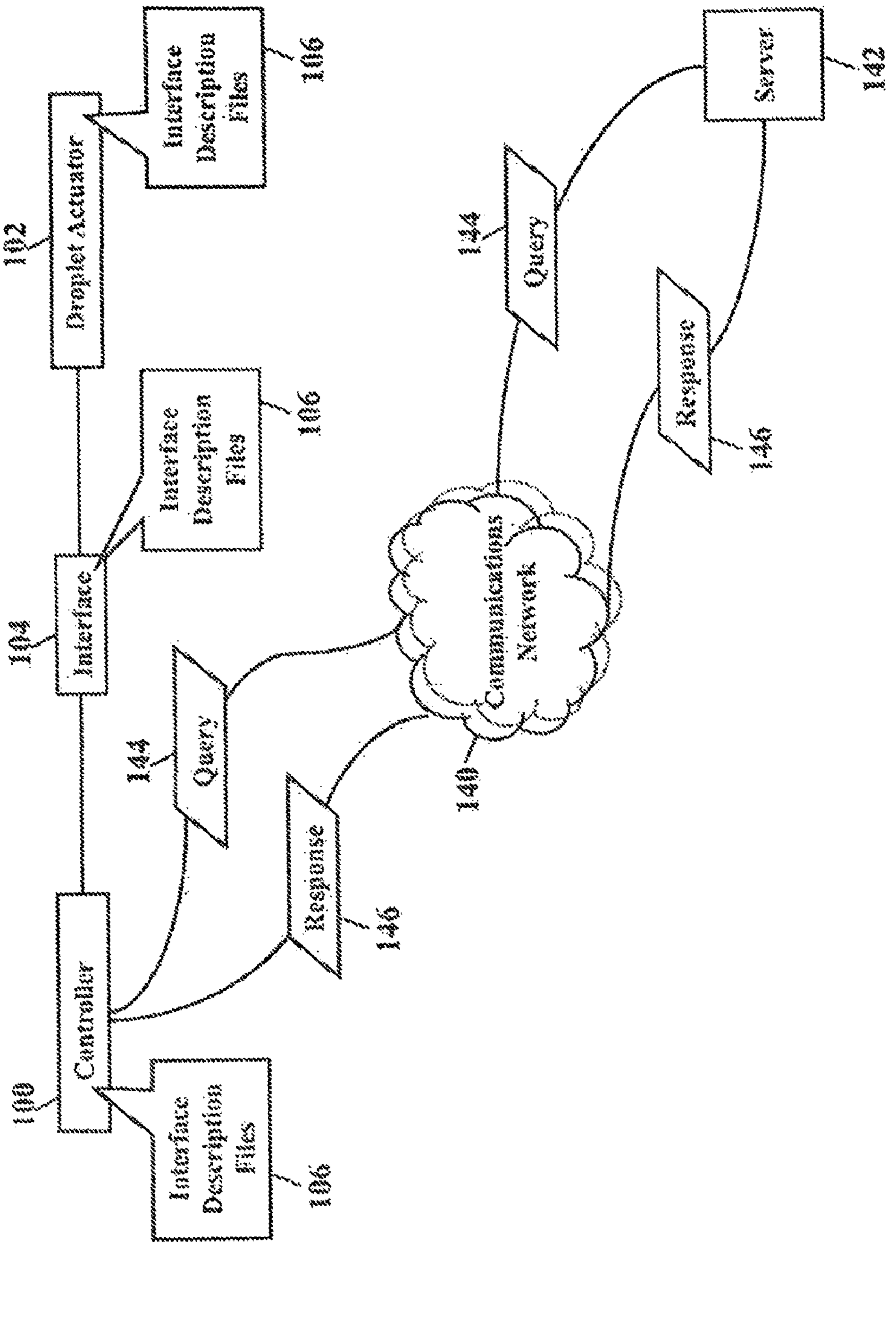

FIG. 3 is another detailed schematic illustrating more operating environments. Here the one or more interface description files 106 may be locally and/or remotely maintained within any component and/or at any network location. FIG. 3, for example, illustrates that the interface description files 106 may be stored in memory of the interface 104 and/or of the droplet actuator 102. Any of the interface description files 106 may be additionally or alternatively stored and accessed via a communications network 140. The interface description files 106, for example, may be remotely located in a server 142. Queries may be sent to the server 142 and the interface description files 106 may be accessed, retrieved, and/or downloaded to the controller 100, to the droplet actuator 102, and/or to the interface 104. FIG. 3 illustrates a query 144 routing from the controller 100 to the server 142 via the communications network 140. A response 146 routes from the server 142 to the controller 100 via the communications network 140. The interface 104 and/or the droplet actuator 102 may utilize a similar query and response scheme to obtain any of the interface description files 106. The interface description files 106 may thus be accessed and executed by the controller 100, by the droplet actuator 102, and/or by the interface 104. The invention thus permits any manufacturer's droplet actuator 102 to be used with any controller 100 and with any interface 104, regardless of the physical location of any of the interface description files 106.

Figure 4:
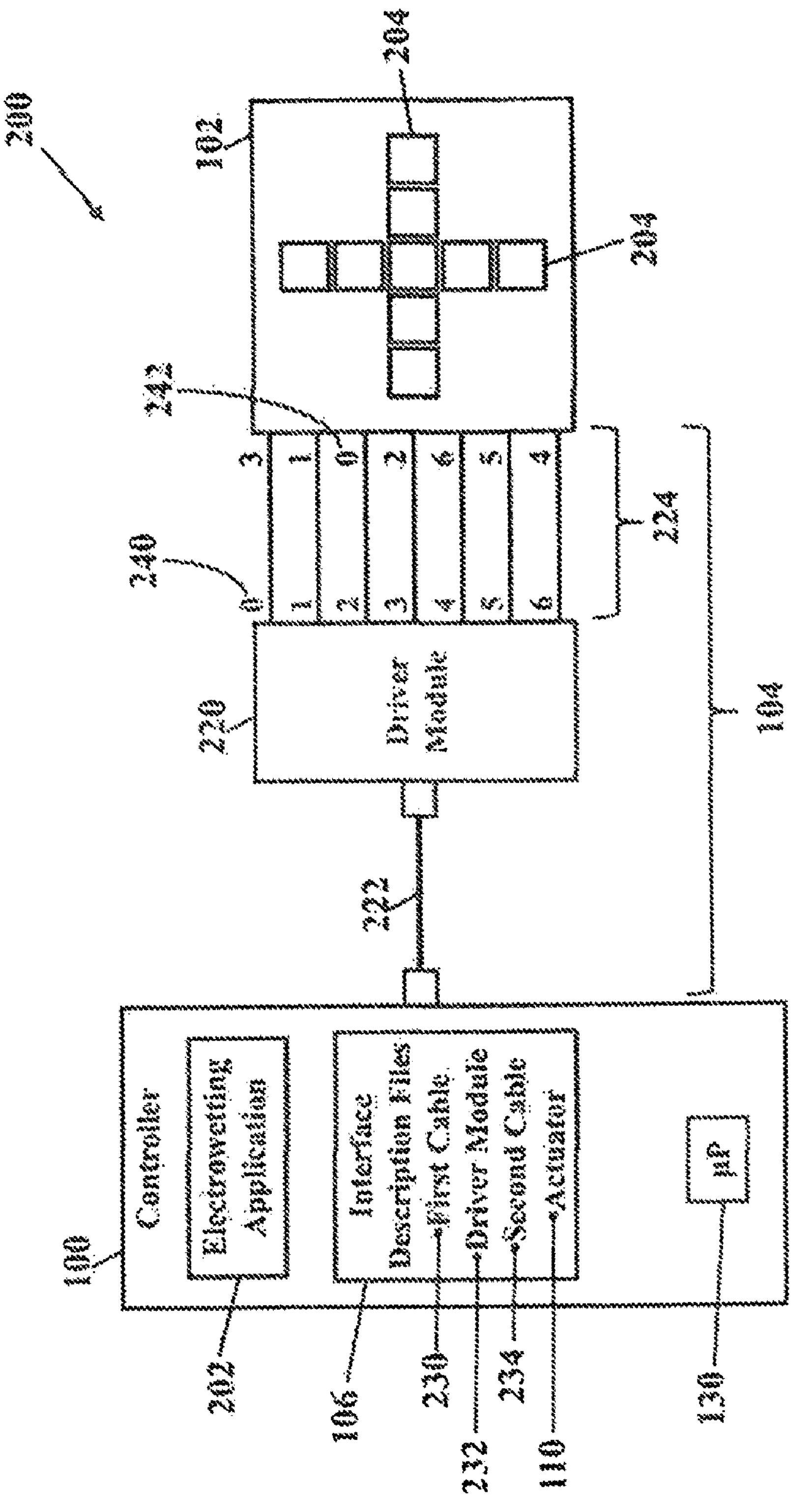
FIGS. 4 and 5 are schematics illustrating a microfluidics system incorporating interface description files.
Figure 5:
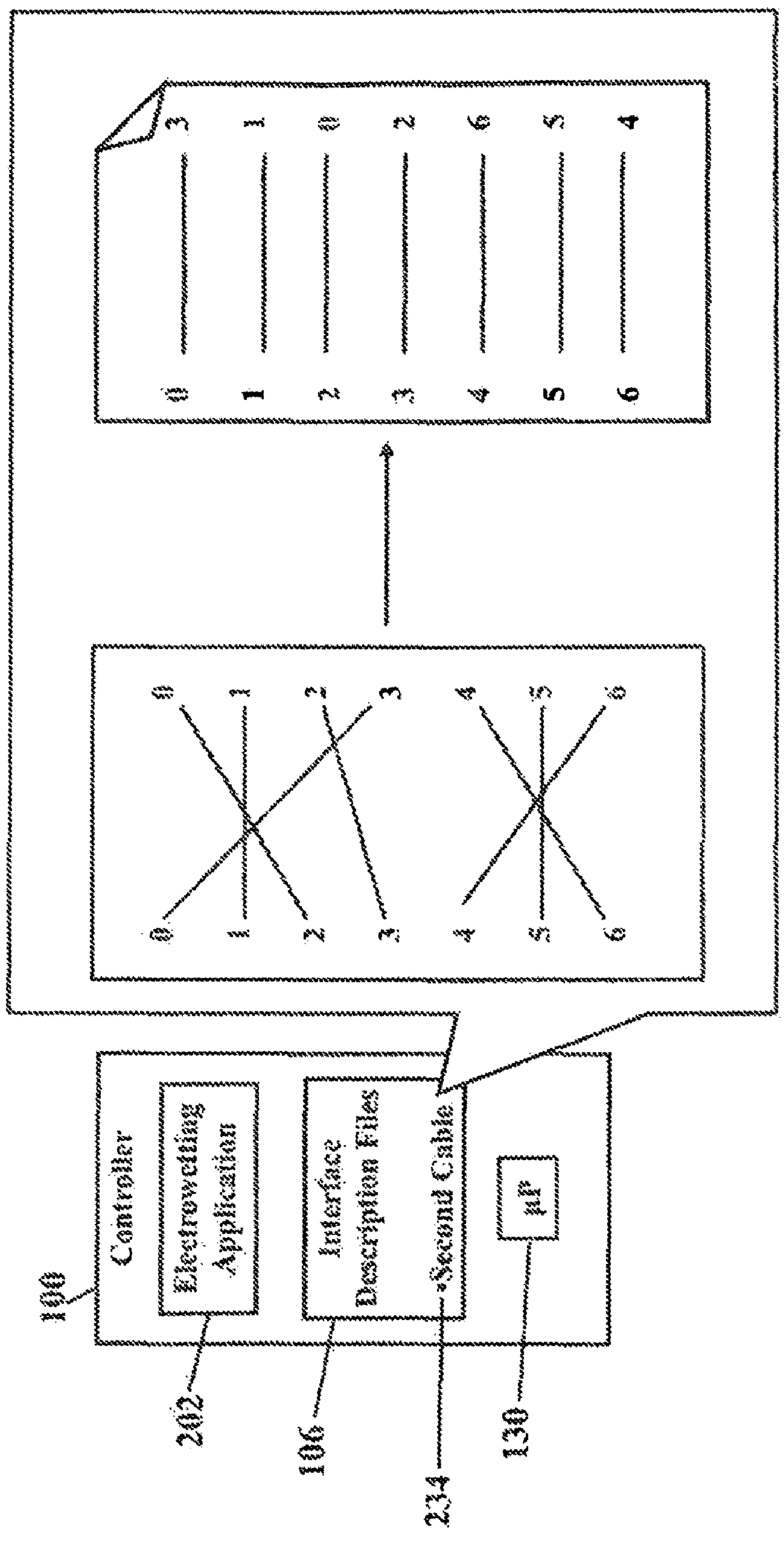

FIGS. 4 and 5 are schematics illustrating other operating environments. FIG. 4 illustrates a functional block diagram of an example of a microfluidics system 200 that includes the interface description files 106. Here again the interface description files 106 use software to translate the logical inputs/outputs to the physical inputs/outputs of the microfluidics system 200. The microfluidics system 200 may include the controller 100 that executes an electrowetting application 202. The electrowetting application 202 may be stored in the memory (illustrated as reference numeral 132 in FIG. 2) of the controller 100, and the processor 130 communicates with the memory 132 and at least partially executes the electrowetting application 202. The electrowetting application 202 comprises processor-executable code or instructions for programming one or more droplet operations protocols that are to be executed by the droplet actuator 102. The droplet actuator 102 may comprise an arrangement of droplet operations electrodes 204 (such as electrowetting electrodes) that are configured for conducting one or more droplet operations. FIG. 4 also illustrates a driver module 220. The driver module 220 provides control signals to the droplet actuator 102. As earlier paragraphs explained, the interface description files 106 allow any manufacturer's droplet actuator 102 to be described and used by the microfluidics system 200. Because the driver module 220 may be high- or low-voltage, the driver module 220 is generically illustrated.

FIG. 4 also illustrates the interface 104. The interface 104 may be any software or hardware interface between the controller 100 and the droplet actuator 102. FIG. 4, for example, illustrates a first cable 222 and a second cable 224. The first cable 222 provides an interface between the controller 100 and the driver module 220. The first cable 222 connects at one end to the controller 100, and a second end physically connects to the driver module 220. The second cable 224 provides another, second interface between the driver module 220 and the droplet actuator 102. The second cable 224 connects at one end to the driver module 220, and a second end physically connects to the droplet actuator 102. The second cable 224 is illustrated as having a 7-pin connector at each end.

Each hardware component of microfluidics system 200 has a certain physical input/output ("I/O") pin assignment. The controller 100, for example, may have physical input/output pins, and each pin has a specific logical and physical assignment. The droplet actuator 102 may also have physical input/output pins, and each pin may have a specific logical/physical assignment for connecting the control signals from the driver module 220 to specific droplet operations electrodes 204. The first cable 222 and the second cable 224, likewise, may have assignments for physical pins at each end. All these pin assignments, though, may differ. Different manufacturers and different models of the controller 100, the first cable 222, the driver module 220, the second cable 224, and the droplet actuator 102 may have different logical and physical pin assignments. If any of these pin assignments are mismatched, the performance of the microfluidics system 200 may be compromised.

The interface description files 106 help resolve the pin assignments. Each component's respective interface description file 106 helps translate the component's logical inputs and outputs to the component's physical inputs and outputs. A first cable interface description file 230, for example, describes the logical and physical inputs/outputs of the first cable 222. A driver module interface description file 232 describes the logical and physical inputs/outputs of the driver module 220. A second cable interface description file 234 describes the logical and physical inputs/outputs of the second cable 224. The actuator interface description file 110 describes the logical and physical inputs/outputs to/from the droplet actuator 102. Each interface description file 106 helps transform each component's inputs and outputs. The interface description files 106 thus permit the electrowetting application 202 to correctly conduct droplet operations, regardless of any component's manufacturer, model, and/or logical and physical requirements.

FIGS. 4 and 5 illustrate physical pin assignments. FIG. 4 illustrates differing pin assignments between the second cable 224 and the driver module 220. FIG. 4 illustrates the second cable 224 having seven (7) input and output pins. Depending on the cable design, though, pin #0 at the first end 240 of the second cable 224 (that connects to the driver module 220) may, or may not, be connected to pin #0 at the second end 242 (that connects to the droplet actuator 102, which corresponds to a certain I/O pin of the droplet actuator 102). Consequently, FIG. 5 illustrates a mapping that is performed by the second cable interface description file 234. Here the second cable interface description file 234 associates, maps, or otherwise relates the input pins of the second cable 224 to the output pins of second cable 224. In this way, the second cable interface description file 234 provides a software translation that may be used to map the logical I/O that is defined in the electrowetting application software 202 to the physical I/O of the second cable 224 and, ultimately, to the I/O of the droplet actuator 102.

Each component of the microfluidics system 200 may thus have its own corresponding hardware component-specific interface description file 106. In the event that a certain hardware component is replaced by a different hardware component that has a different physical I/O assignment, a corresponding interface description file 106 is installed and accessed by the electrowetting application 202. For example, when the droplet actuator 102 is replaced with a different droplet actuator of a different design, a new actuator interface description file 110 is loaded into the memory (illustrated as reference numeral 132 in FIG. 2) of the controller 100. The new actuator interface description file 110 corresponds to the different droplet actuator and describes the associated pin assignments. Because only the actuator interface description file 110 need be changed, the invention avoids the need for modifying the software code of the electrowetting application 202.

Suppose, for example, that the electrowetting application 202 is used to perform an assay protocol. Any controller 100, first cable 222, driver module 220, second cable 224, or droplet actuator 102 may be used to perform the assay protocol, as long as the electrowetting application 202 has access to each component's corresponding interface description file 106. Exemplary embodiments thus reduce or even avoid the need to alter the code within the electrowetting application 202. The electrowetting application 202 may be generically written and, instead, rely on an accurate interface description file 106 for each component within the microfluidics system 200. Moreover, exemplary embodiments also reduce or even avoid the need for installing custom hardware, such as a custom cable, that corresponds to the I/O of the driver module 220 and/or the droplet actuator 102. The interface description files 106 thus isolate the electrowetting application 202, which is used for programming droplet operations protocols, from different hardware component designs.

The information within each interface description file 106 may be stored and accessed in any format. The hardware component-specific information within each interface description file 106 is not limited to a file format. Each component's hardware-specific information may be stored and retrieved in any way. In one example, software objects may be generated rather than the interface description files 106. The hardware component-specific information may be in any file format (e.g., the interface description file 106) for long term storage.

Figure 6:
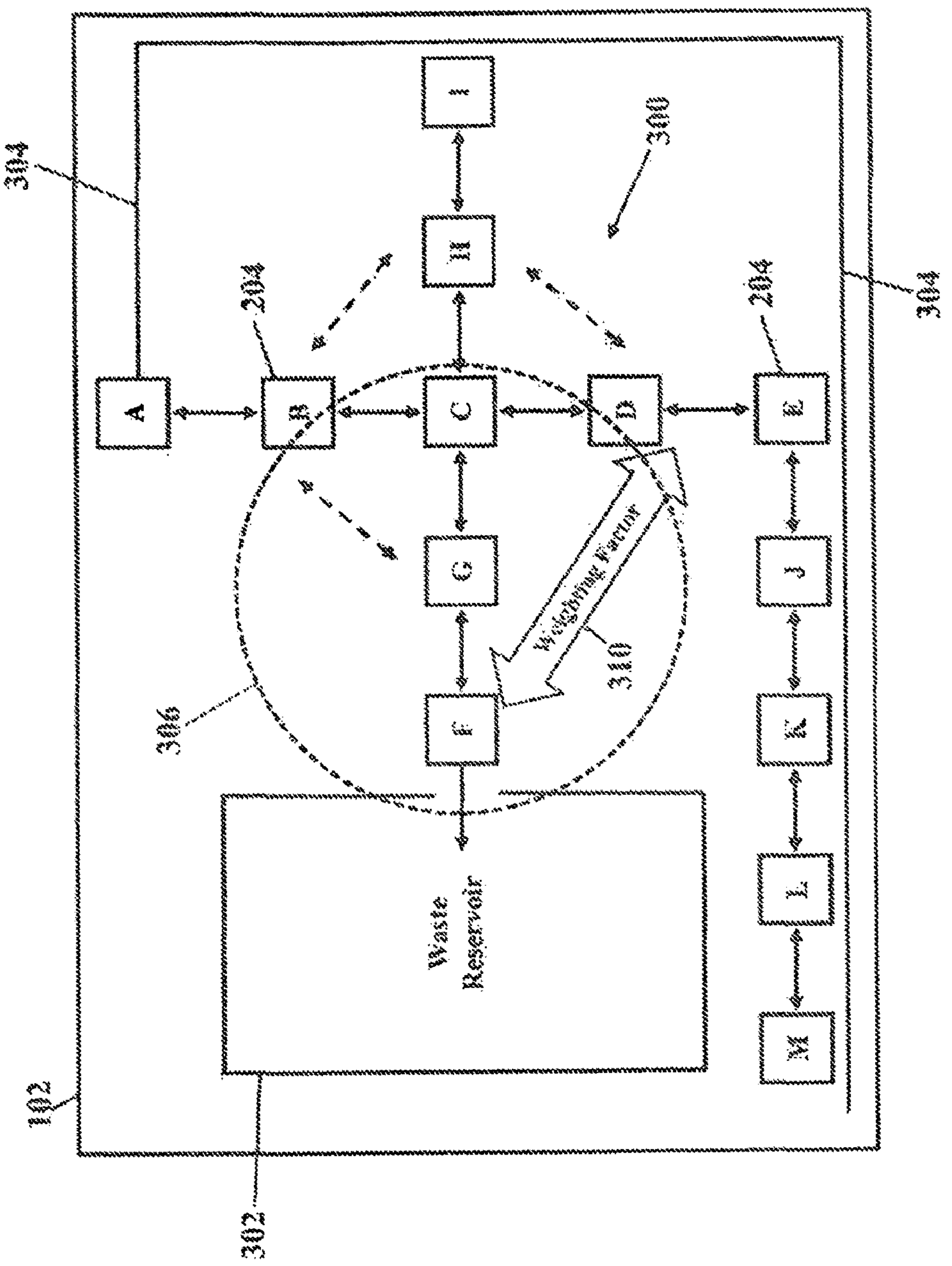
FIG. 6 is a schematic illustrating a top view of an electrode configuration within a droplet actuator.

FIG. 6 is a schematic illustrating a top view of an electrode configuration 300 within the droplet actuator 102. FIG. 6 illustrates examples of relationships that may be defined when programming droplet operations protocols. The electrode configuration 300 includes, for example, one or more arrangements of the droplet operations electrodes 204 configured for conducting one or more droplet operations. FIG. 6 also illustrates that one or more of the droplet operations electrodes 204 may maneuver, or "feed," a droplet into, or from, a waste reservoir 302. Any relationship between any of the droplet operations electrodes 204 may be defined, as later paragraphs will explain. That is, electrode-to-electrode relationships within the droplet actuator 102 may be defined using software.

Relationships between electrodes 204, for example, may be directional. An electrode-to-electrode relationship may be "one-way" and/or "two-way." These relationships may be used in programming droplet operations protocols to allow and/or restrict certain droplet operations at certain electrodes and/or groups of electrodes and/or at certain points in time. The one-way and two-way relationships may be used to define an allowed direction of flow with respect to a certain electrode 204. If a certain electrode has a "one-way" relationship, for example, fluidic movement is only permitted in a single direction into or from the certain electrode. For example, the flow of droplet operations across droplet operations electrode 204F (the droplet operations electrode nearest to the waste reservoir 302) may be defined as one-way toward the waste reservoir 302. That is, a droplet is permitted to only flow from the droplet operations electrode 204F and into the waste reservoir 302. Fluid is not allowed, however, to flow from the waste reservoir 302 back to the droplet operations electrode 204F.

"Two-way" relationships may also be defined. A two-way relationship permits a droplet to flow in two directions across an electrode 204. A two-way relationship, in other words, permits fluidic movement into and from an electrode 204. Referring again to FIG. 6, droplet operations electrode 204K and, likewise, droplet operations electrode 204J may both be defined as two-way electrodes. This two-way relationship means that fluid is allowed to flow in any direction between droplet operations electrode 204K and droplet operations electrode 204J. Fluid may flow, for example, from droplet operations electrode 204K and into droplet operations electrode 204J. Fluid may also flow from droplet operations electrode 204J and into droplet operations electrode 204K.

Another electrode-to-electrode relationship is a "neighbor" relationship. With respect to a certain electrode 204, a neighbor electrode may be any immediately adjacent electrode. Droplet operations may be allowed directly between neighbor electrodes, i.e., a digital fluidic path may exist between neighbor electrodes. Again referring to FIG. 6, the droplet operations electrode 204C has, as "neighbors," electrodes 204B, 204D, 204H, and 204G. The neighbors of droplet operations electrode 204H are electrodes 204C and 204I, and the neighbors of droplet operations electrode 204E are electrodes 204D and 204J. Droplet operations electrode 204F has electrode 204G and the waste reservoir 302 as neighbors. The neighbor of droplet operations electrode 204M is electrode 204L. Other neighbor relations may likewise be defined for all the electrodes within the droplet actuator 102. (As another example, electrodes 204B and 204D may be defined as neighbors of electrode 204H.) Fluidic movement may be permitted, or prohibited, between any neighbor electrodes 204.

The "neighbor" relationship may also refer to location and connectivity. A neighbor electrode may be a physically adjacent electrode, but the neighbor electrode(s) may also imply electrical connectivity. That is, the (physical) neighbors of an electrode may determine where to a droplet may next travel. When a droplet needs to be restricted from moving to a particular electrode, the neighbor relationship may be altered or changed to implement that movement restriction. Geometrical relationships between electrodes, however, may be separately maintained for rendering the physical integrated circuit and need not explicitly contain adjacency information.

Another electrode-to-electrode relationship is an "interface" relationship. The concept of neighbor relationships may be extended to bridge electronic circuit chips. One chip, for example, may fluidically connect to another chip and may, therefore, define a neighbor relationship between electrodes on two different chips.

Another example of an electrode-to-electrode relationship is a "friend" relationship. With respect to a certain electrode, a "friend" electrode 204 is any electrode this is not immediately adjacent, but which when activated, may influence droplet operations at the certain electrode. Droplet operations may, or may not, be allowed directly between friend electrodes, i.e., a fluidic path may or may not exist between friend electrodes. For example, electrodes that are diagonally positioned from one another may be categorized as friend electrodes. Again referring to FIG. 6, the friends of droplet operations electrode 204G are electrodes 204B and 204D; the friends of droplet operations electrode 204B are 204G and 204H; the friends of droplet operations electrode 204H are 204B and 204C; the friends of droplet operations electrode 204D are 204G and 204H; and so on. Fluidic movement may be permitted, or prohibited, between any friend electrodes. The friend relationships were developed to help ensure that assertion of an electrode (e.g., friend) may not adversely affect a droplet sitting on a given electrode (e.g., the designer may not want to assert that electrode's friend). Friend relationships need not imply physical proximity.

The electrode-to-electrode relationships may also include one-way and two-way friends. An example of a one-way friend relationship is that the waste reservoir 302 may be a friend to both droplet operations electrode 204L and 204M, but, droplet operations electrodes 204L and 204M are not friends of the waste reservoir 302. When the waste reservoir 302 is activated, the force exerted by the waste reservoir 302 on droplets at operations electrodes 204L and 204M is enough to adversely influence the droplets. In other words, when the waste reservoir 302 is electrically activated, the waste reservoir 302 may electrically affect the droplet operations performed by droplet operations electrodes 204L and 204M. However, when the droplet operations electrodes 204L and/or 204M are electrically activated, their individual and/or combined energy is not sufficient to influence droplet operations at the waste reservoir 302. Because the droplet operations electrodes 204L and 204M may be disproportionate in size compared to the waste reservoir 302, the droplet operations electrodes 204L and 204M may have little or even negligible electrostatic effects at the waste reservoir 302.

Another example of a one-way friend relationship is provided. Droplet operations electrode 204A may be a friend to droplet operations electrodes 204I, 204E, 204J, 204K, 204L, and 204M; but, droplet operations electrodes 204I, 204E, 204J, 204K, 204L, and 204M may not be friends of droplet operations electrode 204A. This is because a control line 304 of droplet operations electrode 204A is routed in close proximity to droplet operations electrodes 204I, 204E, 204J, 204K, 204L, and 204M. Therefore, when the control line 304 is activated (to activate droplet operations electrode 204A), its energy may influence droplet operations at droplet operations electrodes 204I, 204E, 204J, 204K, 204L, and/or 204M. However, the energy of droplet operations electrodes 204I, 204E, 204J, 204K, 204L, and/or 204M, when activated, will not influence droplet operations at droplet operations electrode 204A because of the large distance therebetween. The control line 304 may thus electrically/electromagnetically affect droplet operations electrodes 204I, 204E, 204J, 204K, 204L, and/or 204M, but these same electrodes may not affect the control line 304. If an applied voltage at any of the electrodes 204I, 204E, 204J, 204K, 204L, and/or 204M increases, though, any of these electrodes may affect the control line 304. Similarly, a low-enough voltage or current in the control line 304 may produce negligible effects at the electrodes 204I, 204E, 204J, 204K, 204L, and/or 204M.

Relationships, though, are likely more complex. FIG. 6 illustrates a simple electrode configuration 300 within the droplet actuator 102. A more complex design, having hundreds or thousands of electrodes, may require more complex definitions of electrode-to-electrode relationships. Moreover, the droplet actuator 102 may have several layers of devices, conductors, and ground planes, and so a more complex electrode configuration may require a more complex definition of electrode-to-electrode relationships.

Friends may thus influence droplet operations. FIG. 6 illustrates a sphere 306 of influence around droplet operations electrode 204G. The sphere 306 of influence graphically illustrates the influence droplet operations electrode 204G may have on neighboring electrodes 204F, 204C, 204B, and 204D. When a voltage is applied to electrode 204G, the voltage may attract or repel another droplet at a neighboring electrode. The ON condition at the droplet operations electrode 204G may thus require that any neighboring electrodes be OFF to avoid influential effects. Relationships may also be specified by solving out multiple sphere of influence. Computational complexity, however, increases, so pre-specifying the relationships may be simpler.

Friends may thus be electrical relationships. A friend relationship may influence any energy, electrical, or electromagnetic relationship or effect at a single electrode, between two or more electrodes, and/or at any component within the droplet actuator 102. If the friend relationship is one-way, then the electrical effect is more influential at one location and perhaps negligible at another location within the droplet actuator 102. When the friend relationship is two-way, then the electrical effect may influence neighbor, adjacent, or diagonal electrodes or other components within the droplet actuator 102.

These electrical relationships may influence hydrophobic or hydrophilic properties. Because a friend relationship may induce an electrical/electromagnetic field at another electrode, hydrophobic or hydrophilic properties may be affected. An induced electrical/electromagnetic field, for example, may make a surface of an adjacent electrode more, or less, hydrophobic. A stray electrical/electromagnetic field, for example, may cause a neighboring electrode to become more, or less, hydrophilic, thus affecting droplet operations. The neighbor and/or friend relationships between electrodes may thus describe electrical/electromagnetic effects that increase or decrease hydrophobic/hydrophilic properties.

One or more weighting factors 310 may also be defined. The weighting factor 310 may be assigned to any neighbor and/or friend relationship. For example, a certain friend electrode may have a weighting factor 310 of one (1), while another friend electrode may have a weighting factor 310 of two (2). The numeric value of the weighing factor 310 may be bounded by any upper limit and/or by any lower limit, with any increment in between. The higher the weighting factor 310, then perhaps the higher the influence.

The weighting factors 310 may be applied to fluidic neighbors. Sometimes the trip between fluidic neighbors is expensive and sometimes the trip is not (e.g., low weight). The weighting factors 310 may thus be applied when evaluating long trips. If the total cost is the smallest of all possibilities, then the path may be optimal. It also allows choosing between paths on the basis of cost. The relationship can have a negative weight, but an infinite weight may not make practical sense (for example, if a weighting factor is infinite, it may be best to simply remove the relationship).

These electrode-to-electrode relationships (with or without the directional components described above) may be incorporated in any of the interface description files 106. The electrowetting application 202, for example, may access, retrieve, or reference the electrode-to-electrode relationships when programming droplet operations protocols. The actuator interface description file 110 contains the physical and electrical description of the droplet actuator 102. An a priori knowledge of the electrode-to-electrode relationships may be useful when programming droplet operations protocols in parallel vectors of the droplet actuator 102 (as later paragraphs will explain). A detection of droplets (e.g., capacitance detection) may determine the fluidic layout of a chip by just randomly asserting vectors to build up experience to be used a posteriori.

The actuator interface description file 110 is not limited to a file format only. This actuator information may be stored and retrieved in any number of ways. In one example, software objects are generated rather than interface description files. The droplet actuator information may be in a file format (e.g., droplet actuator description file 110) for long term storage only.

Figure 7:
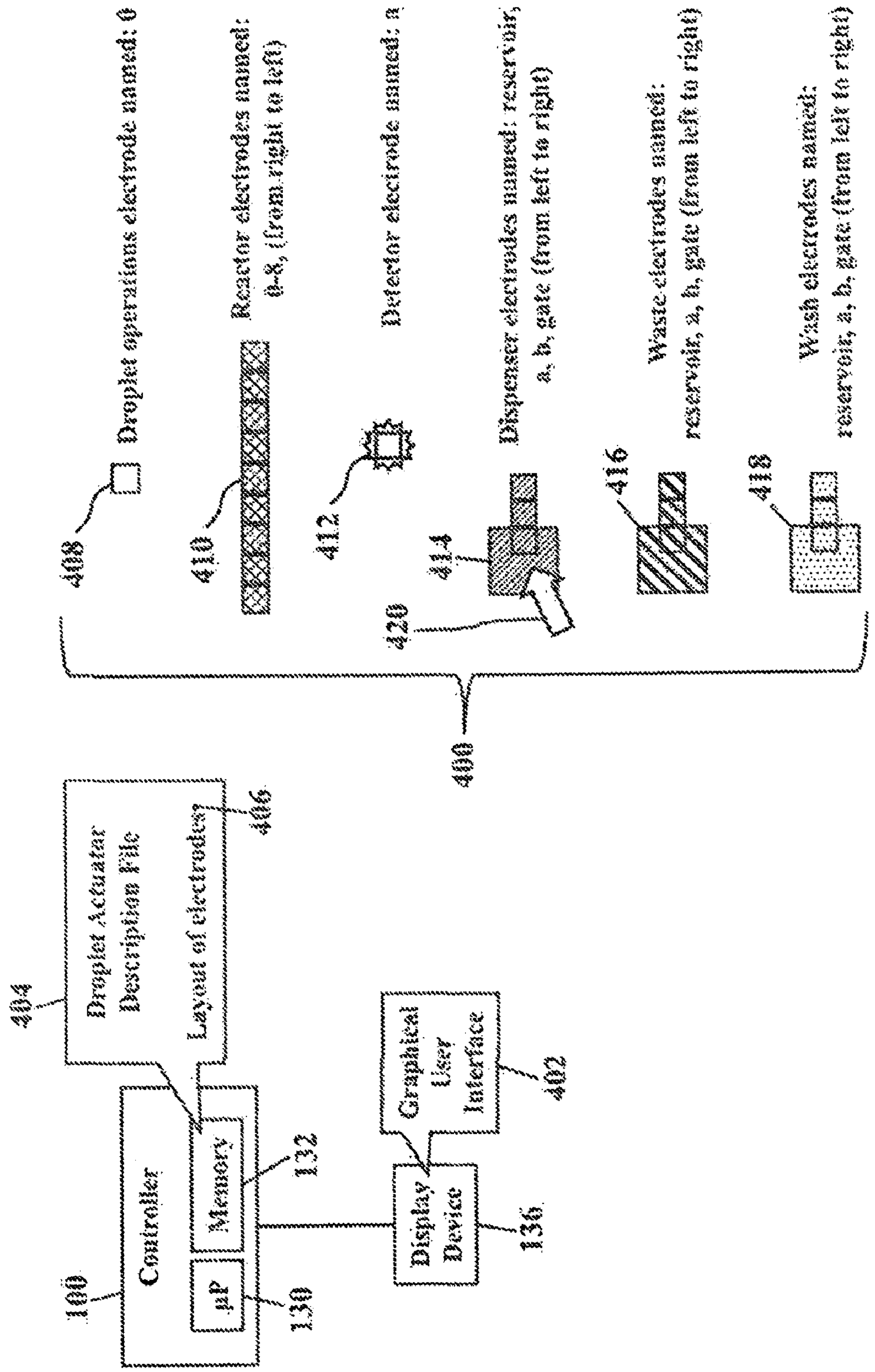
FIGS. 7 and 8 are schematics illustrating an exemplary physical design library of predefined electrode elements.

FIG. 7 is a schematic illustrating an exemplary physical design library 400. The physical design library 400 is illustrated as being visually produced in a graphical user interface 402 on the display device 136. The physical design library 400 may be a collection of predefined electrode elements that may be used by a droplet actuator description file 404. When a designer wishes to configure or design a layout 406 of electrodes, the designer may include the layout 406 of electrodes in the droplet actuator description file 404. The physical design library 400 is illustrated as being locally stored in the memory (illustrated as reference numeral 132 in FIG. 2) of the controller 100. Here the controller 100 may be a component of a computer, workstation, or server that stores and executes the droplet actuator description file 404. The physical design library 400, however, may be accessed by any software application that is used to design or to perform droplet operations. The physical design library 400, which contains the predefined electrode elements, may be used in a microfluidics design application in much the same way a circuit designer uses a physical design library of logic cells when designing an electrical circuit. By "clicking" or otherwise selecting the desired electrode element, the designer may quickly and easily drag-and-drop the desired function into the layout 406 of electrodes.

Each predefined electrode element may perform a function. A predefined group of electrodes may be arranged to provide a fluidic function or any other function. That is, a group of electrodes may be arranged and referenced according to a function to be performed. Suppose a designer needs to dispense a droplet. Instead of designing several electrodes to perform the dispensing operation, the designer merely selects the desired function. Here, then, the designer accesses the physical design library 400 and selects a dispenser electrodes element 414. FIG. 7 illustrates a cursor 420 which is graphically placed on the dispenser electrodes element 414. The designer may then "click" or otherwise select the dispenser electrodes element 414. The dispenser electrodes element 414 may be a logical or software object representing a group of electrodes that are prearranged to perform the dispensing operation. FIG. 7 similarly illustrates additional functional groupings of electrodes that perform other droplet operations. The predefined electrode elements may include, but are not limited to, a droplet operations electrode element 408, a reactor electrodes element 410, a detector electrode element 412, a waste electrodes element 416, and a wash electrodes element 418. This set of predefined electrode elements of physical design library 400 may be accessible via any physical design application (e.g., a computer aided design (CAD) tool) that may be used for designing microfluidics devices, such as the droplet actuator 102. Built into each predefined electrode element 408-418 are its physical attributes, such as the size, geometry, number, orientation, and relative positions of electrodes, as well as functional attributes, such as the electrode-to-electrode relationships described above.

Each predefined electrode element (and/or a sub-element) within the physical design library 400 may be assigned a name. Table 1 below lists the electrode elements shown in FIG. 7.

TABLE 1

Example electrode elements

| Electrode Element | Formed of: |
|---|---|
| Droplet operations electrode element 408 | Droplet operations electrode named: 0 |
| Reactor electrodes element 410 | Reactor electrodes named: 0-8 |
| Detector electrode element 412 | Detector electrode named: a |
| Dispenser electrodes element 414 | Dispenser electrodes named: reservoir, a, b, gate |
| Waste electrodes element 416 | Waste electrodes named: reservoir, a, b, gate |
| Wash electrodes element 418 | Wash electrodes named: reservoir, a, b, gate |

Referring to Table 1, the functions of the predefined electrode elements are also incorporated therein. For example, the electrode sequence for dispensing a droplet from dispenser electrodes element 414 may be associated with, or incorporated into, the definition of dispenser electrodes element 414. For example, a simple programming macro called "dispense" may be invoked when programming a certain assay protocol, without having to specify the exact activation sequence from reservoir to a, to b, to gate of dispenser electrodes element 414. The dispenser electrodes element 414 may thus be defined by populating the associated parameters or data fields "reservoir," "a," "b," and "gate." Each electrode element is similarly defined by its function and its associated data fields.

The physical design library 400 thus greatly simplifies the design of the droplet actuator 102. A designer of the droplet actuator 102 may simply select the desired function and ensure the associated parameters or fields are populated/defined. The desired function is then associated to a group of one or more electrodes that are structurally preconfigured to perform the desired function. The physical design application (e.g., the computer aided design tool) then inserts or otherwise adds the corresponding electrode structure into the electronic layout 406 of the actuator 102. The completed design may then be stored in the actuator description file 404.

Each predefined electrode element is represented by an icon. The icon may be chosen to resemble the function, but a resemblance is not necessary. An icon may even be a proprietary design.

Figure 8:
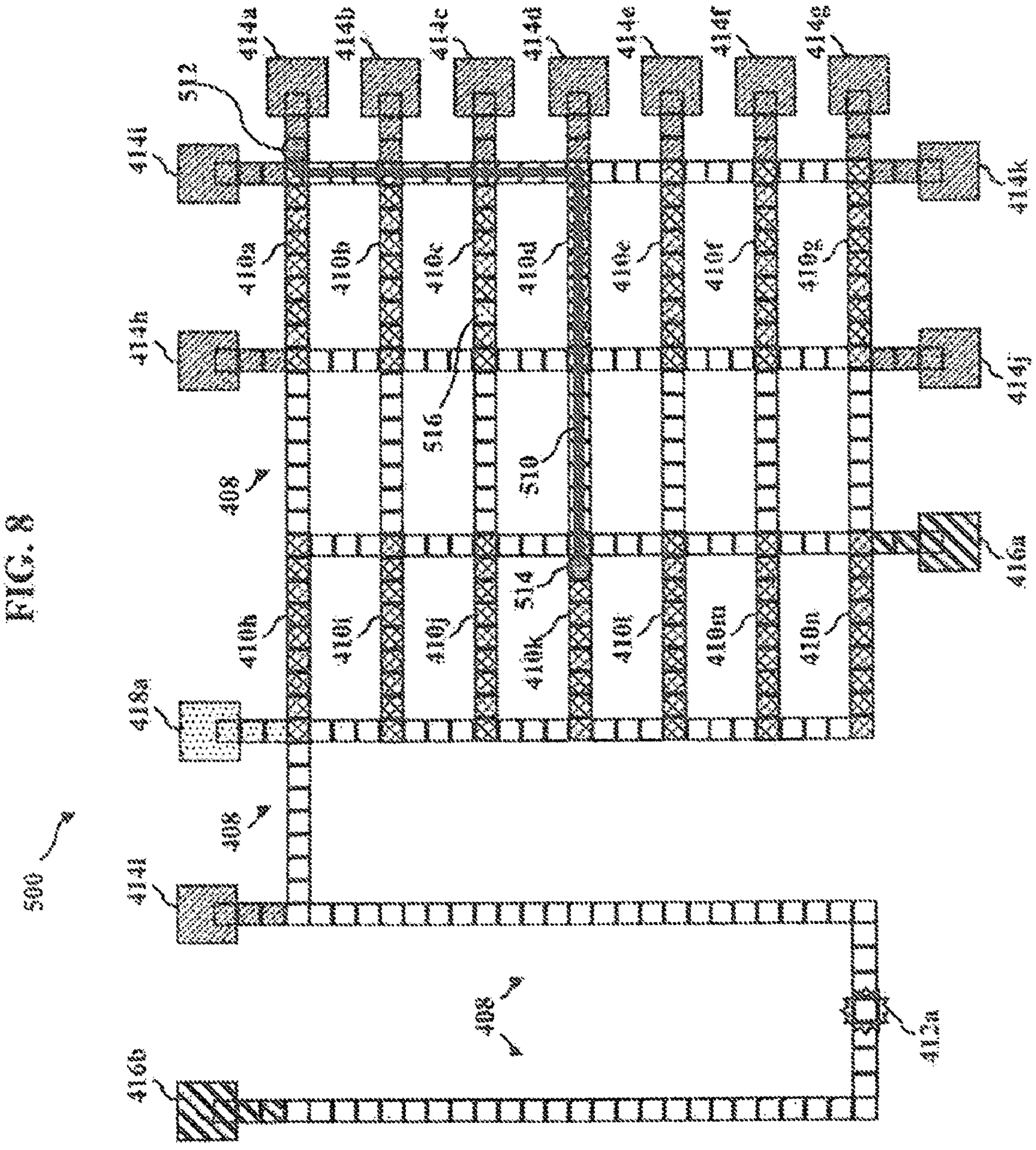

FIG. 8 is a schematic illustrating a top view of an exemplary electrode configuration 500 created using the predefined electrode elements within the physical design library (illustrated, respectively, as reference numerals 408-418 and 400 in FIG. 7). The electrode configuration 500 is a visual rendering of the information in the actuator description file (illustrated as reference numeral 404 in FIG. 7).

In this example, the electrode configuration 500 includes multiple dispenser electrodes elements 414, such as dispenser electrodes elements 414*a* through 414*g*, which are intended for dispensing sample fluid. The electrode configuration 500 also includes multiple dispenser electrodes elements 414, such as dispenser electrodes elements 414*h* through 414*k*, which are intended for dispensing reagent fluid. The electrode configuration 500 also includes another dispenser electrodes element 414*l*, which is the input well of the substrate. The electrode configuration 500 also includes waste electrodes elements 416*a* and 416*b*, a dispenser electrodes element 418*a*, and a detector electrode element 412*a*. FIG. 8 illustrates that the lines or paths interconnecting these electrode elements are formed of multiple droplet operations electrode elements 408 and multiple reactor electrodes elements 410 (e.g., 410*a* through *n*).

A droplet route is specified. One or more droplet operations routes may be specified when programming the droplet operations protocols by calling out a start location and an end location of the route. The name of the electrode elements that form the electrode configuration 500 may be used to define or plan the route. For example, a route (illustrated as reference numeral 510) has a starting location 512 as a "gate" of dispenser electrodes element 414*a*. The end location 514 is reactor electrodes element 410*k*. The droplet route 510 may thus be at least partially defined by the starting location 512 and the end location 514.

Defects may also be avoided. Because the electrode configuration 500 may have hundreds or even thousands of electrodes, some electrodes may be fouled or defective. If the route 510 includes a defective electrode, then the droplet operations may be compromised, perhaps even preventing the droplet from reaching the end location 514. Some electrodes may even experience stray or adverse electromagnetic/electrostatic effects from other electrodes. Some electrodes may develop a grounding condition. For whatever reasons, then, some electrodes or areas of the droplet actuator 102 may need to be avoided. The invention may thus flag any known or discoverable defects in the electrode configuration 500. The location of any defect is noted so that the route 510 may avoid the defective area. FIG. 8, for example, illustrates a defect 516 at position "6" of reactor electrodes element 410*c*. Consequently, when specifying droplet operations routes, the location of reactor electrodes element 410*c*, which includes defect 516, may be avoided. More specifically, the actuator description file (illustrated as reference numeral 404 in FIG. 7) may be updated to include the defect 516 at position "6" of reactor electrodes element 410*c*. In this way, the reactor electrodes element 410*c* may be automatically removed as a viable route for any droplet operation.

Figure 9:
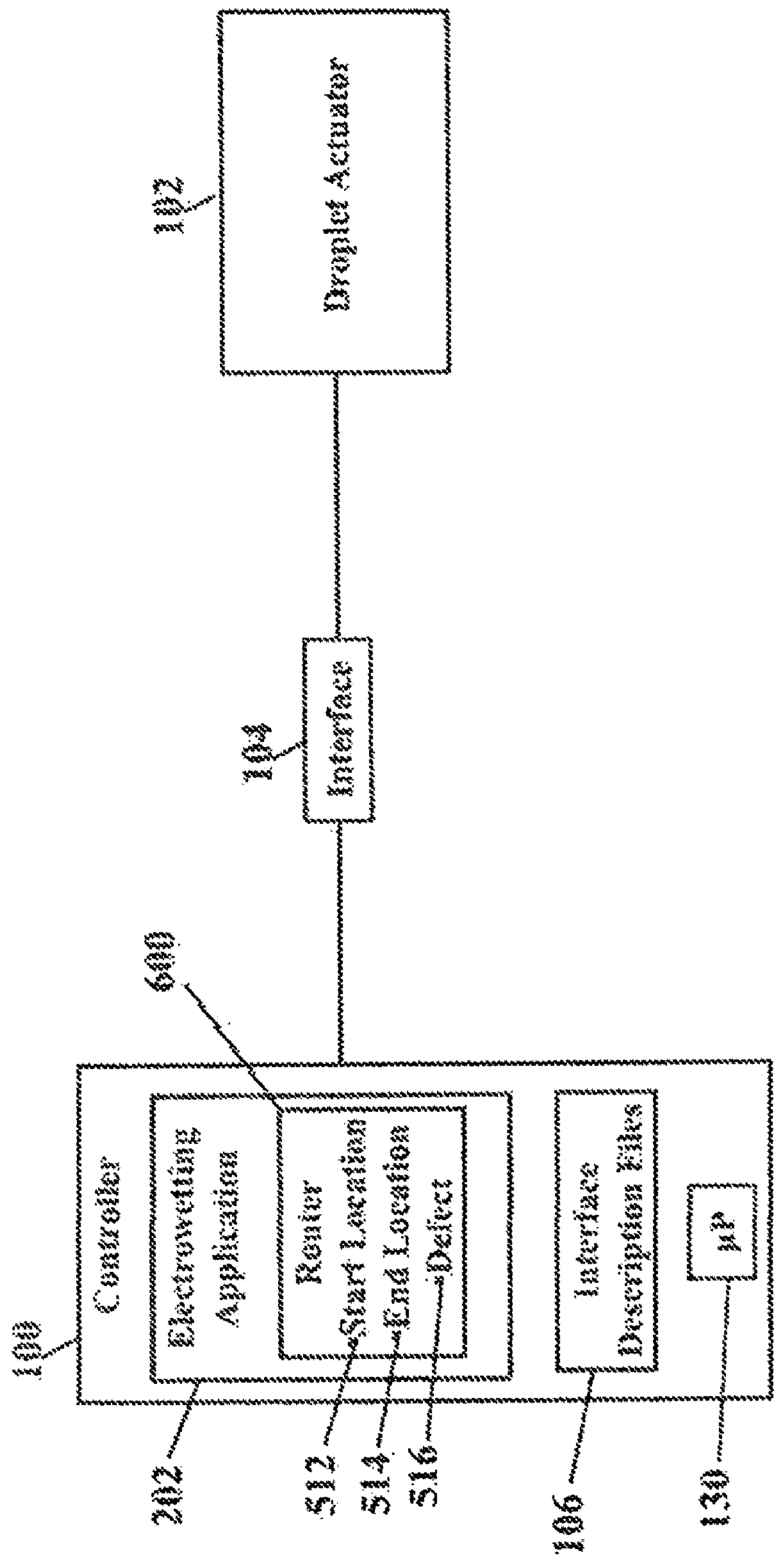
FIG. 9 is a schematic illustrating a router that automatically plans or determines routes within a droplet actuator.

FIG. 9 is a schematic illustrating a muter 600 that automatically plans or determines routes within the droplet actuator 102. FIG. 9 illustrates the router 600 as a component or software module of the electrowetting application 202, but the router 600 may be a stand-alone application that is locally or remotely available when programming or performing droplet operations. The router 600 comprises code that solves and/or suggests one or more possible routes when programming droplet operations protocols. The router 600, for example, accepts the starting location 512 and plans one or more routes that cause the droplet to arrive at the end location 514. The router may determine a linear series of electrodes that sequentially moves the droplet from the starting location 512 to the end location 514. The router 600 may consider any defective locations within the droplet actuator 102 (such as the defect 516), as the above paragraphs explained. The router 600, however, may also consider the neighbor and friend relationships that are stored or accessed by the electrowetting application 202 (and/or the actuator description file 110) when solving the routes. The router 600 may be used, for example, to determine a shortest route or any cyclic route (i.e., a route that may start and end at the same location 512) within, for example, the electrode configuration 500. The shortest route may not necessarily be the shortest physical path between two electrodes. When determining the shortest route, other factors, such as neighbor and friend relationships, defects, fouled electrodes, weight factors, and so on, are considered (as explained above). If a one-way or two-way relationship is desired, the router 600 may select the fluidic path that achieves the design constraints. Once the route is determined from the starting location 512 to the end location 514, the route may be visually displayed (such as on the display device 136 illustrated in FIGS. 2 & 7). The electrodes in the droplet actuator 102 may be depicted as an array, for example, and the route may be mapped from the starting location 512 to the end location 514 (as FIG. 8 depicts). Any curved or linear connection between electrodes along the route may be visually drawn.

Figure 10:
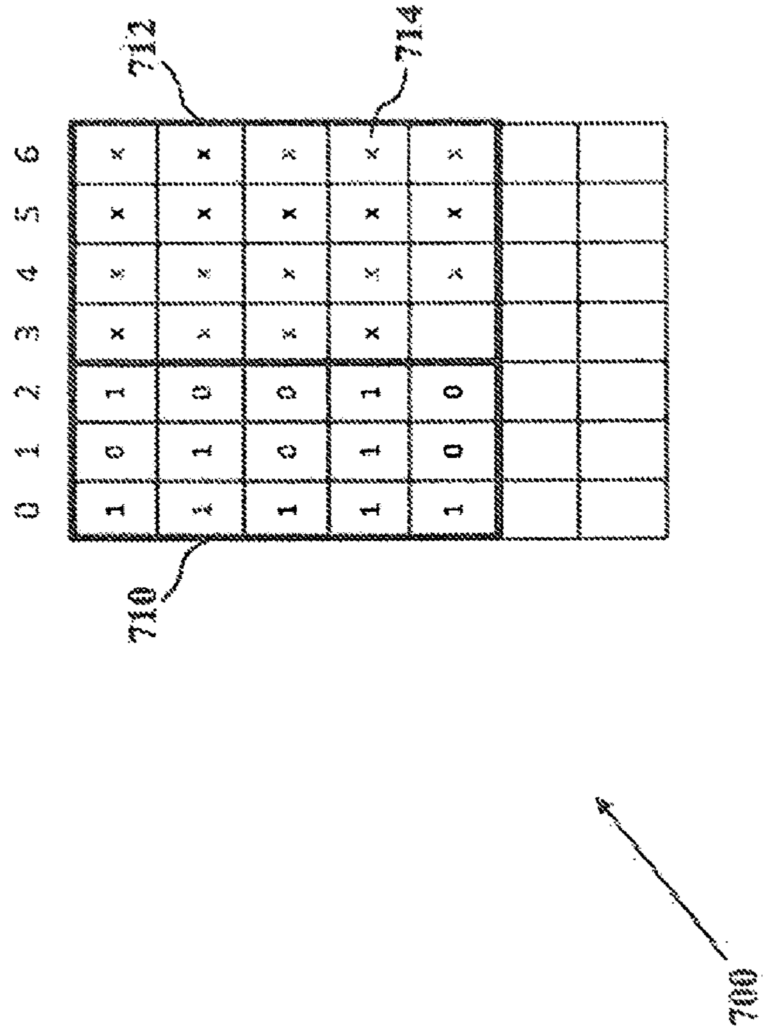
FIGS. 10 and 11 are schematics illustrating vector relationships for use in programming droplet operations protocols in a droplet actuator.
Figure 11:
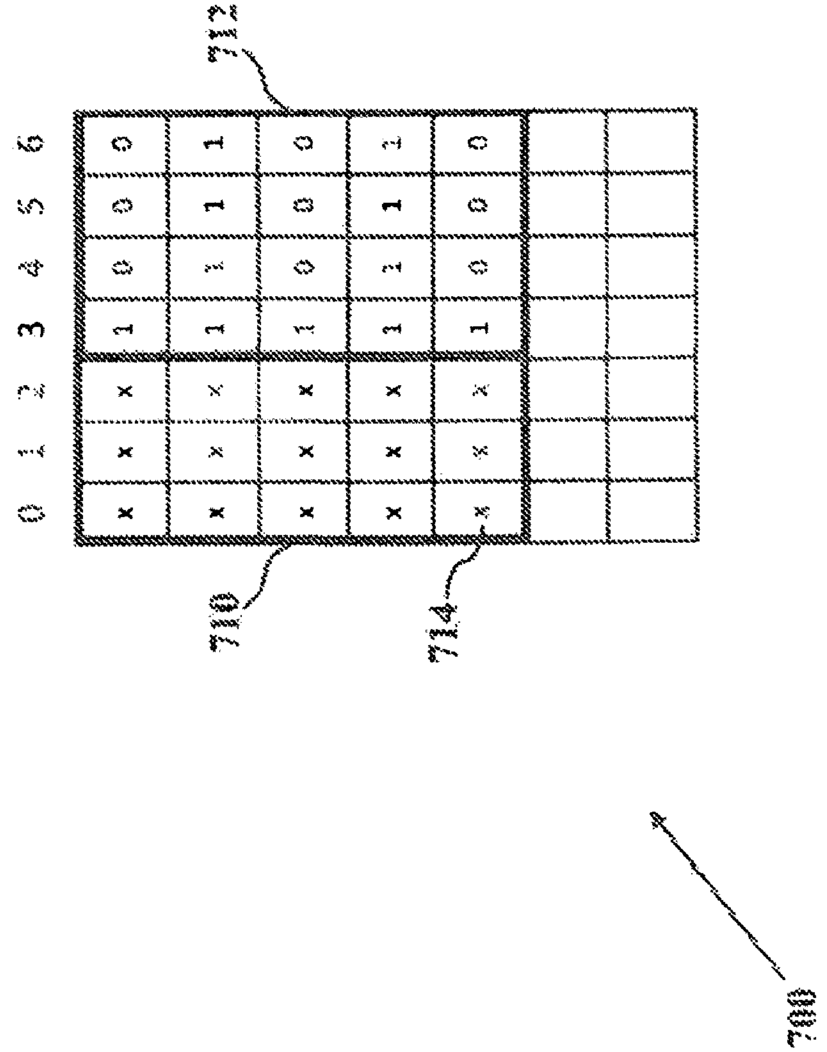

FIGS. 10 and 11 are schematics illustrating vector relationships for use in programming droplet operations protocols in the droplet actuator 102. A sequence is a list of the state of all the electrodes (such as the electrodes 408-416 illustrated in FIG. 8) in the droplet actuator 102 at every point in time. This may be represented by a bit vector and a duration for each step in a sequence from the starting location 512 to the end location 514 (as FIG. 8 depicts). An individual electrode may be ON when a voltage is applied, so the vector term associated with the electrode may have a term value of one (1). When an electrode is OFF, the electrode may have no voltage applied or a reference voltage (e.g. electrical ground) applied. The vector term associated with an OFF electrode may have a value of zero (0). When programming an assay protocol, instead of manually defining the states of every electrode in the droplet actuator 102, vectors may be defined, such as the tri-state vector 700 illustrated in FIGS. 10 and 11. The terminology "tri-state" refers to identifying each channel in the vector as ON, OFF, or DON'T CARE for a certain sequence. A DON'T CARE term can be either "1" (ON) or "0" (OFF).

The DON'T CARE condition may greatly simplify the vector relationships. Suppose the droplet actuator 102 has one hundred (100) electrodes. The vector describing the state of all the electrodes in the droplet actuator at every point in time would thus have one hundred (100) terms. In other words, if the droplet actuator has n electrodes, then the state vector may have n terms. Each term would have a numerical value of either "1" or "0," corresponding to an ON or OFF voltage. When the droplet actuator 102 has hundreds, or thousands, of electrodes, the vector describing the state of all the electrodes at any point in time becomes complex, to say the least. These complex vectors, however, can be greatly simplified by introducing the DON'T CARE condition. The DON'T CARE condition allows an electrode to be either an "1" (ON) or "0" (OFF) value, allowing vector relationships to be greatly simplified.

In one example, FIG. 10 illustrates the tri-state vector 700 and a sub-vector 710. The sub-vector 710 represents a certain sequence that may execute on a portion only of the tri-state vector 700. The channels of a sub-vector 712, which is outside of the sub-vector 710, are flagged as DON'T CARE and denoted with a "x" (illustrated as reference numeral 714) in the corresponding matrix. The DON'T CARE terms mean that another sequence may be executed at sub-vector 712 in parallel to the sequence at sub-vector 710. The electrode channels that correspond to the sub-vector 712 may be either ON or OFF without influencing the electrode channels represented by the sub-vector 710. In this way, assay multiplexing may be programmed and performed. In other words, the DON'T CARE terms define what electrodes are available to perform simultaneous, parallel droplet operations. As long as a DON'T CARE electrode does not conflict with another assay, the DON'T CARE electrode may be available and programmed for another simultaneous sequence.

In another example, FIG. 11 illustrates the tri-state vector 700 and the sub-vector 712 that represents a certain sequence that may execute on a portion only of the tri-state vector 700. The channels of the sub-vector 710, which is outside of the sub-vector 712, are flagged as DON'T CARE (denoted with a "x" and illustrated as reference numeral 714), which means that another sequence may be executed at the sub-vector 710 in parallel to the sequence at the sub-vector 712. Again, in this way, assay multiplexing may be programmed and performed.

The tri-state vectors allow sequences to be tested for their ability to be parallelized, which allows methods of parallelization of sequences. If sequences are allowed to be parallelized, tri-state vectors can be merged trivially.

Figure 12:
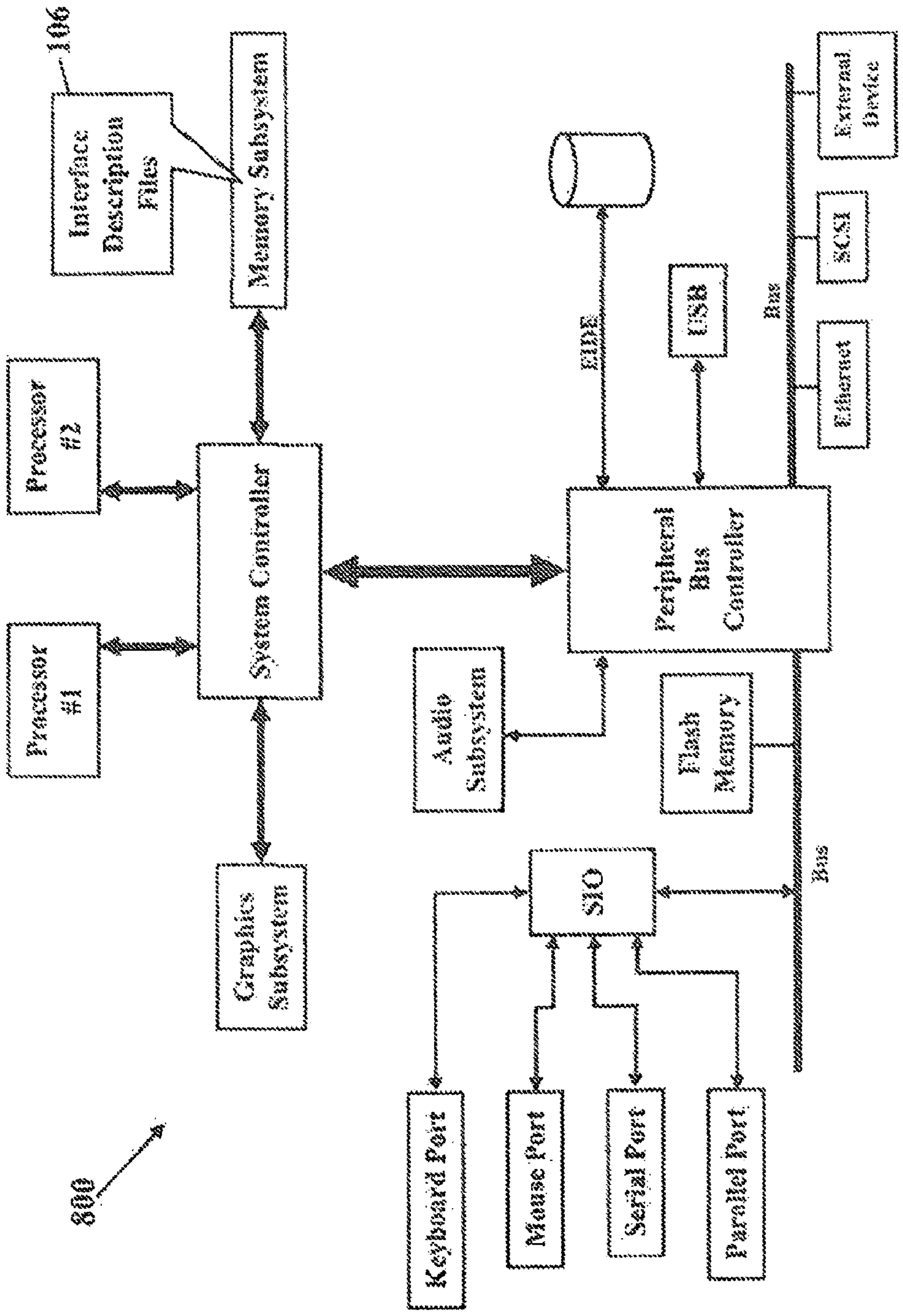
FIG. 12 is a schematic illustrating a generic block diagram of a processor-controlled device as another operating environment.

FIG. 12 is a schematic illustrating still more exemplary embodiments. FIG. 12 is a generic block diagram illustrating the one or more interface description files 106 operating within a processor-controlled device 800. The one or more interface description files 106 may be stored in a memory subsystem of the processor-controlled device 800. One or more processors (such as the processor 130 illustrated in FIGS. 2, 4-5, 7, and 9) communicate with the memory subsystem and retrieve and/or execute the one or more interface description files 106. Because the processor-controlled device 800 illustrated in FIG. 12 is well-known to those of ordinary skill in the art, no detailed explanation is needed. The processor-controlled device 800 may include any device capable of storing, accessing, retrieving, sending, or using the one or more interface description files 106 to conduct droplet operations. While the processor-controlled device 800 may typically be laboratory equipment used for conducting assay droplet operations, the one or more interface description files 106 may be incorporated into any device. The processor-controlled device 800, for example, may be any computer, server, set-top box ("STB"), a personal/digital video recorder (PVR/DVR), personal digital assistant (PDA), a Global Positioning System (GPS) device, a television, an Internet Protocol (IP) phone, a pager, a cellular/satellite phone, or any system or communications device utilizing the processor 130 and/or a digital signal processor (DP/DSP). The processor-controlled device 800 may also include watches, radios, vehicle electronics, clocks, printers, gateways, mobile/implantable medical devices, and other apparatuses and systems.

Figure 13:
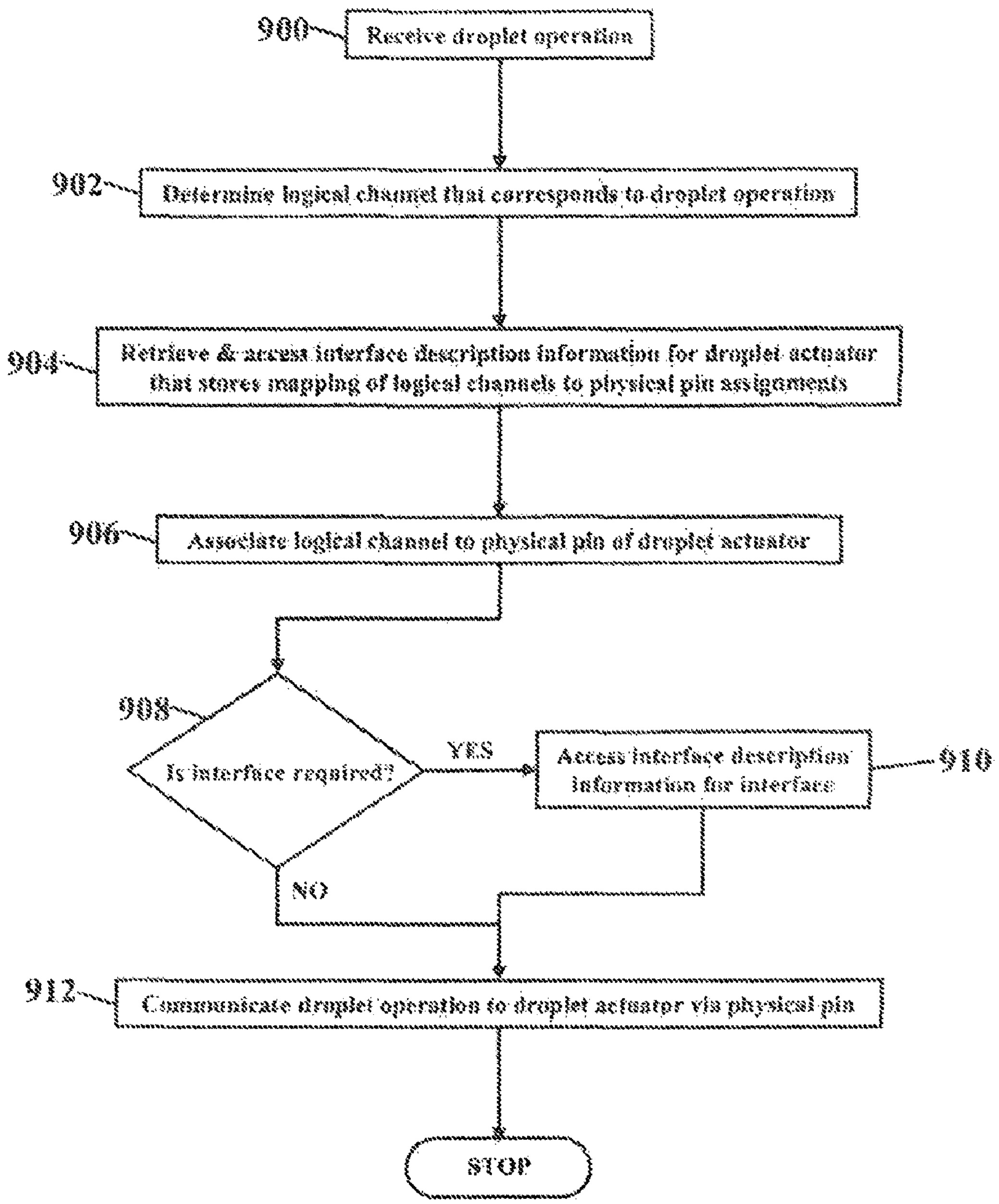

FIG. 13 is a flowchart illustrating a method of conducting droplet operations, according to exemplary embodiments. A droplet operation is received (Block 900). A logical channel is determined that corresponds to the droplet operation (Block 902). Interface description information for a droplet actuator is retrieved and accessed that stores a mapping of logical channels to physical pin assignments (Block 904). The logical channel is associated to a physical pin of the droplet actuator (Block 906). If an interface to the droplet actuator is required (Block 908), then interface description information is accessed for the interface (Block 910). The droplet operation is communicated to the droplet actuator via the physical pin (Block 912).

Figure 14:
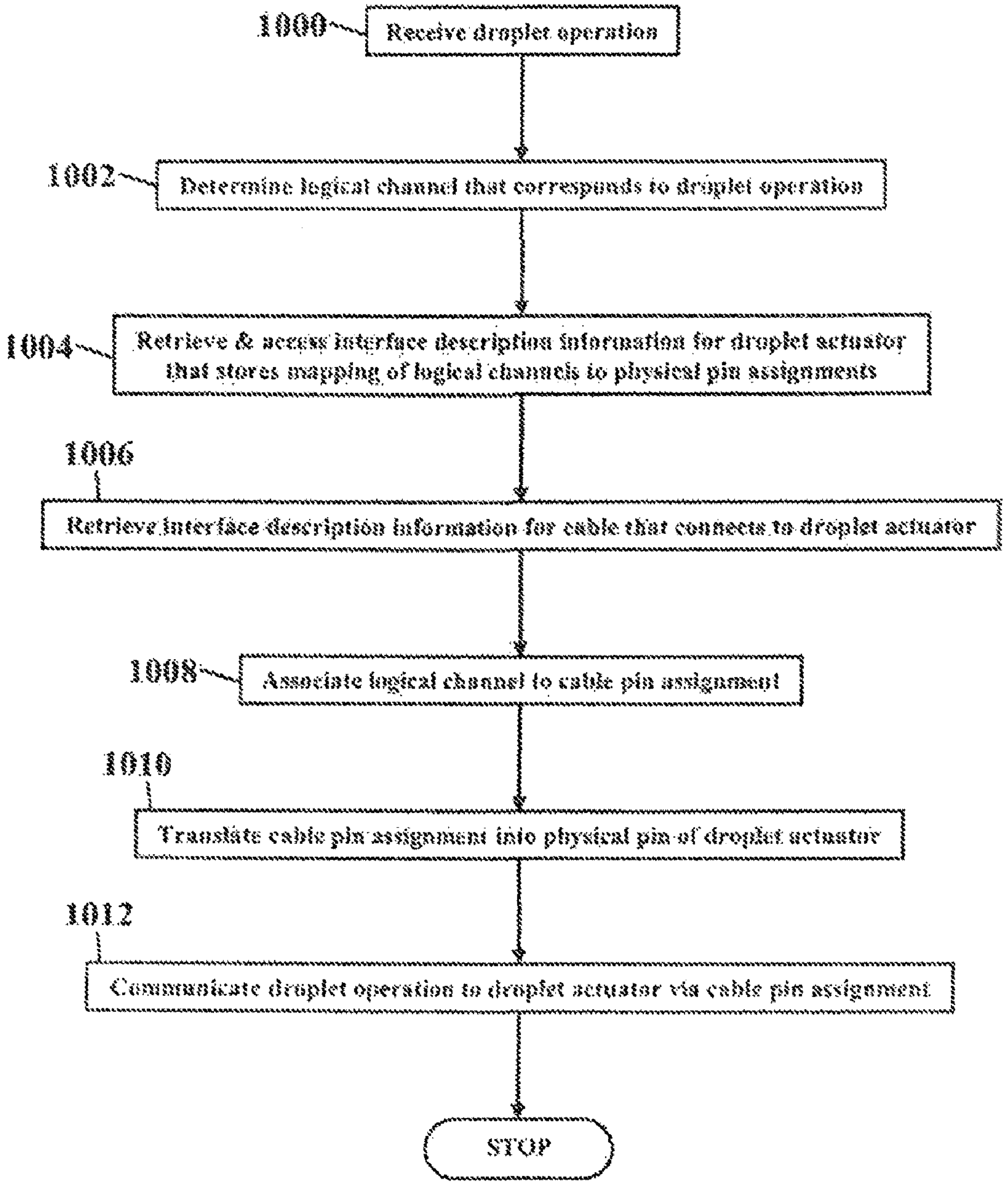

FIG. 14 is another flowchart illustrating another method of conducting droplet operations, according to exemplary embodiments. A droplet operation is received (Block 1000). A logical channel is determined that corresponds to the droplet operation (Block 1002). Interface description information for a droplet actuator is retrieved and accessed that stores a mapping of logical channels to physical pin assignments (Block 1004). Interface description information for a cable that connects to the droplet actuator is retrieved (Block 1006). The logical channel is associated to a cable pin assignment of the cable that connects to a physical pin of the droplet actuator (Block 1008). The cable pin assignment of the cable is translated into the physical pin of the droplet actuator (Block 1010). The droplet operation is communicated to the droplet actuator via the cable pin assignment of the cable (Block 1012).

Figure 15:
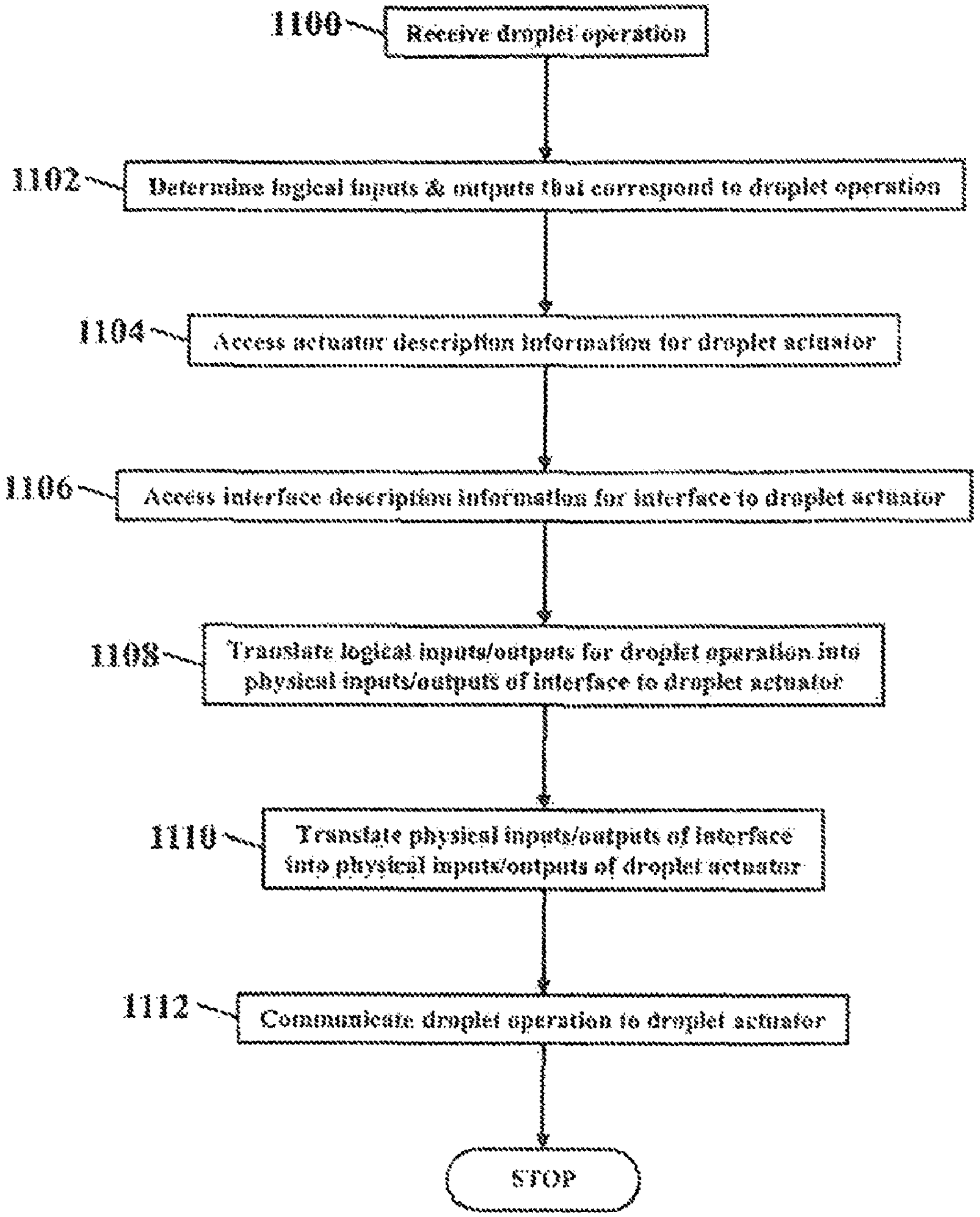

FIG. 15 is another flowchart illustrating another method of conducting droplet operations, according to exemplary embodiments. A droplet operation is received (Block 1100). Logical inputs and outputs that correspond to the droplet operation are determined (Block 1102). Actuator description information for a droplet actuator is accessed (Block 1104). Interface description information for an interface to the droplet actuator is accessed (Block 1106). The logical inputs and outputs for the droplet operation are translated into physical inputs and outputs of the interface to the droplet actuator (Block 1108). The physical inputs and outputs of the interface are translated into the physical inputs and outputs of the droplet actuator (Block 1110). The droplet operation is communicated to the droplet actuator (Block 1112).

Figure 16:
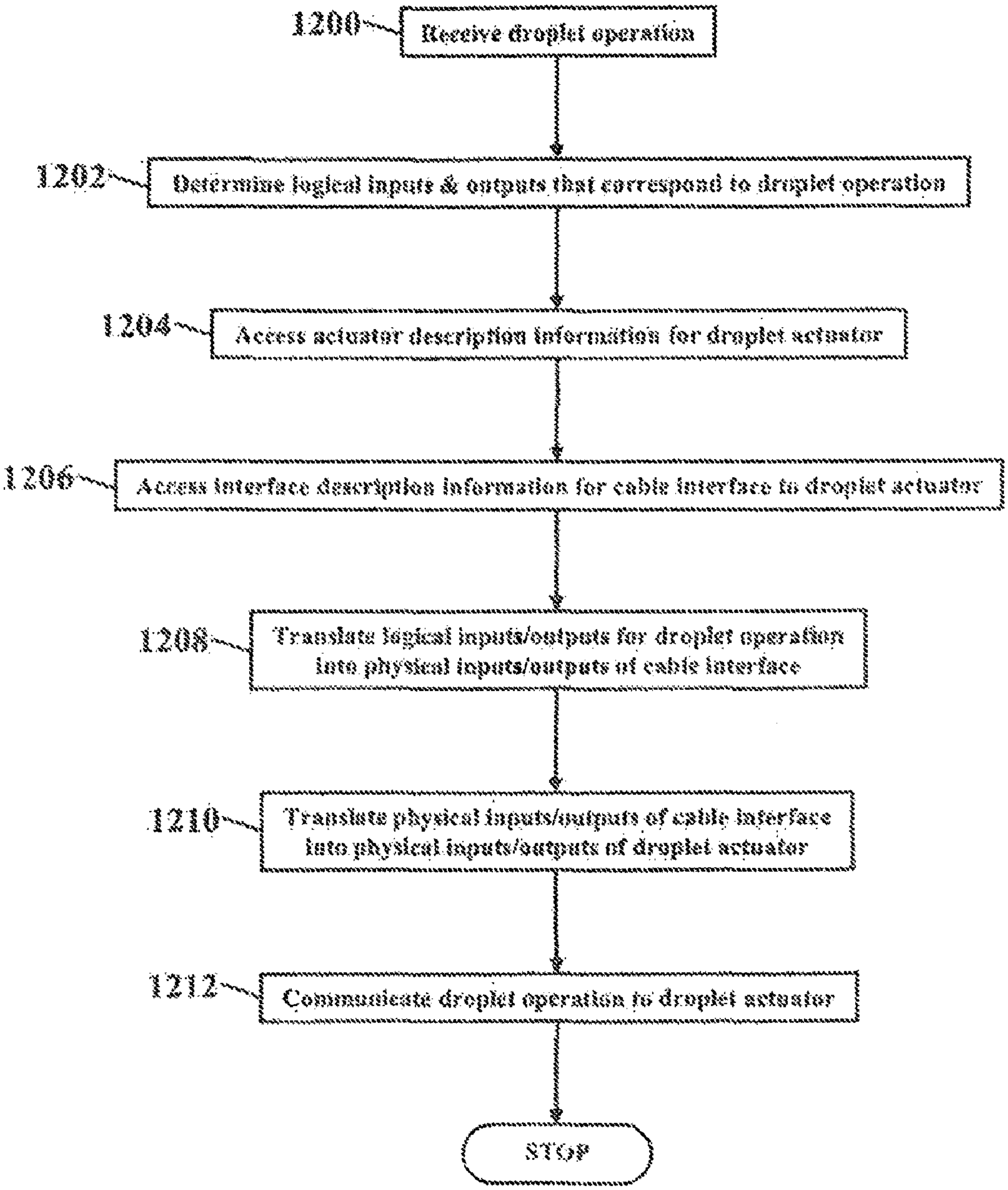

FIG. 16 is another flowchart illustrating another method of conducting droplet operations, according to exemplary embodiments. A droplet operation is received (Block 1200). Logical inputs and outputs that correspond to the droplet operation are determined (Block 1202).

Actuator description information for a droplet actuator is accessed (Block 1204). Interface description information for a cable interface to the droplet actuator is accessed (Block 1206). The logical inputs and outputs for the droplet operation are translated into physical inputs and outputs of the cable interface to the droplet actuator (Block 1208). The physical inputs and outputs of the cable interface are translated into the physical inputs and outputs of the droplet actuator (Block 1210). The droplet operation is communicated to the droplet actuator (Block 1212).

Figure 17:
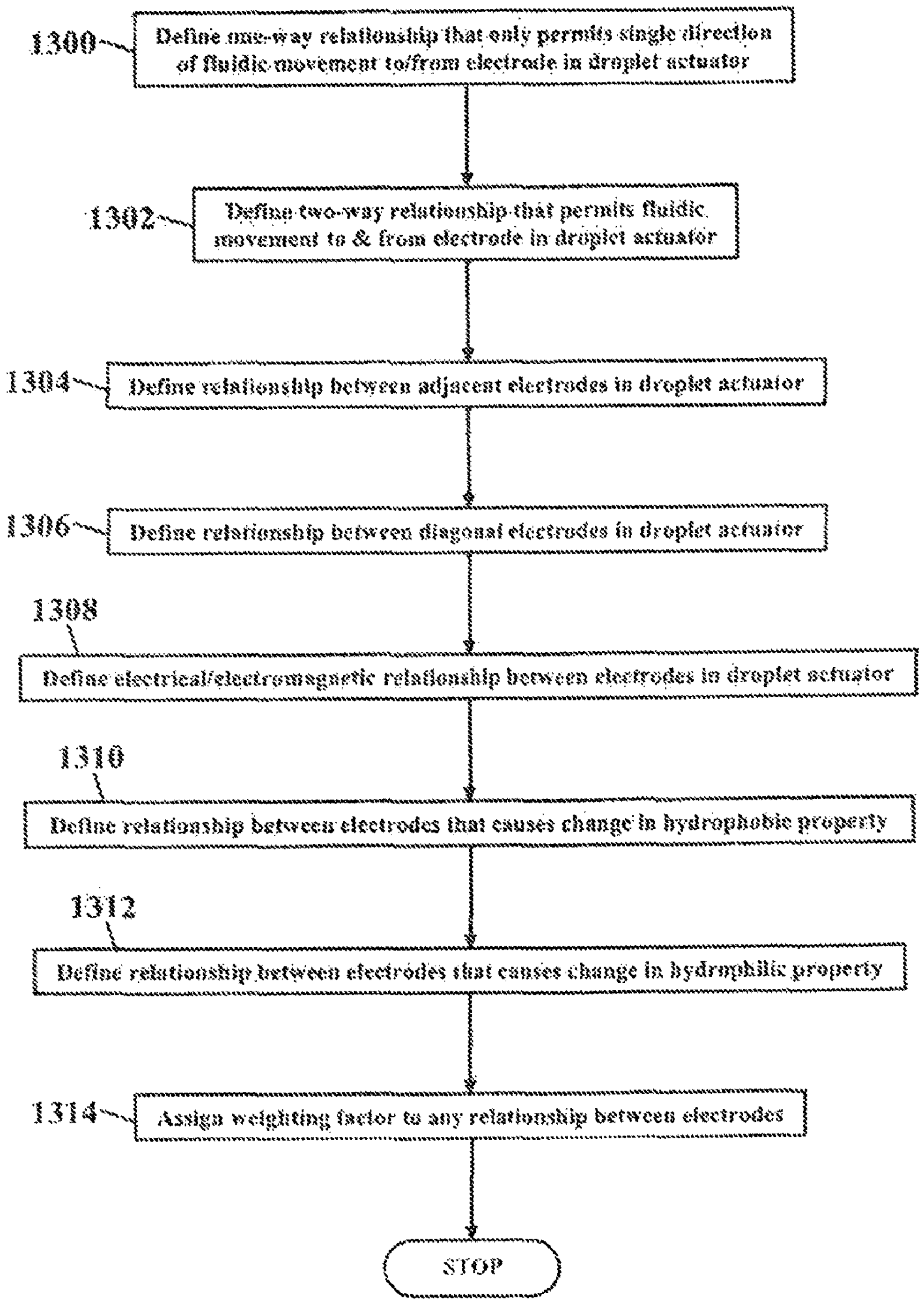

FIG. 17 is another flowchart illustrating another method of conducting droplet operations, according to exemplary embodiments. A one-way relationship may be defined that only permits a single direction of fluidic movement to or from an electrode in a droplet actuator (Block 1300). A two-way relationship may be defined that permits fluidic movement to and from an electrode in the droplet actuator (Block 1302). A relationship between adjacent electrodes in the droplet actuator may be defined (Block 1304). A relationship between diagonal electrodes in the droplet actuator may be defined (Block 1306). An electrical/electromagnetic relationship between electrodes in the droplet actuator may be defined (Block 1308). A relationship between electrodes in the droplet actuator may be defined that causes a change in a hydrophobic property (Block 1310) and/or hydrophilic property (Block 1312) of an electrode. A weighting factor may be assigned to any relationship between electrodes in the droplet actuator (Block 1314).

Figure 18:
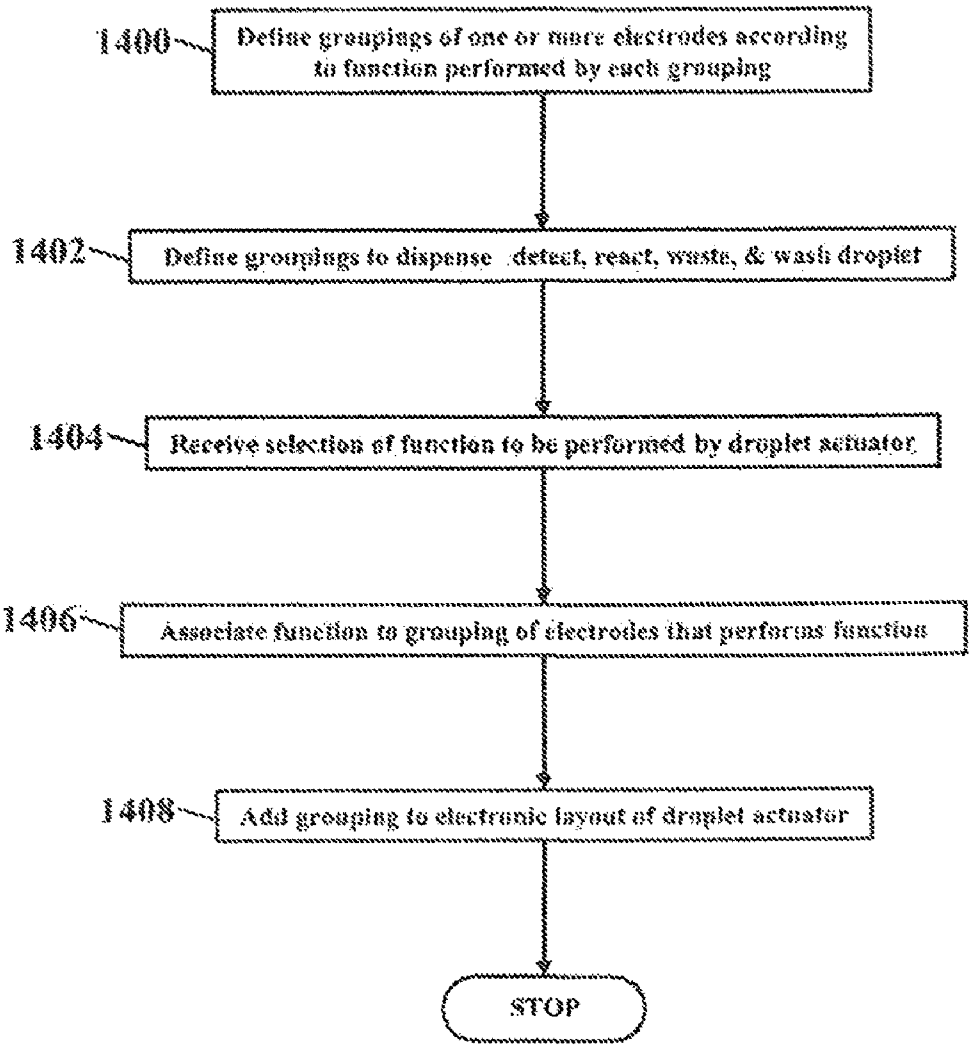

FIG. 18 is another flowchart illustrating another method of conducting droplet operations, according to exemplary embodiments. Groupings of one or more electrodes are defined according to a function performed by each grouping (Block 1400). Groupings may be defined to at least one of dispense a droplet, detect the droplet, react the droplet, waste the droplet (e.g., send the droplet to a waste reservoir), and wash the droplet (Block 1402). A selection of a function to be performed by a droplet actuator is received (Block 1404). The function is associated to a grouping of one or more electrodes that perform the function (Block 1406). The grouping is added to an electronic layout of the droplet actuator (Block 1408).

Figure 19:
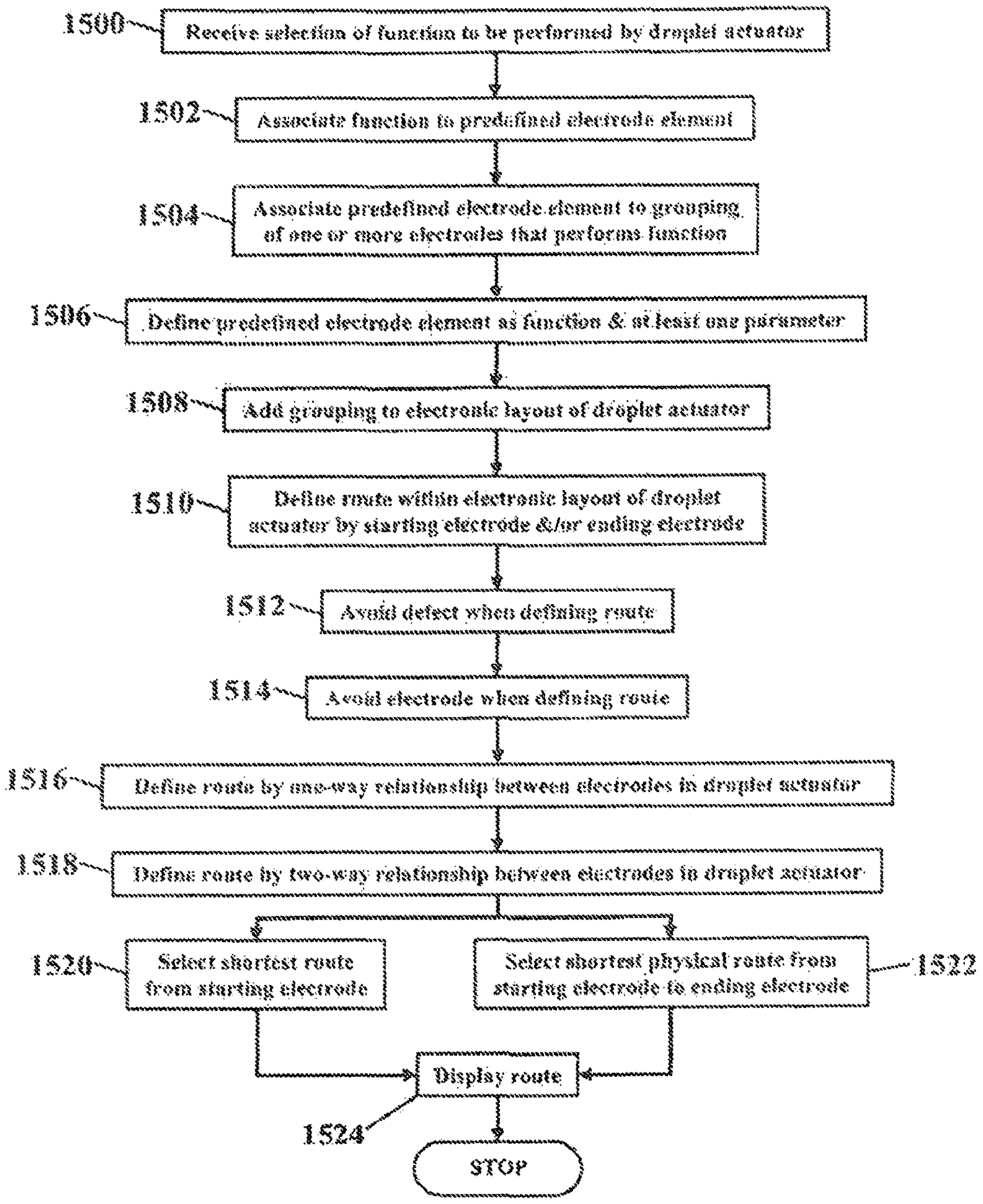

FIG. 19 is another flowchart illustrating another method of conducting droplet operations, according to exemplary embodiments. A selection of a function to be performed by a droplet actuator is received (Block 1500). The function is associated to a predefined electrode element (Block 1502). The predefined electrode element is associated to a grouping of one or more electrodes that perform the function (Block 1504). The predefined electrode element is defined as the function and at least one parameter (Block 1506). The grouping of one or more electrodes is added to an electronic layout of the droplet actuator (Block 1508). A route is defined within the electronic layout of the droplet actuator by a starting electrode and/or an ending electrode (Block 1510). A defect may be avoided when defining the route (Block 1512). An electrode may be avoided when determining the route (Block 1514). The route may include a one-way relationship (Block 1516) and/or a two-way relationship between electrodes in the droplet actuator (Block 1518). A shortest route from the starting electrode may be selected (Block 1520). A shortest physical route from the starting electrode to the ending electrode may be selected (Block 1522). The route may be displayed (Block 1524).

Figure 20:
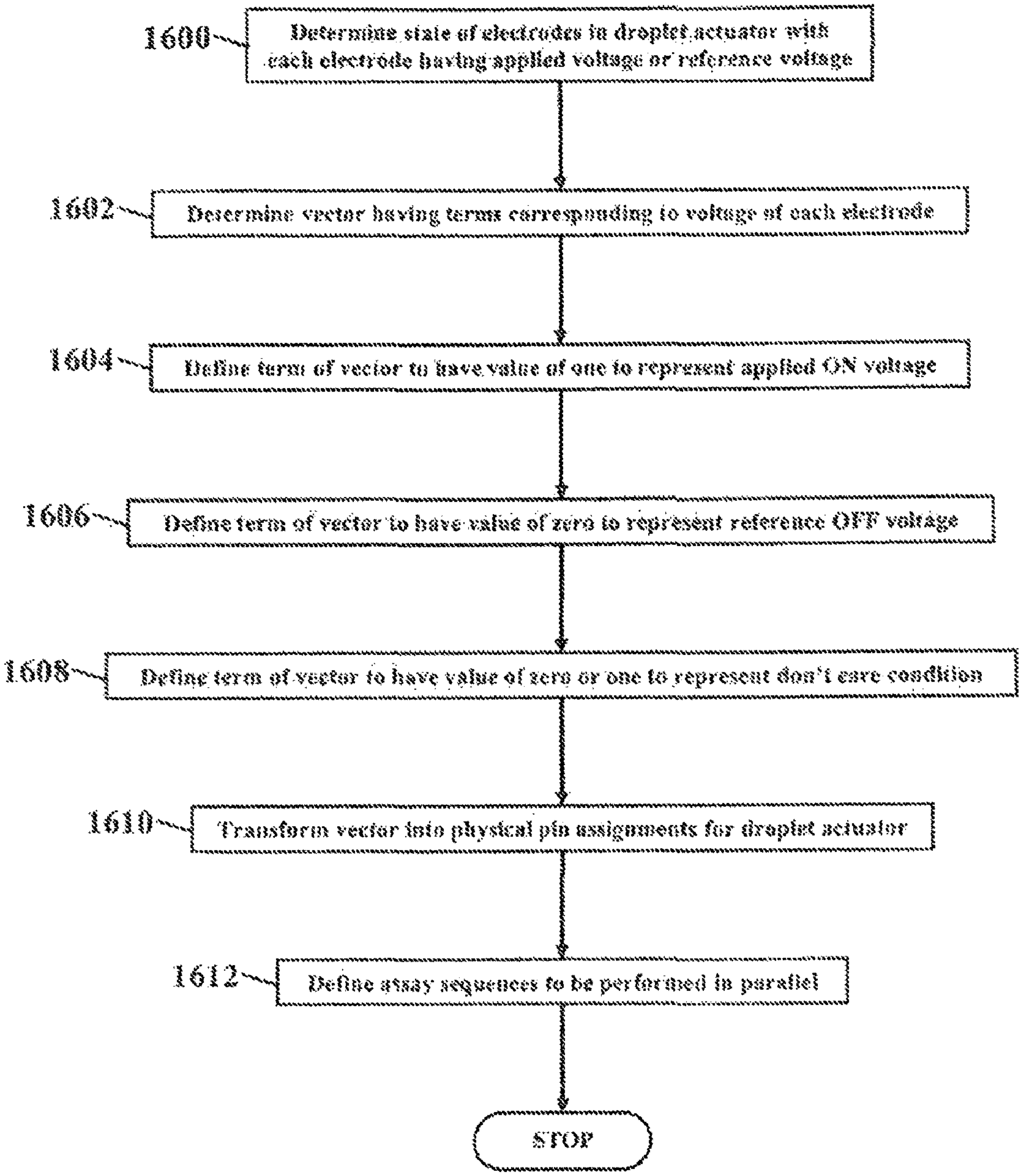

FIG. 20 is another flowchart illustrating another method of conducting droplet operations, according to exemplary embodiments. A state of electrodes in a droplet actuator is determined with each electrode having an applied voltage or a reference voltage (Block 1600). A vector is determined that has terms corresponding to a voltage of each electrode (Block 1602). A term of the vector is defined to have a value of one to represent the applied ON voltage (Block 1604). A term of the vector is defined to have a value of zero to represent the reference OFF voltage (Block 1606). A term of the vector is defined to have a value of zero (0) or one (1) to represent a don't care condition (Block 1608). The vector is transformed into physical pin assignments for the droplet actuator (Block 1610). Assay sequences are defined to be performed in parallel (Block 1612).

FIG. 21 is a block diagram illustrating an assay development system 1700, according to exemplary embodiments. The assay development system 1700 simulates and/or conducts assay droplet operations. The processor 130 executes an assay development application 1702 that is locally stored in the memory 132. Although not shown, the assay development application 1702 may be remotely located and downloaded from a remote server as a web-based application. The assay development application 1702 may cause the processor 130 to visually produce the graphical user interface 134 on the display device 136. The assay development application 1702 may also invoke other user interfaces, such as a tactile mouse, a keyboard, a touch panel, a microphone, and an audio speaker.

The assay development application 1702 permits graphical designs of assays. The assay development application 1702 is a software tool that visually represents a sequence schedule that is solved by, for example, a sequence scheduling algorithm 1704. The sequence scheduling algorithm 1704 manages the scheduling of one or multiple assay sequences. Because the droplet actuator 102 may have hundreds of electrodes, the droplet actuator 102 may perform multiple sequences in parallel. That is, the droplet actuator 102 may be capable of executing multiple assay sequences at the same time, thus improving the productivity of laboratory efforts. The sequence scheduling algorithm 1704 is thus a software process that coordinates, schedules, and helps execute multiple sequences within the droplet actuator 102. The sequence scheduling algorithm 1704, for example, may manage the scheduling of multiple sequences performed by the exemplary electrode configuration 500 (illustrated in FIG. 8).

FIG. 22 is a more detailed block diagram illustrating the assay development application 1702, according to exemplary embodiments. Because the assay development application 1702 is a graphical tool, various graphical menus 1706 are available. Each graphical menu 1706 provides an interface to the assay development application 1702, and each graphical menu 1706 may be visually produced on the display device (illustrated as reference numeral 136 in FIG. 21). A user of the assay development application 1702 may utilize one or more of the graphical menus 1706 to access controls and menus and to make selections. One such graphical menu 1706 is an assay library 1708. The assay library 1708 is a database of assays that have been previously created or newly created. The graphical menus 1706 allow a user to access the components of the assay library 1708 to build different assays. Each assay is stored in a database as one or more sequences 1710. The user may select a previously created assay sequence, or the user may create a new assay sequence, merely by making selections from the graphical menus 1706 (as later paragraphs will explain).

Each sequence 1710 may be defined by its corresponding vector 1712. Sequences 1710 may be represented as one or more of the vectors 1712 that are to be asserted sequentially to perform a certain droplet operations function in the droplet actuator (illustrated as reference numeral 102 in FIG. 21). Generally, each sequence 1710 may be a list of the vectors 1712 with a duration associated with each vector 1712. There may be different types of sequences 1710, depending on the droplet function to be performed. For example, the sequences 1710 may include dispense sequences, transport sequences, merge sequences, split sequences, hold sequences, wash sequences, waste sequences, oscillate sequences, and/or any custom sequences (as the paragraphs accompanying FIG. 7 earlier explained). Each function may have a predefined sequence that specifies predefined vectors for predefined durations. Custom sequences may also be created, thus allowing the user to define or select vectors and durations in any fashion. Each functional sequence 1710 corresponds to its unique vector 1712 or set of vectors 1712.

One or more actions 1720 may also be selected from the graphical menus 1706. The actions 1720 are any operations when performing assays in droplet actuators that are outside the realm of droplet operations. The actions 1720 execute in between assertions. For example, the actions 1720 may include, but are not limited to, start detection, wait for detection to complete, measure capacitance, set voltage, obtain or retrieve data, change the state of an indicator (such as a light-emitting diode (LED) of the droplet actuator controller), generate an audible sound of the droplet actuator controller, change temperature setpoint, and the like. Each action 1720 may thus be an ancillary operation, action, or function to a particular sequence 1710.

Inputs 1722, outputs 1724, and plug-ins 1726 may also be selected from the graphical menus 1706. Examples of the inputs 1722 and the outputs 1724 may include, but are not limited to, definitions of the flow within the schedule, definitions of how looping/repeating occurs within the schedule, and the like. Examples of the software plug-ins 1726 may include, but are not limited to, plug-ins to display charts and graphs, plug-ins to generate reports, and the like.

Certain portions of sequence schedules may be developed and stored in a diagrams library 1730 for use in building sequence schedules 1732. The terms "diagram" or "diagrams" refer to an aspect of building assays using the graphical menus 1706. The concept of diagrams is further explained and described with reference to FIGS. 27-30. Additionally, the assay development application 1702 may include a simulation component 1740 for simulating the operation of the sequence schedules 1732 once developed, as later paragraphs will explain.

FIG. 23 is a schematic illustrating a dispense sequence 1750, according to exemplary embodiments. The dispense sequence 1750 is just one of the predefined sequences 1710 available for selection, via the graphical menus 1706 of the assay development application 1702 (illustrated in FIGS. 21 and 22). When the dispense sequence 1750 is selected for inclusion in an assay, the corresponding set of vectors 1712 (with durational values) may be executed by the droplet actuator 102 to dispense a droplet. To further explain the dispense sequence 1750, FIG. 23 illustrates an electrode arrangement that includes a reservoir electrode 1752 that is associated with a fluid reservoir (not shown for simplicity). The reservoir electrode 1752 feeds a path or line of droplet operations electrodes 1754. The dispense sequence 1750 may be formed, for example, of four vectors that are executed in sequence as follows (which are examples of the vectors 1712 illustrated in FIG. 22).

Figures 23A, 23B, 23C, 23D:
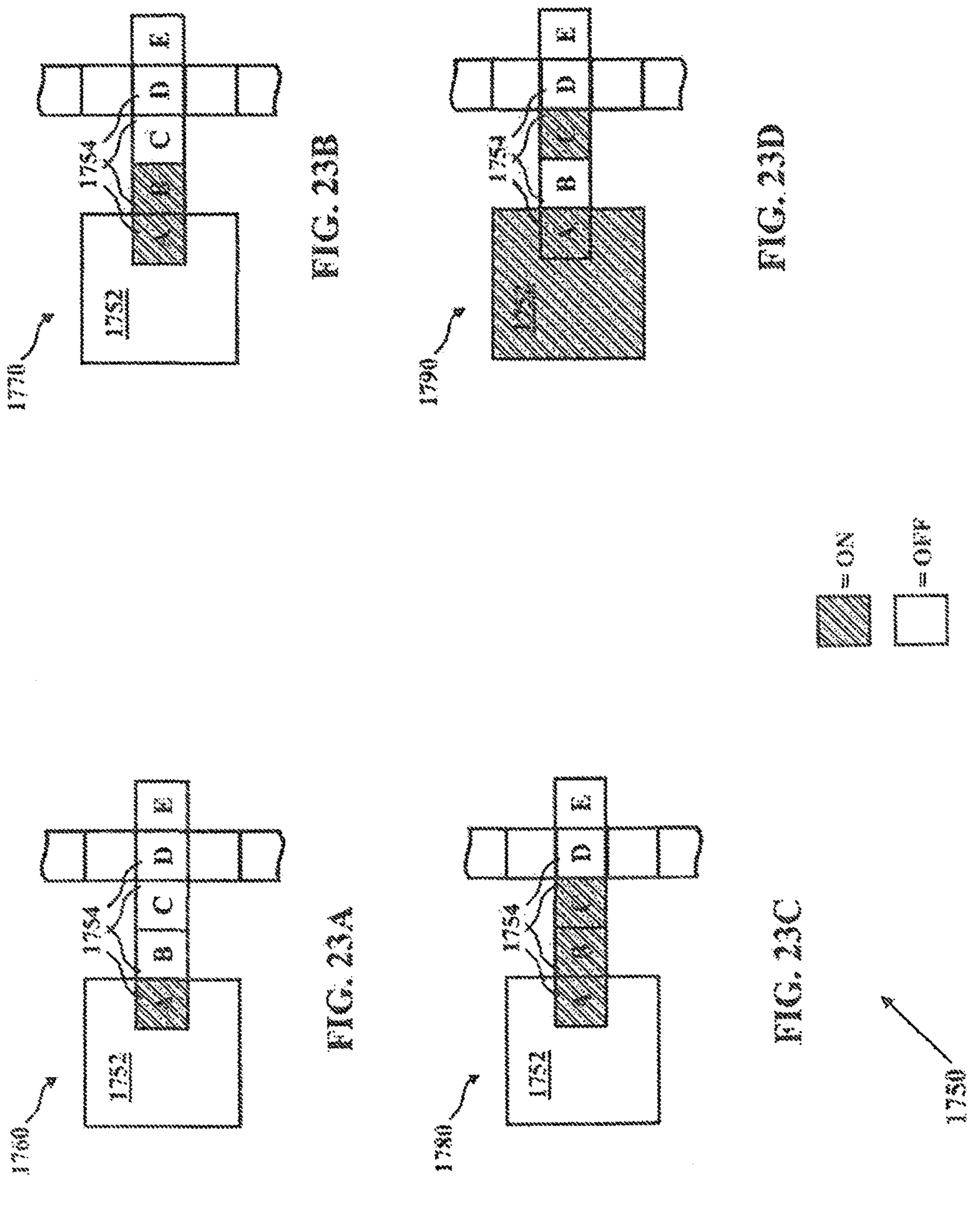

FIG. 23 illustrates the vector sequence. FIG. 23A illustrates a first vector 1760 in which the reservoir electrode 1752 is turned OFF, and droplet operations electrode 1754A is turned ON. Droplet operations electrodes 1754B, 1754C, 1754D, and 1754E are turned OFF. FIG. 23B illustrates a second vector 1770 in which the reservoir electrode 1752 is turned OFF, the droplet operations electrodes 1754A and 1754B are turned ON, and the droplet operations electrodes 1754C, 1754D, and 1754E are turned OFF. FIG. 23C illustrates a third vector 1780 in which the reservoir electrode 1752 is turned OFF, the droplet operations electrodes 1754A, 1754B, and 1754C are turned ON, and the droplet operations electrodes 1754D and 1754E are turned OFF. FIG. 23D illustrates a fourth vector 1790 in which the reservoir electrode 1752 is turned ON, the droplet operations electrodes 1754A and 17540 are turned ON, and the droplet operations electrodes 1754B, 1754D, and 1754E are turned OFF. Upon the execution of the fourth vector 1790, the dispense sequence 1750 may be completed. At the completion of the dispense sequence 1750, a droplet (not shown for simplicity) has been dispensed from the reservoir electrode 1752 to the droplet operations electrode 1754C.

FIG. 24 is a schematic illustrating a sequence schedule 1800, according to exemplary embodiments. The sequence schedule 1800 is one example of the sequence schedule 1732, of the assay development application 1702, illustrated in FIG. 22. Here the sequence schedule 1800 is formed of multiple sequences (such as the sequences 1710 illustrated in FIG. 22) to sequentially dispense three (3) droplets from the fluid reservoir (not shown for simplicity) and then transport the three droplets to three (3) different electrodes. In this example, then, the assay development application 1702 was used to create three dispense sequences and three transport sequences. Each dispense sequence is followed by a transport sequence. Additionally, the dispense sequences may occur one after the other. The sequence schedule 1800 may include a dispense sequence 1810A followed by a transport sequence 1812A, a dispense sequence 1810B followed by a transport sequence 1812B, and a dispense sequence 1810C followed by a transport sequence 1812C.

Figure 24A:
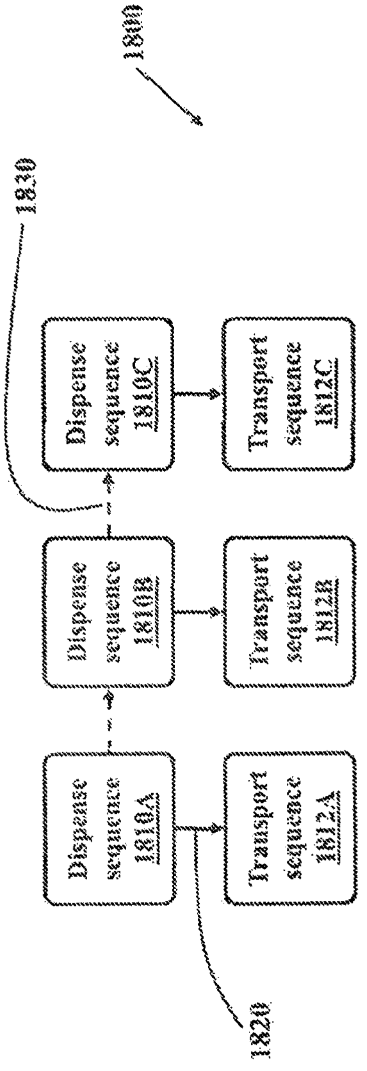

FIG. 24A also illustrates the reservoir electrode 1752 feeding the droplet operations electrodes 1754. In this example, the dispense sequence 1810A dispenses a first droplet (not shown) from the reservoir electrode 1752. The transport sequence 1812A then sequentially transports this first droplet along the droplet operations electrodes 1754 to the droplet operations electrode 1754L. At any point in time, after the first droplet is dispensed and while the first droplet is being transported, the dispense sequence 1810B may dispense a second droplet (not shown) from the reservoir electrode 1752. The following transport sequence 1812B transports this second droplet along the droplet operations electrodes 1754 to the droplet operations electrode 1754H. At another point in time, after the second droplet is dispensed and while the first and second droplets are being transported, the dispense sequence 1810C dispenses a third droplet (not shown) from the reservoir electrode 1752. The third transport sequence 1812C transports this third droplet along the operations electrodes 1754 to the droplet operations electrode 1754D. FIG. 24A thus illustrates parallel sequences in which at least portions of the dispense sequence 1810A, the transport sequence 1812A, the dispense sequence 1810B, the transport sequence 1812B, and the dispense sequence 1810C and transport sequence 1812C may be occurring in parallel.

The assay development application 1702 may also define types of relationships between vectors and/or sequences. One type of relationship is herein termed a "parent/child" relationship. A parent/child relationship occurs when a sequence directly transfers control of a droplet to another sequence. In FIG. 24, for example, there is a parent/child relationship between the dispense sequence 1810A and the transport sequence 1812A. That is, droplet control is directly transferred from the dispense sequence 1810A to the transport sequence 1812A. FIG. 24 illustrates this parent/child relationship as a solid line (illustrated as reference numeral 1820) that connects the dispense sequence 1810A to the transport sequence 1812A. There is also a parent/child relationship between the dispense sequence 1810B and the transport sequence 1812B. That is, droplet control is directly transferred from the dispense sequence 1810B to the transport sequence 1812B. There is also a parent/child relationship between the dispense sequence 1810C and the transport sequence 1812C. That is, droplet control is directly transferred from the dispense sequence 1810C to the transport sequence 1812C.

By contrast, another type of relationship is termed a "predecessor/successor" relationship. A predecessor/successor relationship occurs when timing dependencies require that a sequence cannot begin until its predecessor sequence is completed. FIG. 24 illustrates the predecessor/successor relationships as dotted lines (illustrated as reference numeral 1830) between sequences. For example, there is a predecessor/successor relationship between the dispense sequence 1810A and the dispense sequence 1810B. That is, the dispense sequence 1810B is constrained and cannot occur until its predecessor sequence (the dispense sequence 1810A) is completed. There is a predecessor/successor relationship between the dispense sequence 1810B and the dispense sequence 1810C. That is, the dispense sequence 1810C cannot occur until its predecessor sequence (the dispense sequence 1810B) is completed.

The assay development application 1702 may also define "root" vectors. A root vector is any vector having zero or more parents and zero or more predecessors. Vectors with no parents and no predecessors are "root" vectors and may immediately execute. The dispense sequence 1750 (illustrated in FIG. 23), for example, may never have a "parent." The dispense sequence 1750 may inherently be the beginning of droplet control. A waste sequence, as another example, may never have a "child" because it is inherently the ending of droplet control. The primary impact of a parent/child relationship is that the final vector of a parent sequence may need to remain active until all of its children sequences are activated.

Figure 24B:
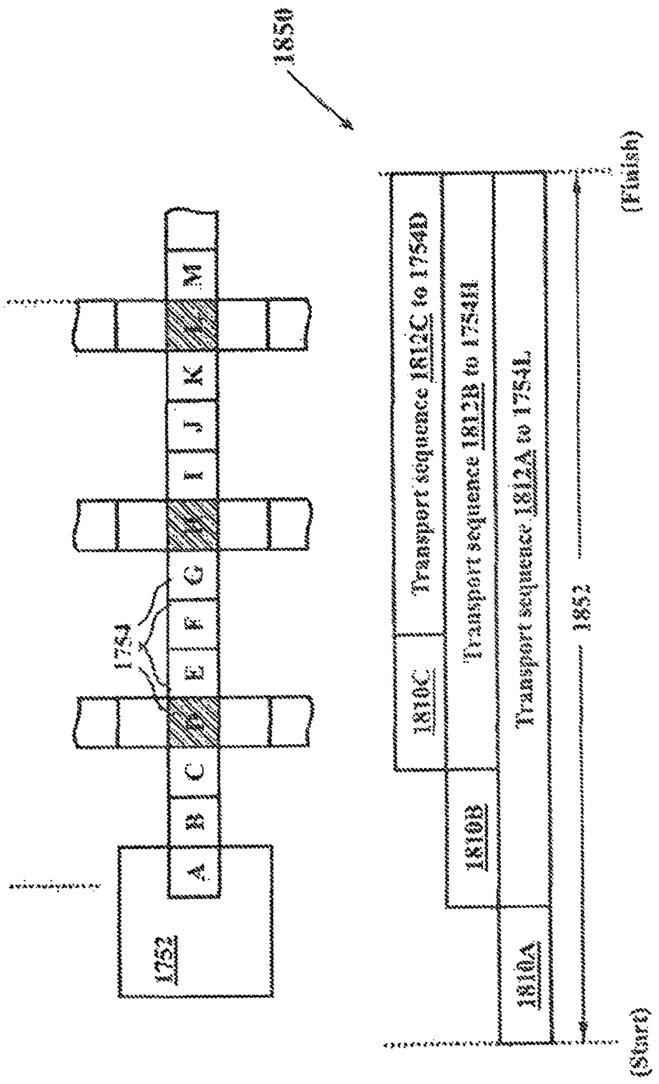

FIG. 24B is a schematic illustrating the use of a Gantt chart 1850, according to exemplary embodiments. The Gantt chart 1850 illustrates the duration 1852 of the sequence schedule 1800 illustrated in FIG. 24A. The Gantt chart 1850 graphically illustrates the start and finish times for each sequence. The Gantt chart 1850 depicts that certain sequences in the sequence schedule 1800 are occurring in parallel in time. The Gantt chart 1850 is one example of the software plug-in feature (illustrated as reference numeral 1726 in FIG. 22) available from the assay development application 1702.

The Gantt chart 1850 additionally depicts the parent/child relationships. FIG. 24B illustrates that droplet control is directly transferred from the dispense sequence 1810A to the transport sequence 1812A. The Gantt chart 1850 also illustrates that droplet control is directly transferred from the dispense sequence 1810B to the transport sequence 1812B, and that droplet control is directly transferred from the dispense sequence 1810C to the transport sequence 1812C.

The Gantt chart 1850 additionally depicts the predecessor/successor relationships. FIG. 24B illustrates that the dispense sequence 1810B does not occur until its predecessor sequence (the dispense sequence 1810A) is complete. The dispense sequence 1810C does not occur until its predecessor sequence (the dispense sequence 1810C) is complete.

FIG. 25 is a nodal flowchart illustrating a schedule of sequences, according to exemplary embodiments. FIG. 25 illustrates the specific flow of the sequence schedule 1800 from vector to vector and from sequence to sequence. FIG. 25 also illustrates parallel occurrences of certain vectors and/or sequences. FIG. 25 also illustrates parent/child relationships and predecessor/successor relationships.

Each vector 1712 is represented as a node 1860 in a tree 1870 of nodes. The sequence schedule 1800 begins a "Start" (or time $t_0$) and ends at "Finish" (or $t_F$). Nodes "1.0," "1.1," "1.2," and 1.3 represent, respectively, the vectors 1712 associated with the dispense sequence 1810A (illustrated in FIG. 24). Nodes "2.0" through "2.8" represent, respectively, the vectors associated with the transport sequence 1812A (illustrated in FIG. 24). Nodes "3.0" through "3.3" represent, respectively, the vectors associated with the dispense sequence 1810B (illustrated in FIG. 24). Nodes "6.0" through "6.4" represent, respectively, the vectors associated with the transport sequence 1812B (illustrated in FIG. 24). Nodes "4.0" through "4.3" represent, respectively, the vectors associated with the dispense sequence 1810C (illustrated in FIG. 24). The node "5.0" represents the vector associated with the transport sequence 1812C (illustrated in FIG. 24).

FIG. 25 illustrates that vectors "2.0" and "3.0" may simultaneously start when vector 1.3 ends. Vectors "4.0" and "6.0" may, likewise, commence when vector "3.3" ends. Vectors "2.4," "6.0," and "4.0" may thus be simultaneously processed.

FIG. 26 is another nodal flowchart illustrating the sequence schedule 1800, according to exemplary embodiments. Here, though, the sequence schedule 1800 may incorporate or integrate one or more of the actions 1720. As earlier paragraphs explained, the sequence scheduling algorithm 1704 called by the assay development application 1702 generates a program instead of a sequence, where the sequence scheduling algorithm 1704 includes the actions 1720 in the proper locations. FIG. 26, for example, illustrates a first sequence 1900 (illustrated as vectors "1.0" through "1.2"), followed by a second sequence 1910 (e.g., vectors "2.0" through "2.2"), and followed by a third sequence 1920 (e.g., vectors "3.0" through "3.2"). FIG. 26 also illustrates one or more of the actions 1720 that have been inserted into the sequence schedule 1800 by the assay development application 1702. Each action 1720 may be inserted into the sequence schedule 1800 as if each action 1720 was itself a sequence vector. The sequence scheduling algorithm 1704 may determine an optimal insertion point in the sequence schedule 1800. Each action 1720 may be a software module or routine that is called by the sequence scheduling algorithm 1704 and/or the assay development application 1702 (illustrated in FIGS. 21 and 22). The sequence scheduling algorithm 1704 may define one or more insertion points that call the corresponding action 1720. When an insertion point is encountered, the sequence schedule 1800 may pause and the action's corresponding software module or routine is called and/or executed. A result may be obtained, and then the sequence schedule 1800 resumes and picks up where it left off.

Suppose, for example, that the action 1720 is a detection operation. FIG. 26 illustrates that the sequence schedule 1800 begins by executing vector "1.0" of the first sequence 1900. When vector "1.2" is completed, the sequence schedule 1800 branches from vector "1.2" to the detection operation (the action 1720). At the completion of the detection operation, the sequence schedule 1800 returns to vector "2.0" of the second sequence 1910, which is where vector "1.2" of the first sequence 1900 would have connected without calling the subroutine of the detection operation. The second sequence 1910 is then executed. At the completion of the second sequence 1910, the sequence schedule 1800 branches from vector "2.2" to the detection operation (the action 1720). At the completion of the detection operation, the sequence schedule 1800 returns to vector "3.0" of the third sequence 1920, which is where vector "2.2" of the second sequence 1910 would have connected without calling the detection operation. The third sequence 1920 is then executed and the sequence schedule 1800 is completed.

Figure 27:
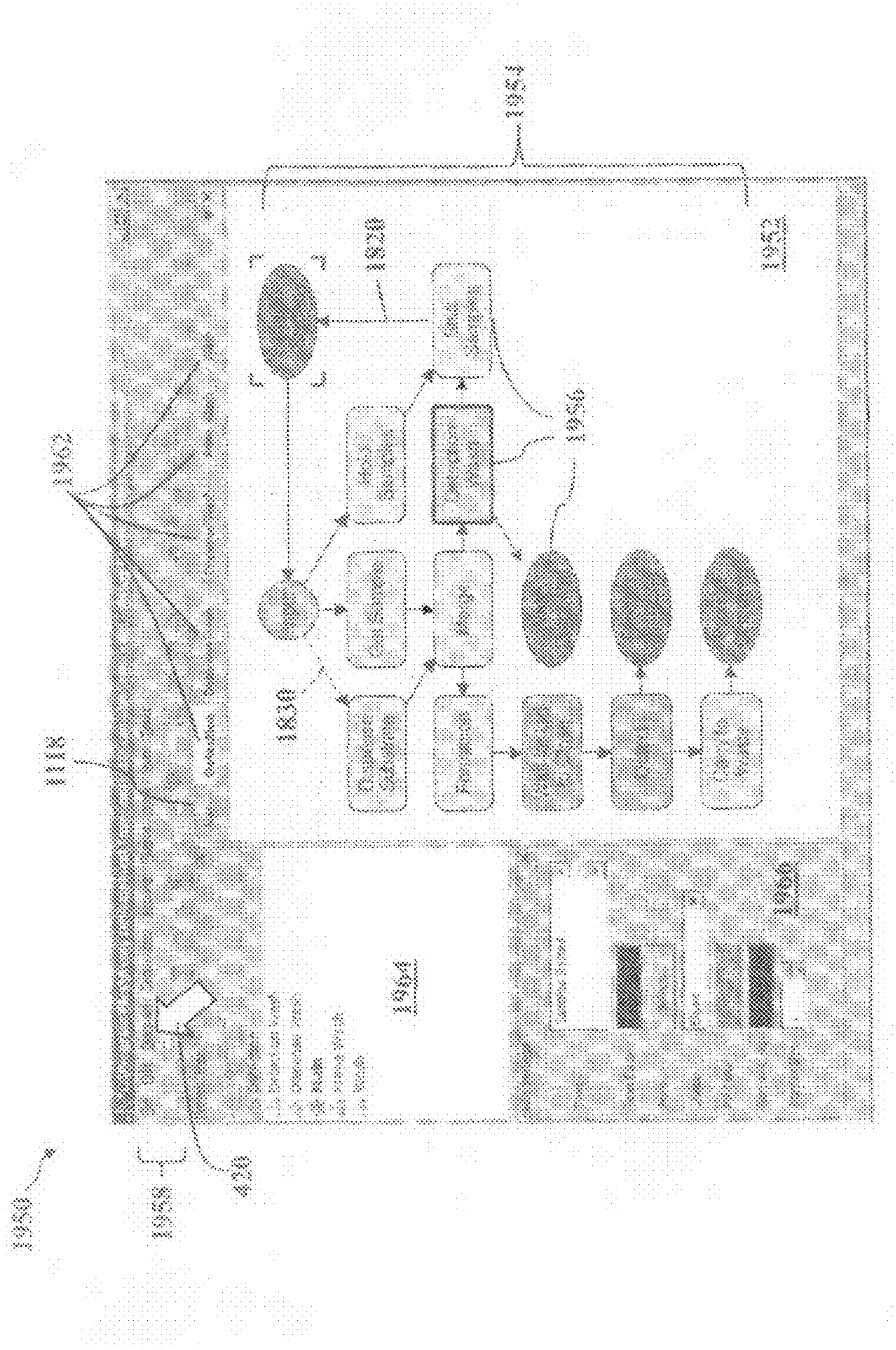

FIG. 27 is a screenshot of a main menu 1950, according to exemplary embodiments. The main menu 1950 may be one of the graphical menus (illustrated as reference numeral 1706 in FIG. 22) produced by the assay development application 1702. The main menu 1950 allows the user to easily develop assays in a graphical format. The main menu 1950, for example, may include an assay window 1952 in which assays are built in the form of one or more flow diagrams 1954. The flow diagrams 1954 are made up of building blocks that are represented by graphical icons 1956. Each graphical icon 1956 is associated with a particular function, procedure, or operation to be performed. The available building blocks are, for example, any components in the assay library 1708 and/or the diagram library 1730 illustrated in FIG. 22, such as any sequences 1710, any actions 1720, any inputs 1722, any outputs 1724, and any plug-ins 1726. Each icon 1956 may be associated with one or more attributes, depending on the type of building block. Each icon 1956, for example, may be associated with a color. Blue icons, for example, may denote the sequences 1710, while gray icons may represent the actions 1720. Green icons may be associated with the inputs 1722, and red icons may be associated with the outputs 1724. The user may select a desired building block of, for example, the assay library 1708 by placing the cursor 420 in a tool bar 1958 and making a selection. The tool bar 1958 may provide standard navigation tools, file management tools, function select tools, and the like. For example, among other things, the tool bar 1958 may include fields, such as, but not limited to, "File," "Edit," "Diagram," "Sequences," "Actions," "Plug-ins," "View," "Run," and "Tools." Once selected, the fields of tool bar 1958 may provide, for example, dropdown menus for making further selections.

Relationships may be defined in the flow diagrams 1954. Recall that the solid connecting line 1820 may be used to indicate the parent/child relationship between the icons 1956. The dashed connecting line 1830 may indicate the predecessor/successor relationship between the icons 1956. The inputs 1722 and the outputs 1724 may also define how looping/repeating occurs. Unique flow diagrams 1954 may be saved to the memory 132, for example, in the diagrams library 1730 illustrated in FIG. 21 and may be used when building any sequence schedule 1800.

Sub-diagrams may be built. FIG. 27 illustrates a main diagram tab 1118 that graphically illustrates a main diagram where execution of the sequence schedule 1800 begins. The main menu 1950, however, may also display other tabs associated with sub-diagrams. The sequence schedule 1800 may be logically divided into groups, thus simplifying the flow diagrams 1954 into smaller, logical portions. FIG. 27, then, illustrates one or more sub-diagram tabs 1962 that are associated with sub-portions of the assay window 1952.

Additionally, sub-diagrams can have a number of iterations specified to repeat more than once.

The main diagram tab 1118 and the sub-diagram tabs 1962 allow the user to rapidly select any portion of the current sequence schedule 1800. A collection of one or more flow diagrams 1954 that are created in the assay window 1952 visually represents the sequence schedule 1800 that is solved by the sequence scheduling algorithm 1704. The flow diagram 1954 illustrated in FIG. 27 is an example of a sequence schedule 1800 that detects a first droplet in a detection queue, then shifts any remaining droplets up to prepare for the next detection, and loops several times to detect all samples.

The main menu 1950 may also include other tools. A project tree viewing window 1964 provides a logical or hierarchical tree representation of the flow diagrams 1954 forming the current sequence schedule 1800. The contents of project tree viewing window 1964 may correspond to the main diagram tab 1118 and the sub-diagram tabs 1962 of the assay window 1952. The main menu 1950 may further include a styles settings window 1966, which allows the user to edit any attribute (e.g., text, text color, shape, fill color, border color, and border size) associated with a selected one of the icons 1956 in the flow diagram 1954.

Figure 28:
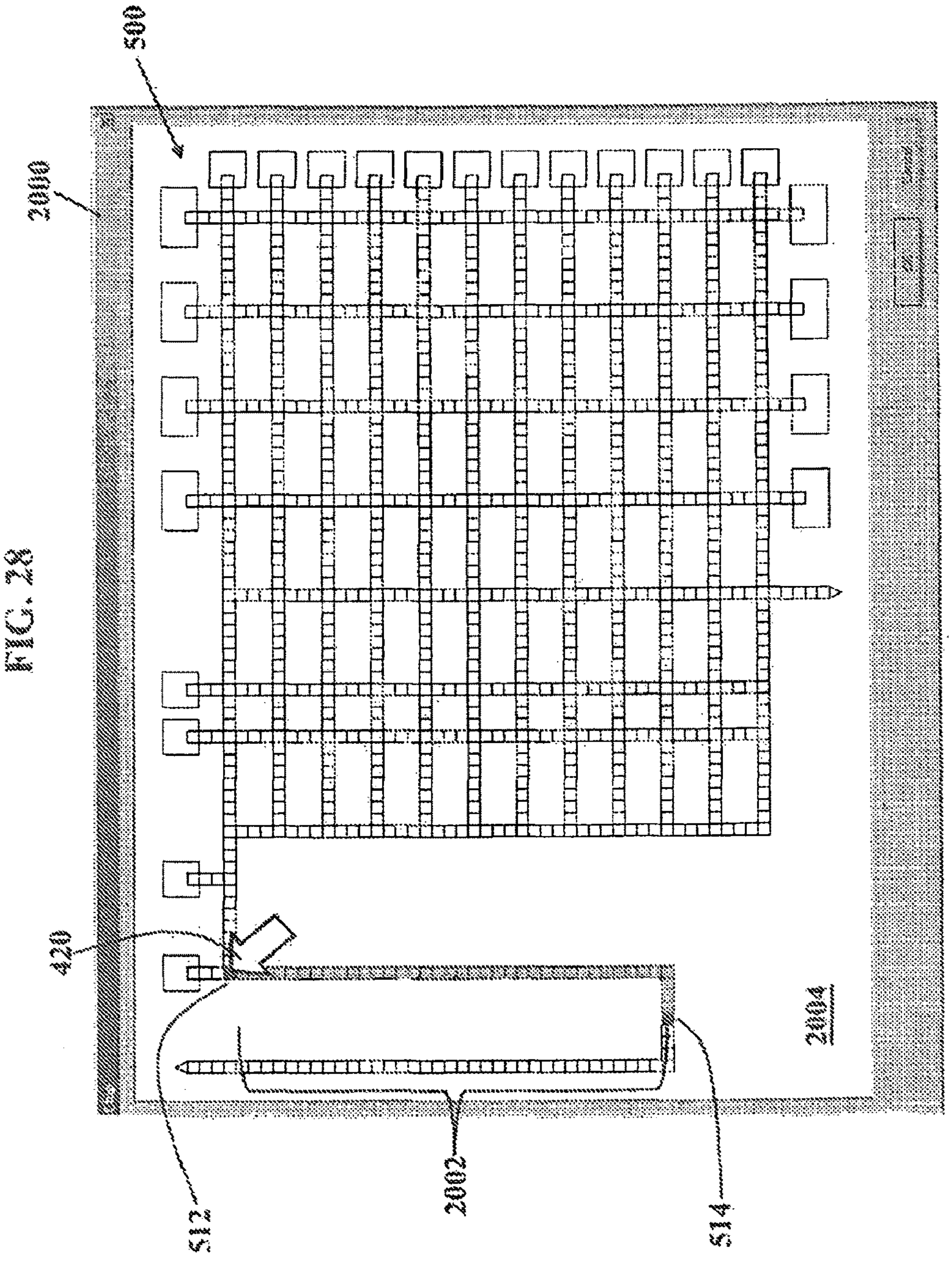

FIG. 28 is a screenshot of another graphical user interface 134, according to exemplary embodiments. FIG. 28 illustrates a transport sequence menu 2000, which may be one of the graphical menus 1706 (illustrated in FIG. 21) produced by the assay development application 1702. The transport sequence menu 2000 may be used for defining a transport sequence 2002, thereby defining a transport route in the droplet actuator 102. The transport sequence menu 2000 includes a viewing window 2004 that visually reproduces an electrode configuration of a certain droplet actuator for which the assay is being developed. (For simplicity, FIG. 28 illustrates the electrode configuration 500 as shown in FIG. 8.) The transport sequence menu 2000 allows a user to quickly and easily define the transport sequence 2002. The user merely selects the start location 512 and the end location 514 of the desired transport sequence 2002. The user, for example, places the cursor 420 and clicks or otherwise selects the start location 512 and the end location 514. Once the start location 512 and the end location 514 of the desired transport sequence 2002 is defined, the assay development application 1702 stores the transport sequence 2002 in the memory 132 (illustrated in FIG. 21) as one of sequences in the assay library 1708 (illustrated in FIG. 22).

Figure 29:
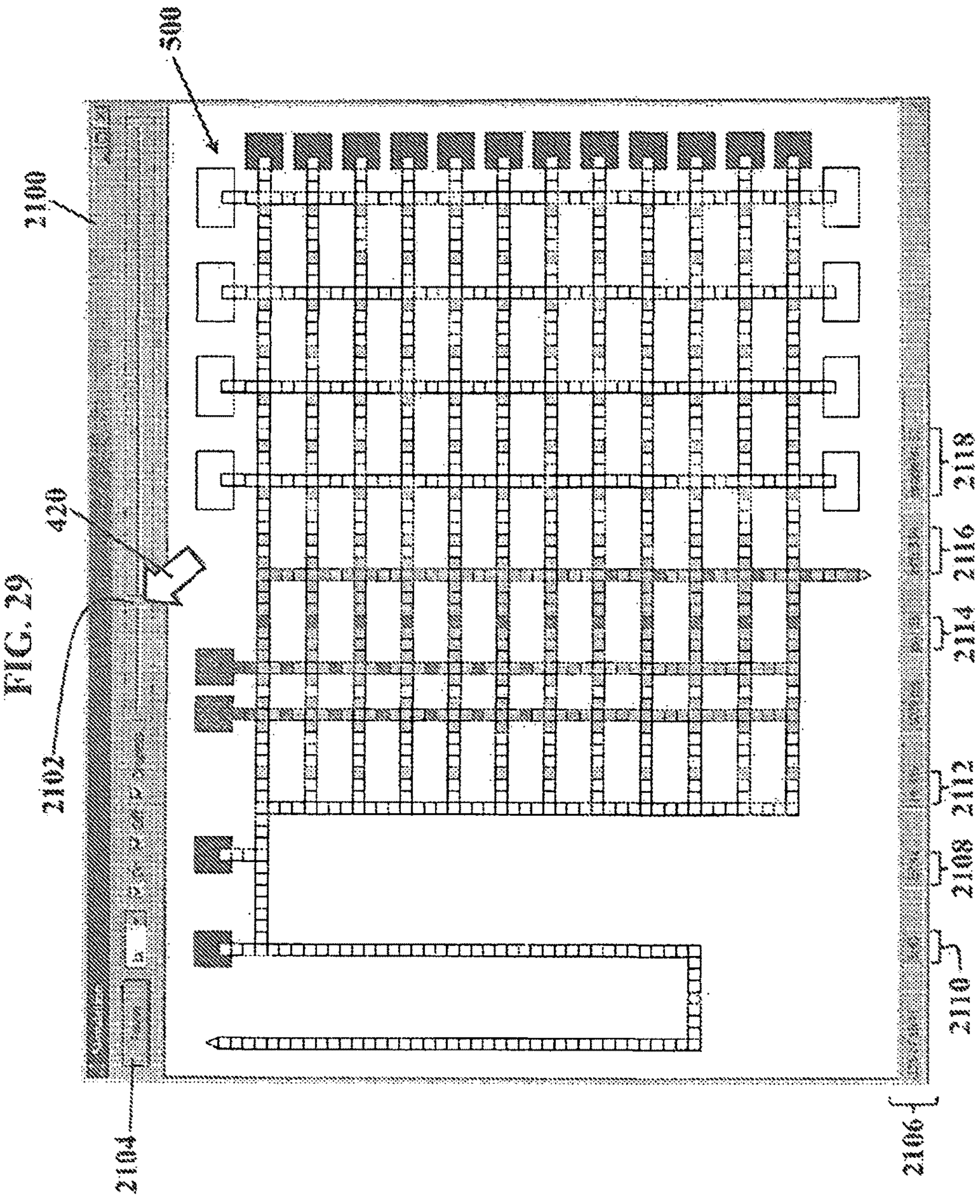

FIG. 29 is a screenshot of another graphical user interface 134, according to exemplary embodiments. FIG. 29 illustrates a simulation menu 2100, which may be another one of the graphical menus 1706 (illustrated in FIG. 21) produced by the assay development application 1702. FIG. 29 illustrates how the assay development application 1702 simulates the assay that is being developed at any time. The assay development application 1702 may call or invoke the simulation component 1740 illustrated in FIG. 22. The simulation component 1740 is a software module or application that graphically simulates the sequential, digital movement of a droplet in the electrode configuration 500. The simulation menu 2100 may graphically represent the electrode configuration associated with the droplet actuator 102. Again, for simplicity, FIG. 29 illustrates the electrode configuration 500 as shown in FIG. 8. The simulation menu 2100 includes graphical controls that allow the user to view the position of the droplet, or droplets, at any point in time during an assay. The assay may be automatically simulated from start to finish, or the user may manually adjust the timing. A slider control 2102, for example, graphically illustrates the running time of the assay, from start to finish. The user may also place the cursor 420 on the slider control 2102 and manually jumps ahead or backwards to another point in time. The slider control 2102 thus permits the user to manually view the assay in forward or reverse time. A pause control 2104 stops the simulated assay at any moment in time, and another selection of the pause control 2104 resumes the simulation. A status bar 2106 may also be visually produced, and the status bar 2106 presents useful, statistical information associated with the simulated assay. The status bar 2106, for example, displays a total duration 2108 of the simulated assay, a current time 2110 of the assay, a percentage completion 2112 of the simulated assay, the number 2114 of ON electrodes and the number 2116 of OFF electrodes at any moment in time, and a total number 2118 of droplets manipulated within the electrode configuration 500.

Figure 30:
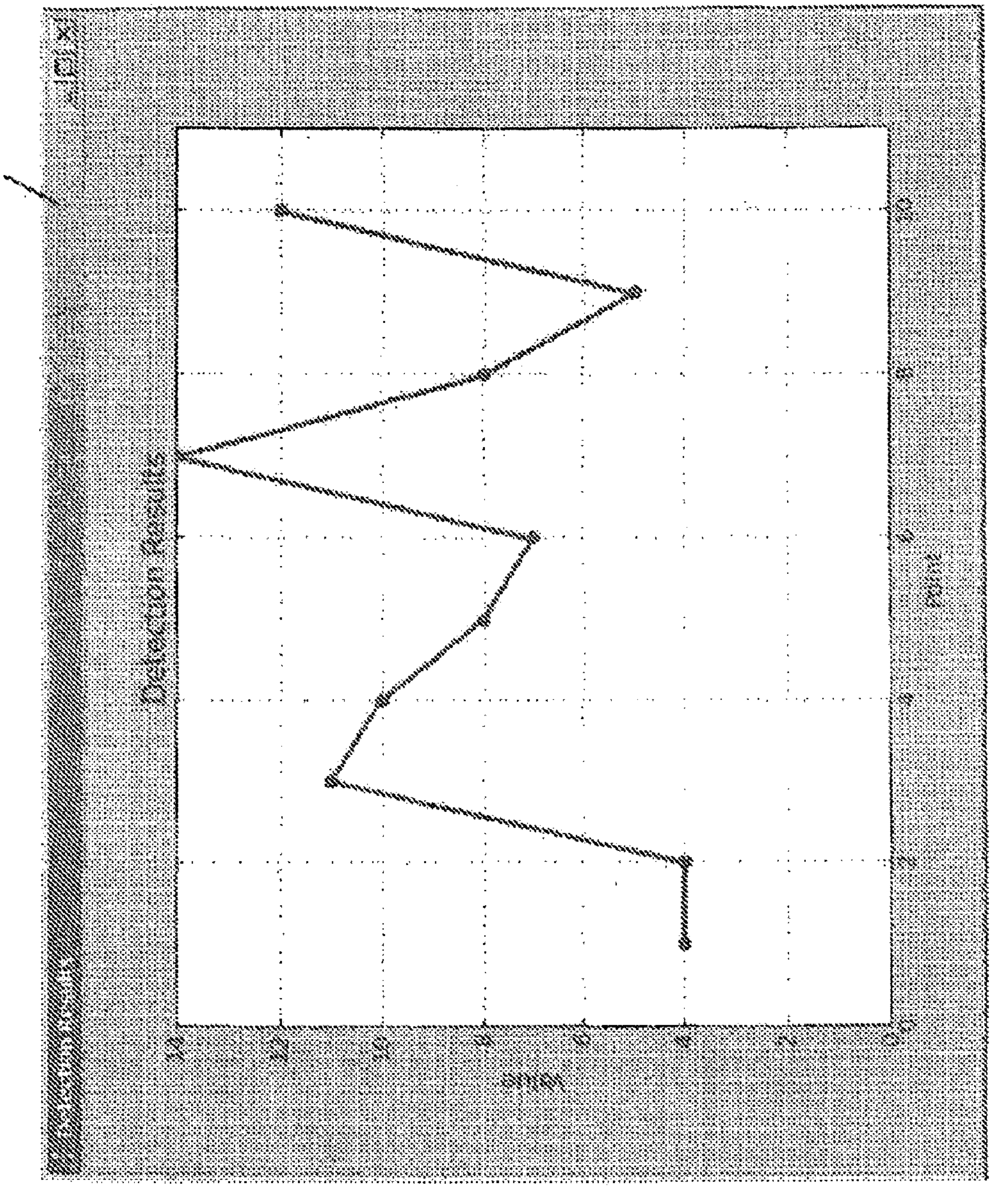

FIG. 30 is a screenshot of another graphical user interface 134, according to exemplary embodiments. FIG. 30 illustrates a graph 2200, which may be another one of the plug-in features 1726 (such as a graphing plug-in) illustrated in FIG. 21 that may be called by the assay development application 1702. The graphing plug-in 1726 may be a software application that produces any visual representation of data. FIG. 30, for example, is a plot of detection value vs. detection location in the simulated electrode configuration (illustrated as reference numeral 500 in FIGS. 28 and 29).

FIGS. 21-30 illustrate the ease with which assays may be created using the assay development application 1702. The sequence scheduling algorithm 1704 and the associated graphical menus 1706 allow an assay developer to quickly and easily create basic sequences (such as the dispense sequence 1750 and the transport sequence 2002). The assay developer may then easily add the newly created sequence to the sequence schedule 1800 and specify any predecessor sequences. The sequence scheduling algorithm 1704 allows the sequence schedule 1800 to be compiled into a single sequence that performs all of the input sequences in the specified order, parallelizing sequences where possible. Any sequence may be developed, ranging from simple sequences (such as dispensing several droplets to some destinations) to very complex sequences (such as pipelining assays). An example of pipelining assays is where an second assay begins while a first assay is still in detection. The sequence scheduling algorithm 1704 may solve simple schedules in, for example, about one second or less, while most large and complex schedules are solved in, for example, about one minute or less.

Each sequence 1710 may be associated with certain properties. Each sequence 1710, for example, may be associated with, but not limited to, "ON" vectors, "OFF" vectors, and duration (such as milliseconds). Associated with each sequence 1710 may also be certain attributes or flags. For example, a "fixed flag" means that the sequence must not be stalled (i.e., held up). This is useful for splitting, dispensing and other time-sensitive sequences. A "variable flag" means that the exact duration of the sequence is not known at compile time and, as such, it should not be merged with a fixed sequence. A "priority flag" means that a sequence 1710 having a priority value X is never merged with any other sequence having a priority value less than X.

The sequence scheduling algorithm 1704 provides the ability to merge sequences. For example, two sequences are not mergeable when (1) their "ON" and "OFF" vectors conflict; (2) one sequence is "fixed" and the other is "variable;" (3) merging them results in a "fixed" sequence running for longer than its specified duration; (4) their priorities conflict; and (5) merging them results in an assertion less than 100 milliseconds (configurable, occurs in out-of-sync parallelization).

No sequences may be mergeable if and only if all pairs of the sequences are mergeable. If a merge fails, the sequence scheduling algorithm 1704 tries a different execution path higher up in the sequence graph. The sequence schedule 1800 is an example of a sequence schedule that has no merge conflicts.

The sequence scheduling algorithm 1704 of the assay development application 1702 generates valid initial states (i.e., all mergeable combinations of the root vectors). For each initial state, the sequence scheduling algorithm 1704 generates valid follow-up states, such as, but not limited to, the following: (1) for each vector in the current state, generate its valid follow-ups; (2) combine the individual follow-up states; (3) attempt introducing runnable successor vectors; and (4) always attempt the most aggressive follow-up possible first, so that stalling only occurs when absolutely necessary.

The sequence scheduling algorithm 1704 may repeat in a recursive fashion. If no valid follow-up states are found, the sequence scheduling algorithm 1704 backtracks and tries a different execution path. When all vectors have been processed, the schedule has been solved and the result is returned. If a particular state is known to result in failure from a previous encounter in the search algorithm, it will not be searched again, which results in a significant speed improvement.

Figures 31, 31A, 31B, 31C, 31D:
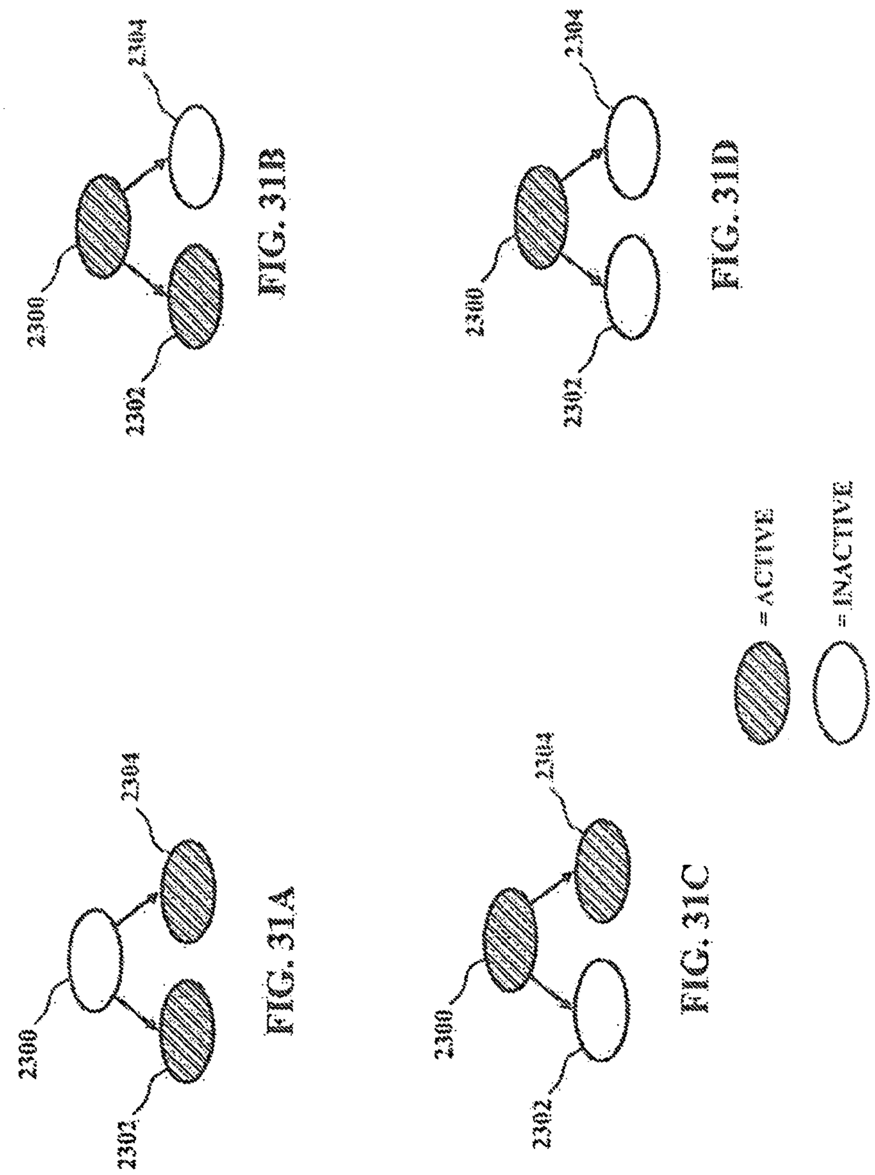

FIGS. 31A-31D are schematics illustrating follow-up states, according to exemplary embodiments. Each follow-up state may be generated by the sequence scheduling algorithm 1704 illustrated in FIG. 21. The valid follow-up states for a vector depend on the number of children vectors. For a certain vector, the sequence scheduling algorithm 1704 may first generate follow-up states for all children vectors. FIG. 31A, for example, illustrates a parent vector 2300 having two (2) children vectors 2302 and 2304. The sequence scheduling algorithm 1704 may first try to generate follow-up states for the two child vectors 2302 and 2304. Afterwards the sequence scheduling algorithm 1704 tries all permutations of active and inactive states. FIG. 31B, for example, illustrates how the sequence scheduling algorithm 1704 tries to make the parent vector 2300 active, while the child vector 2302 is active and the child vector 2304 is inactive. FIG. 31C illustrates how the sequence scheduling algorithm 1704 tries to make the parent vector 2300 active, while the child vector 2302 is inactive and the child vector 2304 is active. FIG. 31D illustrates how the sequence scheduling algorithm 1704 tries to make the parent vector 2300 active, while the child vector 2302 is inactive and the child vector 2304 is inactive. Rules may enforce logical conditions and/or physical constraints. The parent vector 2300, for example, may need to remain active until all the children vectors have become active, otherwise droplets may end up floating. This process may be performed for all active vectors and combined into a complete follow-up state.

FIGS. 32A-32C are schematics illustrating out-of-sync sequences, according to exemplary embodiments. "Out-of-sync sequences" are those sequences that have vectors of varying or different durations. The sequence scheduling algorithm 1704 illustrated in FIG. 21 may allow sequences with vectors of varying durations to simultaneously execute, while still respecting the requested durations of each sequence. FIG. 32A, for example, illustrates a first sequence 2400, while FIG. 32B illustrates a second sequence 2500. The first sequence 2400 and the second sequence 2500 however, are out-of-sync with each other. More specifically, the first sequence 2400 includes three vectors 2400A, 2400B, and 2400C. The vectors 2400A, 2400B, and 2400C have, for example, a duration of about one (1) second and, therefore, the first sequence 2400 has a total duration of about three (3) seconds. The second sequence 2500 includes two vectors 2500A and 2500B. Both vectors 2500A and 2500B have, for example, a duration of about 1.5 seconds and, therefore, the second sequence 2500 also has a total duration of about three (3) seconds.

FIG. 32C illustrates a third sequence 2600. The third sequence 2600 visually presents an example of how the first sequence 2400 and the second sequence 2500 are permitted to simultaneously execute, despite having sub-vectors of varying durations. The sequence scheduling algorithm 1704 respects the requested durations of both sequences 2400 and 2500. The sequence scheduling algorithm 1704, for example, may merge the first sequence 2400 and the second sequence 2500 into the third sequence 2600. The third sequence 2600 may thus have four (4) sub-vectors, i.e., vectors 2600A, 2600B, 2600C, and 2600D. Vector 2600A is executing all of vector 2400A of the first sequence 2400 in parallel with the first portion of vector 2500A of the second sequence 2500 and, thereby, vector 2600A is able to achieve a duration of about 1 second. Vector 2600B is executing the first portion of vector 2400B of the first sequence 2400 in parallel with the second portion of vector 2500A of the second sequence 2500 and, thereby, vector 2600B is able to achieve a duration of about 0.5 seconds. Vector 2600C is executing the second portion of vector 2400B of the first sequence 2400 in parallel with the first portion of vector 2500B of the second sequence 2500 and, thereby, vector 2600C is able to achieve a duration of about 0.5 seconds. Vector 2600D is executing all of vector 2400C of the first sequence 2400 in parallel with the second portion of vector 2500B of the second sequence 2500 and, thereby, vector 2600D is able to achieve a duration of about 1 second. As a result, the third sequence 2600 has a total duration of about three (3) seconds, which substantially matches the total duration of both the original sequences 2400 and 2500. In this way, the out-of-sync sequences 2400 and 2500 can run simultaneously and with the same duration.

Examples of situations in which out-of-sync sequences may occur include, but are not limited to (1) Washing: Out-of-sync wash dispensing and waste disposal; (2) Detection: Heavy parallelization. Out-of-sync sequences. Good example of splitting sequences and using fixed & variable nodes; (3) Pipelining Assays: The ultimate schedule; and (4) Pyrosequencing: Heavy parallelization. Large time savings in assay duration.

A limitation of handling out-of-sync sequences may be that the output vectors may not be less than a configurable duration (typically 100 milliseconds). If this occurs, the sequence scheduling algorithm 1704 may briefly stall one or more sequences in order to re-synchronize.

Other features of the assay development application 1702 may include, but are not limited to, (1) the ability to generate visual graphs (e.g., graph 2200 of FIG. 30) and Gantt charts (e.g., the Gantt chart 1850 of FIG. 24B); (2) the ability to split the output sequence at predefined vectors in the scheduler input. For example, this is useful when executing the actions 1720; (3) the integration with progress bars in the user interface; (4) the ability to provide debug output to assist locating problem spots in the schedule layout (e.g., where conflicts are occurring frequently); and (5) the ability to provide a summary output with statistical information on the schedule and the output sequence. An example of the contents of a summary output may be following.

Schedule computed in 1.41 seconds.
Sequence length=1429 vectors.
Sequence duration=1286.17 seconds.
Total vectors=4916.
Average parallelization=10.81 nodes per vector.
Maximum parallelization=13 nodes per vector.

Figure 33:
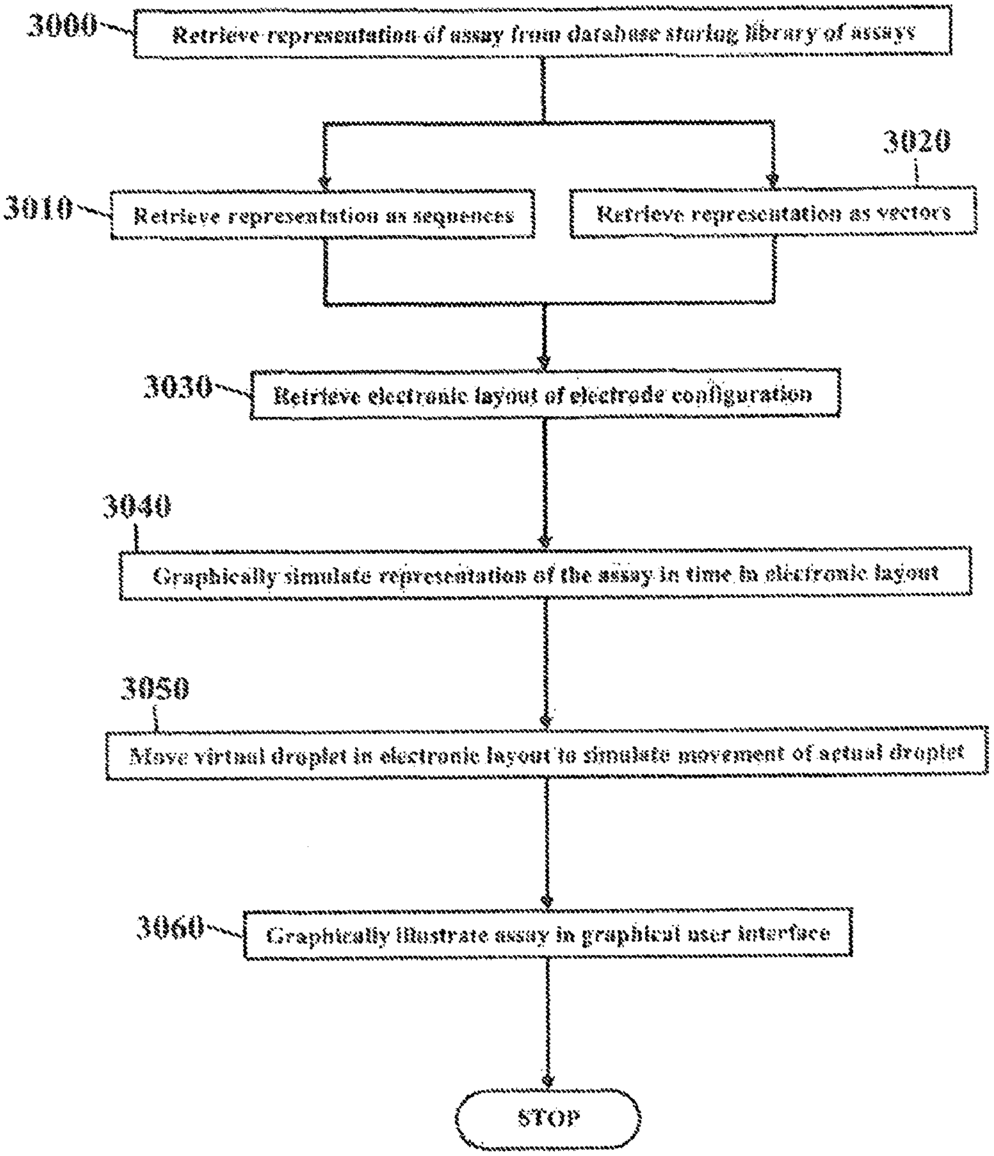

FIG. 33 is a flowchart illustrating a method for simulating an assay, according to exemplary embodiments. A representation of the assay is retrieved from a database storing a library of assays (Block 3000). The representation may be one or more sequences (Block 3010) and/or one or more vectors (Block 3020). An electronic layout of an electrode configuration is retrieved (Block 3030). The representation of the assay is graphically simulated in time in the electronic layout of the electrode configuration (Block 3040). A graphical or simulated droplet may be moved in the electronic layout of the electrode configuration to simulate movement of an actual droplet in the electrode configuration (Block 3050). The assay may be graphically illustrated in a graphical user interface (Block 3060).

Figure 34:
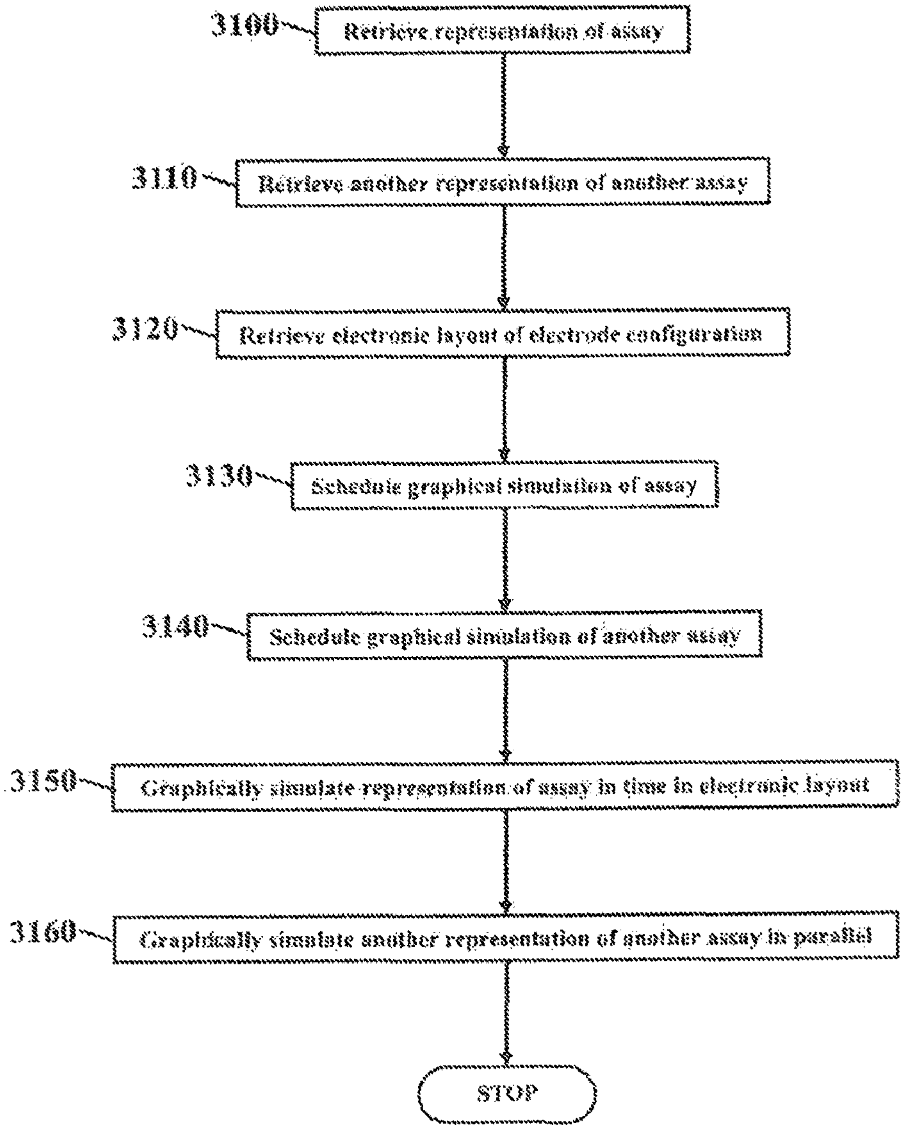

FIG. 34 is another flowchart illustrating the method for simulating an assay, according to exemplary embodiments. A representation of the assay is retrieved (Block 3100). Another representation of another assay is also retrieved (Block 3110). An electronic layout of an electrode configuration is retrieved (Block 3120). A graphical simulation of the assay is scheduled (Block 3130). A graphical simulation of the another assay is also scheduled (Block 3140). The representation of the assay is graphically simulated in time in the electronic layout of the electrode configuration (Block 3150). The another representation of the another assay is graphically simulated in parallel with the simulation of the assay (Block 3160).

Figure 35:
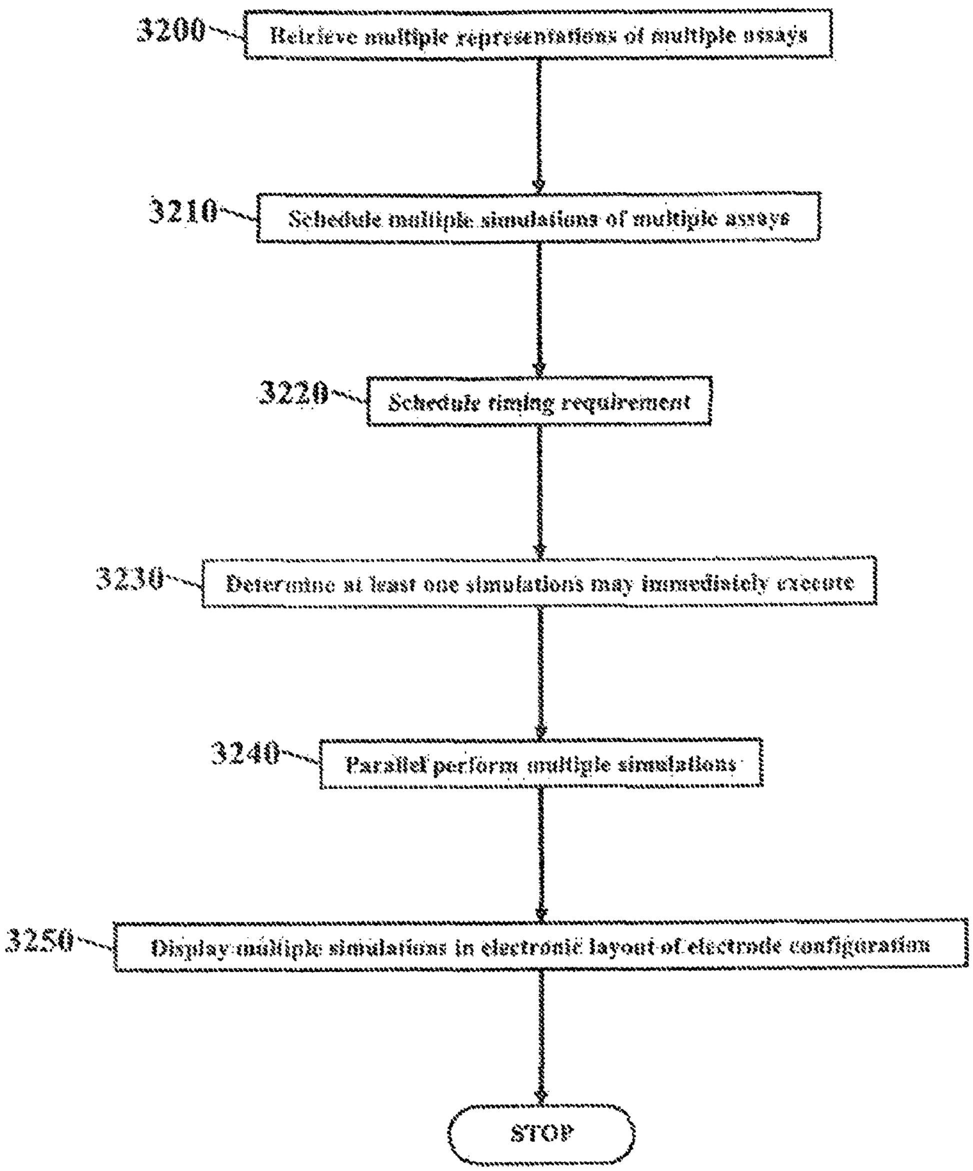

FIG. 35 is another flowchart illustrating the method for simulating an assay, according to exemplary embodiments. Multiple representations of multiple assays are retrieved (Block 3200). Multiple simulations of the multiple assays are scheduled (Block 3210). At least one timing requirement is scheduled (Block 3220). A determination is made that at least one of the simulations may immediately execute (Block 3230). The multiple simulations are performed in parallel (Block 3240). The multiple simulations may be displayed in an electronic layout of an electrode configuration (Block 3250).

Figure 36:
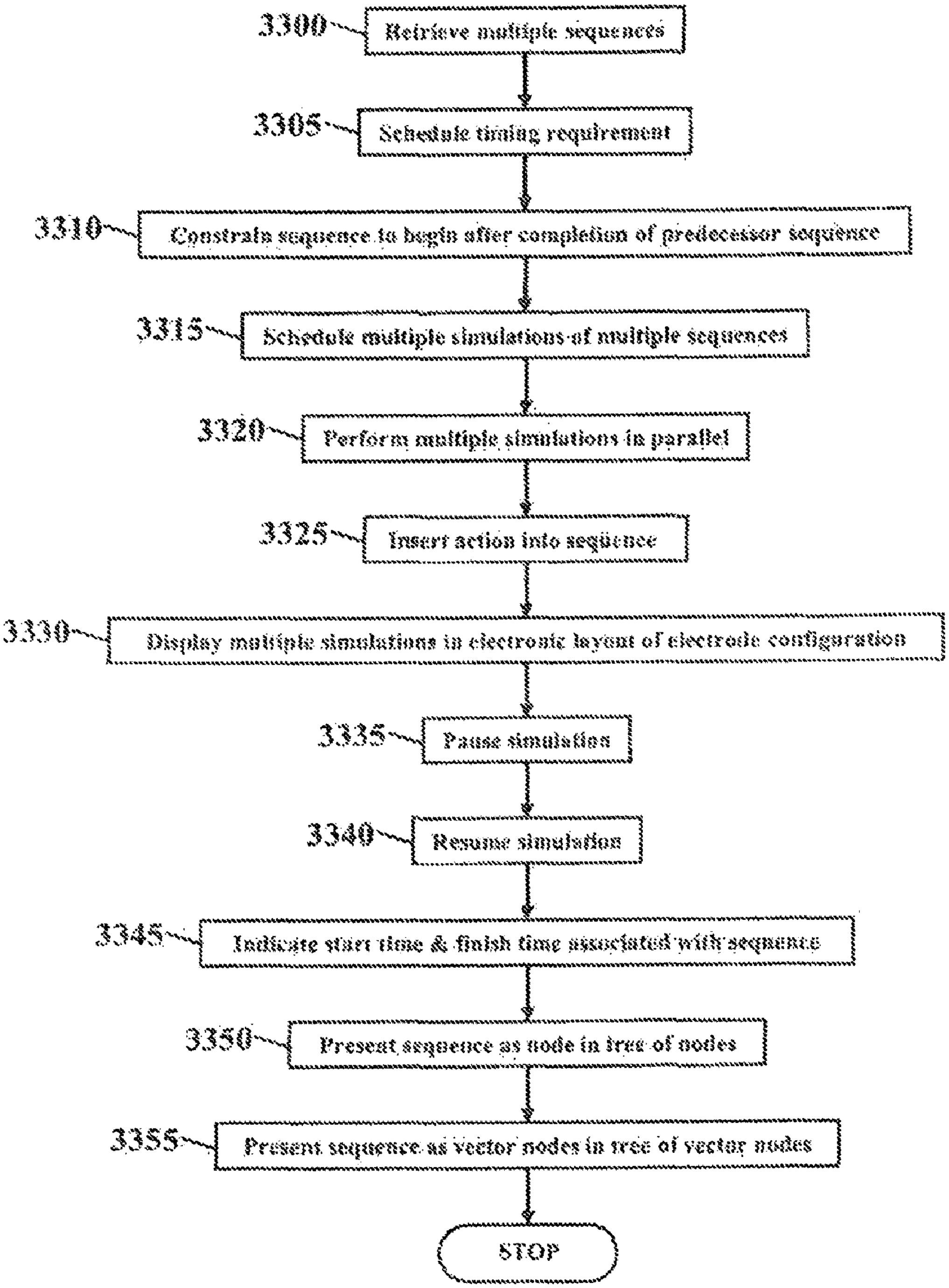

FIG. 36 is another flowchart illustrating the method for simulating an assay, according to exemplary embodiments. Multiple sequences associated with the assay are retrieved (Block 3300). At least one timing requirement is scheduled (Block 3305). At least one of the sequences may be constrained to begin after completion of a predecessor sequence (Block 3310). Multiple simulations associated with the multiple sequences are scheduled (Block 3315). The multiple simulations may be performed in parallel (Block 3320). An action may be inserted into at least one of the sequences (Block 3325). The multiple simulations may be displayed in an electronic layout of an electrode configuration (Block 3330). Any of the multiple simulations may be paused (Block 3335) and resumed (Block 3340). A start time and a finish time associated with any sequence may be graphically indicated (Block 3345). At least one of the sequences may be graphically presented as a node in a tree of nodes (Block 3350). At least one of the sequences may be graphically presented as vector nodes in a tree of vector nodes (Block 3355).

Figure 37:
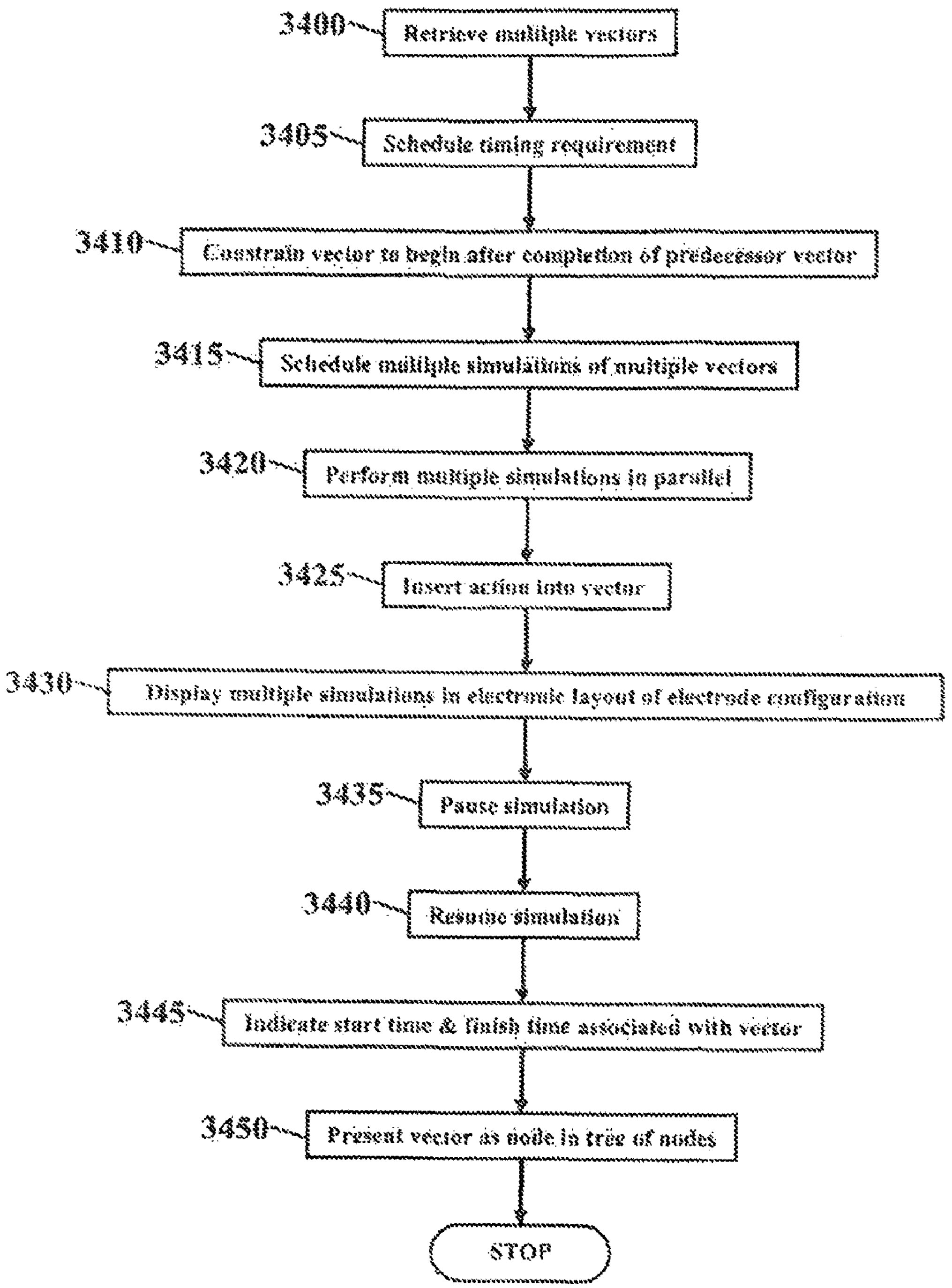

FIG. 37 is another flowchart illustrating the method for simulating an assay, according to exemplary embodiments. Multiple vectors associated with the assay are retrieved (Block 3400). At least one timing requirement is scheduled (Block 3405). At least one of the vectors may be constrained to begin after completion of a predecessor vector (Block 3410). Multiple simulations associated with the multiple vectors are scheduled (Block 3415). The multiple simulations may be performed in parallel (Block 3420). An action may be inserted into at least one of the vectors (Block 3425). The multiple simulations may be displayed in an electronic layout of an electrode configuration (Block 3430). Any of the multiple simulations may be paused (Block 3435) and resumed (Block 3440). A start time and a finish time associated with any vectors may be graphically indicated (Block 3445). At least one of the vectors may be graphically presented as a node in a tree of nodes (Block 3450).

Figure 38:
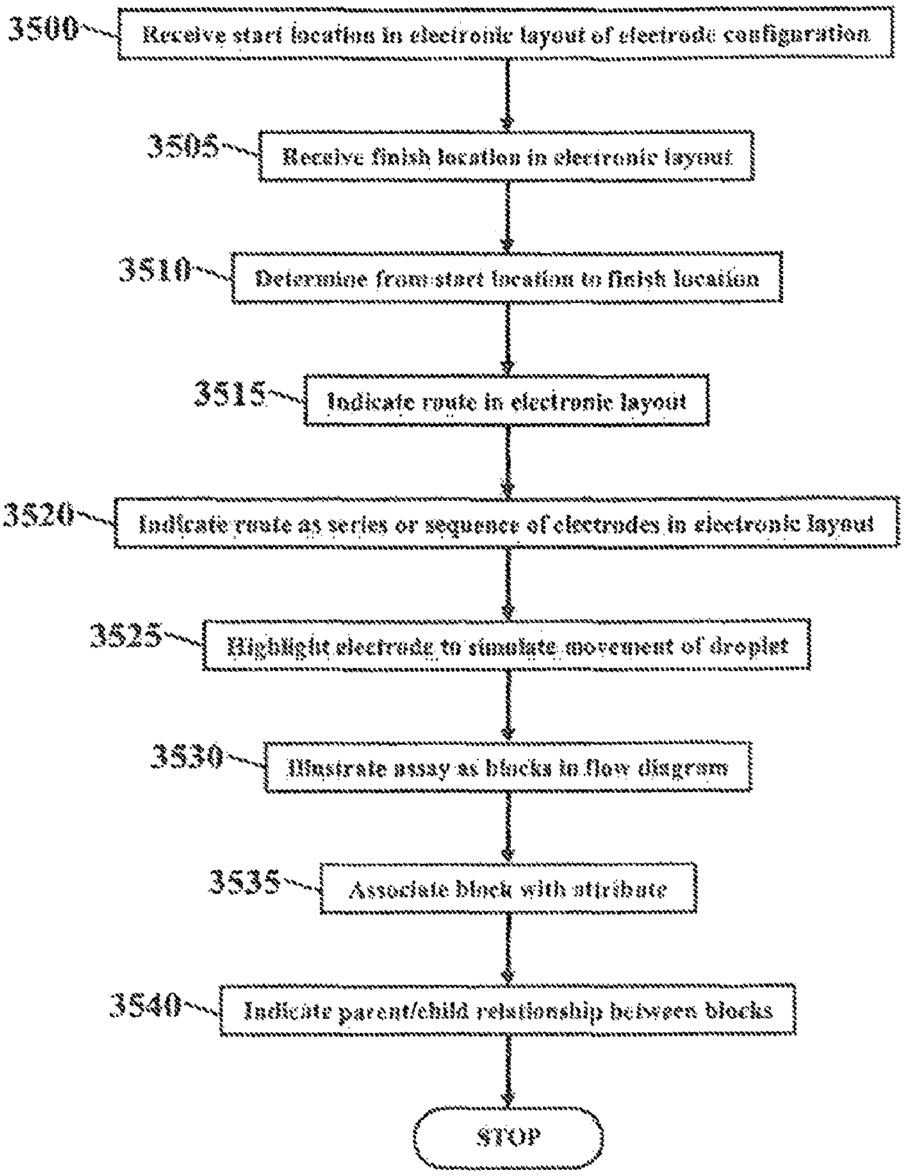

FIG. 38 is a flowchart illustrating a method for developing assays, according to exemplary embodiments. A start location associated with an assay is received in an electronic layout of an electrode configuration (Block 3500). A finish location associated with the assay is received in the electronic layout of the electrode configuration (Block 3505). A route is determined from the start location to the finish location (Block 3510). The route may be graphically indicated in the electronic layout of the electrode configuration (Block 3515). The route may be graphically indicated as a series or sequence of electrodes in the electronic layout of the electrode configuration (Block 3520). An electrode may be highlighted in the electronic layout of the electrode configuration to simulate movement of an actual physical droplet in the physical electrode configuration (Block 3525). The assay may be graphically illustrated in a graphical user interface as one or more blocks in a flow diagram (Block 3530). A block may be associated with an attribute (Block 3535). A parent/child relationship between blocks in the flow diagram may be indicated (Block 3540).

FIG. 39 is a schematic illustrating a driver model memory space 3600, according to exemplary embodiments. FIG. 38 illustrates the microfluidics system 200, with the controller 100 executing the electrowetting application 202 stored in the memory 132. Here, though, the processor 130 may advantageously configure the memory 132 to include the driver model memory space 3600. The driver model memory space 3600 is at least a portion of the memory 132 that is dedicated to, or reserved for, software drivers for peripheral devices. The driver model memory space 3600 is separated into at least two (2) parts. A first part 3610 is reserved for regular variables that are used to read and write data and to store results of manipulated data and operations.

A second part 3620 of the driver model memory space 3600, however, may be reserved for special variables. The second part 3620 of the driver model memory space 3600 may be one or more virtual address spaces that correspond to a particular hardware peripheral device. Each special variable may be divided into fixed blocks 3630 of a pre-prescribed number 3630 of variables. Each block may correspond to a function. A "move droplet" function, for example, may have a pre-prescribed location of virtual address space. Other functions, such as manipulating temperature and counting photons, may have their own corresponding blocks of virtual address space. Each block may be populated with known, popular, or custom variables that are associated with, or relevant to, the corresponding function. The block 3630 associated with the "move droplet" function, for example, may have a pre-prescribed memory space for setting voltage 3635, setting control mode 3640, and asserting vectors 3645. Any other predefined variables associated with the "move droplet" function may also be pre-prescribed within the block 3630. Each driver communicating with the microfluidics system 200 may claim a memory block and interpret reads/writes to the corresponding memory block as actions that the controller 100 performs.

One advantage of the driver model memory space 3600 is that multiple, different peripherals may claim the same memory block. Because a common abstract address block may be shared by multiple peripherals, the peripherals appear to be same to a software application (such as the electrowetting application 202), even though the peripheral hardware is different. When the controller 100 boots or starts, the controller 100 may perform a check to determine what peripherals are connected and communicating with the controller 100. The controller 100 loads the corresponding driver for each peripheral, and each driver claims one or more of the pre-described blocks 3630 of memory. When reads or writes occur within a pre-described block of memory, the reads and writes translate into controller activities. To the electrowetting application 202, then, different hardware devices appear the same, because the different peripherals claim the same memory block 3630. Each pre-described block of memory has the same interface to the electrowetting application 202. Each pre-described block of memory, as an analogy, resembles a fixed application programming interface (API).

An unclaimed block, or unclaimed variable within a block, may produce an error. Any unclaimed blocks or variables may be reported as errors. Any functions associated with an entire unclaimed block would not be available to the processor 130 and/or to the electrowetting application 202. Similarly, any functions associated with an unclaimed variable within a block 3630 would not be available. A driver that offers less functional capability (perhaps to reduce cost) would not have all the functions available within a block. A reported error may identify or explain that a particular pre-described function is unavailable. A particular function or feature, in other words, is not available from the peripheral.

FIG. 40 is another screenshot of another graphical user interface 134, according to exemplary embodiments. FIG. 40 illustrates a traffic map 3700 (or "heat" map) produced by the assay development application 1702. FIG. 40 illustrates the electronic layout 406 of electrodes that corresponds to the electrode configuration 500 of the droplet actuator 102. The traffic map 3700 is another feature of the assay development application 1702 (illustrated in FIG. 21) for simulating an assay that is being developed at any time. The traffic map 3700 visually displays a current electrical state of the electrode configuration 500 at any moment in time. The traffic map 3700 may also visually display a current position of any droplet being manipulated or moved within the electrode configuration 500 at any moment in time. The simulation component 1740 (illustrated in FIG. 22) may track, log, or monitor every operation occurring in every assay being simulated. If multiple assays are being simulated in parallel, then the simulation component 1740 tracks the position of each droplet in each simulated assay.

Droplet activity may be monitored. As a particular assay is performed, electrodes may be electrically activated to move one or more droplets. When the simulation component 1740 performs a simulation of an assay, the simulation component 1740 may track what individual electrodes and/or groups of electrodes are repeatedly activated in the simulation. The simulation component 1740, in other words, may maintain a table in the memory 132 that logs and sums the number of times a particular electrode is turned ON and/or turned OFF. The simulation component 1740 may maintain a counter associated with each electrode. The simulation component 1740 may sum the activations to obtain a total number of times each electrode in the simulation is turned ON and turned OFF. This droplet activity is monitored throughout a simulated assay. The traffic map 3700, then, visually displays what electrodes or group of electrodes are heavily activated during the simulated assay, and what electrodes are little used or unused.

The traffic map 3700 is particularly useful in validation. A validation assay may be developed to purposefully test every electrode in the droplet actuator 102. When the validation assay is simulated, the traffic map 3700 would indicate what electrodes were activated during the validation assay. The traffic map 3700 is updated in real time, so the slider control 2102 may be used to skip forward and backward in time to view the traffic at any moment.

The traffic map 3700 may also utilize color coding. When an electrode is activated a high number of times during a simulation, the electrode may be colored (such as red coloring) to indicate high usage. A green coloring may indicate low levels of traffic. Different threshold values of activation may be defined and associated with a software color. No coloring may indicate no traffic at a particular electrode or group of electrodes.

The traffic map 3700 may also be used to predict failures. When a particular electrode has high usage (perhaps indicated by a red software coloring), then that electrode may be more prone to failure. When an electrode is highly used during an assay, then that electrode may also be more prone to contamination, which may lead to degraded results. The simulation component 1740, then, may be configured with a maximum number of activations for any electrode. If any simulation causes an individual electrode's activations to exceed the maximum number of activations during an assay, then the simulation component 1740 may determine another route that reduced the potential for failure.

The traffic map 3700 may also visually display a current position of any droplet. As a simulation progresses in time, the simulation component 1740 may determine an actual droplet's location based on a contiguous path of ON or activated electrodes. The simulation component 1740 may estimate a droplet's position within the electrode configuration 500 by sequentially following each electrical state of the electrodes.

FIG. 41 is another screenshot of another graphical user interface 134, according to exemplary embodiments. FIG. 41 illustrates a reservoir assignment map 3800 that may be produced by the assay development application 1702 and/or the simulation component 1740 (illustrated in FIGS. 21 and 22). The reservoir assignment map 3800 again illustrates the electronic layout 500 of electrodes, including fluid reservoirs R1 through R8. Because several assays may be run in parallel, the simulation component 1740 may simulate a collection (or "panel") of assays. Each simulated assay may communicate with the simulation component 1740 and report which of the reservoirs R1 through R8 are required. Each simulated assay may also report what reagent(s), sample(s), or substrate(s) should be in each reservoir. When the simulation component 1740 obtains this reservoir information, the simulation component 1740 may determine which of the reservoirs R1 through R8 are required for each assay. The simulation component 1740 may optimize the assignment of reservoirs. When two assays share the same reagent, for example, the assays may be assigned to a common reservoir. The simulation component 1740 may also estimate the usage of reagent from the commonly-assigned reservoir. Any reservoir, whether shared or not, must be capable of dispensing enough reagent or other liquid to ensure each assay is correctly performed. The simulation component 1740 may know the number of available reservoirs and the volume of each reservoir.

Suppose, for example, that the R1 reservoir may reliably dispense twelve (12) droplets of reagent. When the assay developer creates an assay, the simulation component 1740 may determine how many droplets will be required from each reservoir. If the assay requires twenty (20) droplets of reagent, then the R1 reservoir alone cannot supply the assay. Another reservoir must be used, and/or the assay must be reconfigured.

Multiple reservoirs may be used. If a single reservoir cannot dispense the needed material, an assay may use multiple reservoirs. Reservoirs R1 and R2, for example, may be combined to dispense the needed amount of material. Reservoirs R3 and R4 may, likewise, be combined to dispense the needed amount of material. The assay may thus be flexible and permit either reservoir pair (R1 and R2) or (R3 and R4) to be used.

Parallel assays, however, may impose constraints. When multiple assays are being performed in parallel, any reservoir, or combination of reservoirs, may be claimed or needed by a particular assay. Suppose a first assay is assigned reservoirs R1 and R2, and a second parallel assay is assigned reservoirs R3 and R4. The simulation component 1740 may thus determine what reservoirs can, and cannot, be shared when multiple assays are performed. The assignment of the reservoirs may thus be indicated in the reservoir assignment map 3800.

Bussing may also affect the assignment of reservoirs. The droplet actuator 102, as earlier explained, may have hundreds or even thousands of electrodes. Each electrode, of course, may have its own dedicated activation circuit. The overall circuitry, however, would be very complex. Bussing may thus be used to simply the circuitry of the droplet actuator 102. When bussing is used, multiple electrodes are connected to the same activation circuit or "bus." When an individual circuit bus is activated, all the electrodes connected to that circuit are ON. The assay development application 1702, and/or the simulation component 1740, may thus include software code that determines what bus circuits need to be activated to correctly move a droplet. When bussing is used, one or more of the reservoirs R1 through R8 may also be connected to the same bus circuit.

The reservoir assignment map 3800 may indicate the bussed reservoirs. The reservoir assignment map 3800 may visually indicate what reservoirs are bussed together on the same bus circuit. FIG. 41, for example, illustrates a solid line (illustrated as reference numeral 3802) connecting reservoirs R1 and R2. The solid line 3802 indicates reservoirs R1 and R2 are commonly activated by the same bus circuit. If the common bus circuit is activated, in other words, then both reservoirs R1 and R2 may dispense a droplet. Reservoirs R3 and R4 may, likewise, be bussed together, as may be reservoirs R5 and R6 and reservoirs R7 and R8.

Bussing may thus impose additional constraints or restrictions. Suppose a first assay uses reservoir R1, but the same first assay will not use reservoir R2. Reservoir R2, then, cannot be assigned to a second assay. The assignment of reservoir R2 to a second assay would cause both reservoirs R1 and R2 to dispense droplets, thus interfering with the first assay. The first and the second assay, then, may not be able to be run in parallel.

Each assay may publish or present its reservoir requirements. Some assays may require a certain reservoir, while other assays may be more flexible and not care from which reservoir a droplet is dispensed. Each assay may thus determine its associated restrictions, and each assay may report options for different combinations of reservoir operations. The assay development application 1702 and/or the simulation component 1740 may collect this bussed reservoir information and any requirements for a particular assay. If a solution cannot be found that permits all assays to be run together, then one or more individual assays must be removed from the parallel simulation.

FIG. 42 is another screenshot of another graphical user interface 134, according to exemplary embodiments. FIG. 42 illustrates an assay report 3900 that may be produced by the assay development application 1702 and/or the simulation component 1740 (illustrated in FIGS. 21 and 22). The assay report 3900 lists information associated with an assay, such a title of the assay, an operator performing the assay, and instrument information describing the device performing the assay. Statistical information associated with the assay is presented, and a file attachment may also be associated to the assay report 3900. The assay report 3900 may include a summary field into which text may be added. The assay report 3900 may be automatically created after each assay. The assay report 3900 may also be automatically locally stored in the memory 136. Because the assay report 3900 is automatically created, each assay report 3900 has the same format, regardless of the operator. Moreover, each assay report 3900 provides a complete historical log of all assays performed over time on a particular instrument, without concern of corruption or of tampering. The assay report 3900 also reduces or prevents an operator from discarding data because of unwanted results. The assay report 3900 may also be anonymous in that no patient-revealing information need be associated. If the assay report 3900 contained patient-revealing information (such as name or address), then the assay development application 1702 may strip the patient-revealing information from the assay report 3900.

FIG. 43 is another detailed schematic illustrating more operating environments. Here each assay report 3900 may be remotely stored to a central database 4000 operating in a central server 4005. As FIG. 43 illustrates, any processor-controlled device (such as the microfluids system 200) may perform an assay 4010. The assay development application 1702 generates the assay report 3900 describing the assay 4010. The assay development application 1702 may then communicate the assay report 3900 to the central server 4005 via the communications network 140. The assay report 3900 may be immediately sent, or the assay report 3900 may be sent according to a schedule. Multiple assay reports may even be sent as a batch. Regardless, when the central server 4005 receives the assay report 3900, the central server 4005 stores the assay report 3900 in the central database 4000. The central database 4000 thus serves as a central repository for all assays.

The central database 4000 may be queried. The central server 4005 may run and execute a query handler 4115. The query handler 4115 is a software application that manages queries to the central database 4000. In this example, researchers and other users may send queries to the central server 4005, and the query handler 4115 queries the central database 4000 for a search term 4120. The query handler 4115 retrieves one or more of the stored assay reports 3900 that match the search term(s). The query handler 4115 then sends the matching assay reports 3900 to the requestor. A web portal or interface 4125 may also be stored to permit easy Internet access to the assay reports. The central database 4000 may even be an aggregate database of all assays performed by all users and not just users associated with a lab, university, or corporation.

For examples of droplet actuator architectures that are suitable for use with the present invention, see U.S. Pat. No. 6,911,132, entitled "Apparatus for Manipulating Droplets by Electrowetting-Based Techniques," issued on Jun. 28, 2005 to Pamula et al.; U.S. patent application Ser. No. 11/343,284, entitled "Apparatuses and Methods for Manipulating Droplets on a Printed Circuit Board," filed on filed on Jan. 30, 2006; U.S. Pat. Nos. 6,773,566, entitled "Electrostatic Actuators for Microfluidics and Methods for Using Same," issued on Aug. 10, 2004 and 6,565,727, entitled "Actuators for Microfluidics Without Moving Parts," issued on Jan. 24, 2000, both to Shenderov et al.; Pollack et al., International Patent Application No. PCT/US 06/47486, entitled "Droplet-Based Biochemistry," filed on Dec. 11, 2006, the disclosures of which are incorporated herein by reference. Methods of the invention may be executed using droplet actuator systems, e.g., as described in International Patent Application No. PCT/US2007/09379, entitled "Droplet manipulation systems," filed on May 9, 2007.

For examples of fluids that may be subjected to droplet operations using the approach of the invention, see the patents listed herein, especially International Patent Application No. PCT/US 06/47486, entitled, "Droplet-Based Biochemistry," filed on Dec. 11, 2006. In some embodiments, the fluid includes a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, fluidized tissues, fluidized organisms, biological swabs and biological washes. In some embodiment, the fluid includes a reagent, such as water, deionized water, saline solutions, acidic solutions, basic solutions, detergent solutions and/or buffers. In some embodiments, the fluid includes a reagent, such as a reagent for a biochemical protocol, such as a nucleic acid amplification protocol, an affinity-based assay protocol, a sequencing protocol, and/or a protocol for analyses of biological fluids.

The fluids may include one or more magnetically responsive and/or non-magnetically responsive beads. Examples of droplet actuator techniques for immobilizing magnetic beads and/or non-magnetic beads are described in the foregoing international patent applications and in Sista, et al., U.S. Patent Application Nos. 60/900,653, filed on Feb. 9, 2007, entitled "Immobilization of magnetically-responsive beads during droplet operations"; Sista et al., U.S. Patent Application No. 60/969,736, filed on Sep. 4, 2007, entitled "Droplet Actuator Assay Improvements"; and Allen et al., U.S. Patent Application No. 60/957,717, filed on Aug. 24, 2007, entitled "Bead washing using physical barriers," the entire disclosures of which is incorporated herein by reference.

In general, the routines executed to implement the embodiments of the invention, whether implemented in hardware, as part of an operating system, or as a specific application, component, program, engine, process, programmatic tool, object, module, or sequence of instructions, or even a subset thereof; may be referred to herein as an "algorithm," "function," "program code," or simply "program." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one or at any number of locations.

Moreover, while the invention has and hereinafter will be described in the context of computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include, but are not limited to tangible, recordable type media such as volatile and non-volatile memory devices, floppy and other removable disks, hard disk drives, magnetic tape, optical disks (e.g., CD ROMs, DVDs, etc.), among others, and transmission type media such as digital and analog communication links. The invention may be physically embodied on or in a computer-readable or processor-readable storage medium. This computer- or processor-readable medium, or media, could be distributed to end-subscribers, licensees, and assignees. A computer program product comprises the computer- or processor-readable medium storing processor-executable code or instructions for performing droplet operations.

In addition, various program code described hereinafter may be identified based upon the application or engine within which it is implemented in a specific embodiment of the invention. However, it should be appreciated that any particular program nomenclature is used merely for convenience, and thus the invention should not be limited to use solely in any specific application or engine identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in the Figures may be implemented in a number of manners, including using various computer software applications, routines, components, programs, objects, modules, data structures and programs. Those skilled in the art will further recognize that the exemplary environments illustrated in the Figures are not intended to limit the present invention. Indeed, those skilled in the art will recognize that other alternative hardware and/or software environments may be used without departing from the scope of the invention.

7 Concluding Remarks

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicants' invention set forth in this specification, and neither its use nor its absence is intended to limit the scope of the applicants' invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. A system, comprising a processor for executing code and a memory in communication with the processor, the system comprising code stored in the memory that causes the processor to:

(a) determine a state of electrodes in a droplet actuator with each electrode having an applied voltage or a reference voltage;

(b) determine multiple vectors having terms corresponding to a voltage of each electrode, the determining comprising defining a term of a first one of the vectors having a value representing a don't care condition, and defining a second one of the vectors based on the term of the first one of the vectors having a value representing a don't care condition, such that the first one of the vectors and the second one of the vectors can be executed in parallel; and (c) transform the vectors into physical pin assignments for the droplet actuator to execute multiple vectors in parallel.

2. The system according to claim 1, wherein the code further causes the processor to define a term of each of the vectors to have a value representing the applied voltage.

3. The system according to claim 1, wherein the code further causes the processor to define a term of each of the vectors to have a value representing the reference voltage.

4. The system according to claim 1, wherein the code further causes the processor to define a term of each of the vectors to have a value representing a don't care condition.

5. The system according to claim 1, wherein the wherein the vectors represent assay sequences to be performed in parallel.

6. The system according to claim 1, further comprising the droplet actuator electronically coupled to the processor and controllable thereby.

7. The system according to claim 6, wherein the electrodes of the droplet actuator are configured for conducting electrowetting droplet operations.

* * * * *